United States Patent
Miyagaki et al.

(10) Patent No.: US 7,336,411 B2
(45) Date of Patent: Feb. 26, 2008

(54) SPATIAL LIGHT MODULATOR AND DISPLAY DEVICE

(75) Inventors: Kazuya Miyagaki, Kanagawa (JP);
Kazuhiro Fujita, Tokyo (JP);
Takanobu Osaka, Kanagawa (JP);
Atsushi Takaura, Tokyo (JP);
Hiroyuki Sugimoto, Kanagawa (JP);
Yasuyuki Takiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/994,321

(22) Filed: Nov. 23, 2004

(65) Prior Publication Data
US 2005/0111072 A1    May 26, 2005

(30) Foreign Application Priority Data
Nov. 25, 2003  (JP)  ............................ 2003-393843
May 18, 2004  (JP)  ............................ 2004-147814

(51) Int. Cl.
*G02F 1/01* (2006.01)
*G02F 1/29* (2006.01)
*G02B 26/00* (2006.01)
*G02B 26/08* (2006.01)

(52) U.S. Cl. .................. 359/279; 359/290; 359/291; 359/298

(58) Field of Classification Search ............... 359/279, 359/290, 291, 292, 295, 297, 298
See application file for complete search history.

(56) References Cited

U.S. PATENT DOCUMENTS

| | | | |
|---|---|---|---|
| 4,878,742 A | * | 11/1989 | Ohkubo et al. ............. 349/201 |
| 4,921,728 A | | 5/1990 | Takiguchi et al. |
| 4,935,911 A | | 6/1990 | Ohuchida et al. |
| 4,984,873 A | | 1/1991 | Takiguchi et al. |
| 5,056,896 A | | 10/1991 | Iimura et al. |
| 5,060,212 A | | 10/1991 | Fujita et al. |
| 5,064,697 A | | 11/1991 | Takiguchi et al. |

(Continued)

FOREIGN PATENT DOCUMENTS

JP   07-020429   *   6/1993

(Continued)

OTHER PUBLICATIONS

Martin Schadt, et al., "Photo-Generation of Linearly Polymerized Liquid Crystal Aligning Layers Comprising Novel, Integrated Optically Patterned Retarders and Color Filters", Japan J. Appl. Phys., vol. 34, Part 1, No. 6A, Jun. 1995, pp. 3240-3249.

(Continued)

*Primary Examiner*—Ricky Mack
*Assistant Examiner*—Brandi Thomas
(74) *Attorney, Agent, or Firm*—Oblon, Spivak, McClelland, Maier & Neustadt, P.C.

(57) ABSTRACT

A spatial light modulator is disclosed that can be fabricated easily and is able to prevent degradation of a contrast ratio by suppressing a fringe effect. The spatial light modulator includes a light transmission substrate, a liquid crystal layer, a pixel array, and a phase difference generation unit provided between the light transmission substrate and the liquid crystal layer. A lens array is formed on the light transmission substrate, and the lens array has the same pitch as that of the pixel array.

25 Claims, 28 Drawing Sheets

U.S. PATENT DOCUMENTS

| | | | |
|---|---|---|---|
| 5,097,462 A | 3/1992 | Fujita et al. | |
| 5,107,477 A | 4/1992 | Fujita et al. | |
| 5,147,682 A | 9/1992 | Takiguchi et al. | |
| 5,150,237 A | 9/1992 | Iimura et al. | |
| 5,175,638 A | 12/1992 | Kanemoto et al. | |
| 5,184,237 A | 2/1993 | Iimura et al. | |
| 5,243,451 A | 9/1993 | Kanemoto et al. | |
| 5,250,214 A | 10/1993 | Kanemoto et al. | |
| 5,260,109 A | 11/1993 | Iida et al. | |
| 5,326,496 A | 7/1994 | Iida et al. | |
| 5,331,650 A | 7/1994 | Maeda et al. | |
| 5,380,459 A | 1/1995 | Kanemoto et al. | |
| 5,408,344 A | 4/1995 | Takiguchi et al. | |
| 5,472,635 A | 12/1995 | Iida et al. | |
| 5,493,429 A | 2/1996 | Kanemoto et al. | |
| 5,496,497 A | 3/1996 | Takiguchi et al. | |
| 5,510,886 A | 4/1996 | Sugimoto et al. | |
| 5,604,606 A | 2/1997 | Miyashita et al. | |
| 5,623,353 A | 4/1997 | Kanemoto et al. | |
| 5,907,438 A | 5/1999 | Fujita et al. | |
| 5,923,928 A | 7/1999 | Sugimoto | |
| 5,926,669 A | 7/1999 | Sugimoto et al. | |
| 5,969,780 A | 10/1999 | Matsumoto et al. | |
| 6,002,459 A * | 12/1999 | Kaise et al. | 349/95 |
| 6,006,062 A | 12/1999 | Takahashi et al. | |
| 6,061,042 A | 5/2000 | Takahashi et al. | |
| 6,151,093 A | 11/2000 | Takiguchi et al. | |
| 6,157,795 A | 12/2000 | Kadonaga et al. | |
| 6,177,667 B1 | 1/2001 | Fujita et al. | |
| 6,181,473 B1 | 1/2001 | Fujita et al. | |
| 6,223,008 B1 | 4/2001 | Takahashi et al. | |
| 6,351,299 B2 | 2/2002 | Takiguchi et al. | |
| 6,497,488 B1 | 12/2002 | Yamauchi et al. | |
| 6,524,759 B1 | 2/2003 | Sugimoto et al. | |
| 6,537,711 B1 | 3/2003 | Nimura et al. | |
| 6,754,162 B2 | 6/2004 | Fujita et al. | |
| 6,900,859 B2 * | 5/2005 | Matsumoto | 349/106 |
| 7,006,173 B1 * | 2/2006 | Hiyama et al. | 349/96 |
| 2002/0176255 A1 | 11/2002 | Yamauchi et al. | |
| 2003/0053501 A1 | 3/2003 | Sekiya et al. | |
| 2003/0074260 A1 | 4/2003 | Sugiyama et al. | |
| 2003/0098945 A1 | 5/2003 | Sugimoto et al. | |
| 2003/0147051 A1 | 8/2003 | Fujita et al. | |
| 2003/0222980 A1 | 12/2003 | Miyagaki et al. | |
| 2004/0001166 A1 | 1/2004 | Nimura et al. | |
| 2004/0021811 A1 | 2/2004 | Matsuki et al. | |
| 2004/0036829 A1 | 2/2004 | Sugimoto et al. | |
| 2004/0156117 A1 | 8/2004 | Takaura et al. | |

FOREIGN PATENT DOCUMENTS

| | | | |
|---|---|---|---|
| JP | 8-29618 | | 2/1996 |
| JP | 8-186780 | | 7/1996 |
| JP | 2784680 | | 5/1998 |
| JP | 10-311975 | * | 11/1998 |
| JP | 11-258585 | | 9/1999 |
| JP | 3239969 | | 10/2001 |
| JP | 2002-328402 | | 11/2002 |

OTHER PUBLICATIONS

Pavel Lazarev, et al., "NED-P27. Printed Optical Components for Liquid Crystal Displays", 12th International Symposium, Advanced Display Technologies: Basic Studies of Problems in Information Display (Flowers 2003), Aug. 25-28, 2003, pp. 186-189.

* cited by examiner

FIG.6

| OPTICAL ELEMENT ARRANGEMENT | TYPE OF BEAM SPLITTING ELEMENT AND RELATIVE RATIO | |
|---|---|---|
| | BEAM SPLITTER | WIRE-GRID POLARIZER |
| P+B+LC | 100% | 146% |
| P+B+MLA+LC | 15.6% | 21% |
| P+MLA+B+LC | 42.4% | 134% |

P: BEAM SPLITTING ELEMENT
B: WAVE PLATE
MLA: MICRO-LENS ARRAY
LC: LIQUID CRYSTAL PANEL

SPATIAL LIGHT MODULATOR AND DISPLAY DEVICE

BACKGROUND OF THE INVENTION

1. Field of the Invention

The present invention relates to a spatial light modulator, and a display device including the spatial light modulator.

2. Description of the Related Art

In the related art, for example, Japanese Laid-Open Patent Application No. 11-258585 (referred to as "reference 1" hereinafter) discloses a display device including a reflection type spatial light modulator, such as a reflection type liquid crystal displaying element. This reflection spatial light modulator has a lens-array formed on a light transmission substrate. This lens-array prevents incidence of light on an area between two pixel electrodes where liquid crystal molecules are not sufficiently aligned, thereby obtaining an image of high brightness and high quality.

Japanese Patent Gazette No. 3239969 (referred to as "reference 2" hereinafter) discloses a display device including a transmission type spatial light modulator, such as a transmission type liquid crystal displaying element, which includes a micro-lens array to optically reduce the size of a pixel of the displaying element. In addition, by using a pixel-shift function of a wobbling element or others, positions of pixels are shifted by a specified distance on a screen. Because the pixel size is reduced by the micro-lens array, and the pixels are further shifted by using the pixel-shift technique, overlapping of adjacent pixels is reduced, and high-resolution images can be obtained.

Japanese Laid-Open Patent Application No. 8-186780 discloses a display device which uses a micro-lens array and a wobbling element, and the pixel size of the liquid crystal displaying element is reduced by using the micro-lens array.

As described so far, it is a well-known technique to provide a micro-lens array in a spatial light modulator (for example, a liquid crystal displaying element) to condense illumination light to a position near the center of a pixel, and thus, the illumination light otherwise going to a region between pixels (that is, a non-pixel region) can be deflected to a pixel. Thereby the efficiency of light utilization can be improved, and degradation of a contrast ratio can be prevented, which can be attributed to a fringe effect caused by non-uniformity of the electric field surrounding each pixel.

In addition, also as described above, it is a well-known technique to provide a pixel-shift element in a display device. By providing the pixel-shift element in a light path of projecting light so as to rapidly shift the light path, for example, the pixel-shift element shifts the light path by half a pixel in synchronization with an image updating operation in the spatial light modulator, it is possible to apparently display a larger number of pixels than the actual number of pixels of the spatial light modulator, for example, a number of pixels equaling an integral multiple of the pixel number of the spatial light modulator are displayed.

Developments are being made of such kinds of spatial light modulators and display devices including the micro-lens array to further reduce overlapping of the projected pixels and improve the image resolution.

In the spatial light modulator having a micro-lens, it is required to maintain not only high geometric optical properties of the micro-lens, but also a high contrast ratio. In a projector including the spatial light modulator, the illumination light is incident on the spatial light modulator, and is modulated by the spatial light modulator according to image data. The modulated illumination light which carries image data is projected to form images on a screen.

In order to obtain uniform images, the illumination light should be uniformly emitted on the spatial light modulator, and for this purpose, light integrators such as fly's-eye lenses or rod lenses are employed.

In illumination optical systems used for these purposes, the illumination light is incident on the spatial light modulator at various incident angles defined by an F value of the optical system, and especially for the light having a large incident angle, the plane of polarization changes due to the micro-lens.

In addition, in display devices as described above, in order to further improve the contrast ratio, wave plates are provided in the light path so as to correct the residual phase difference caused by the spatial light modulator, or correct skewness of light caused by a polarized light splitting element, such as a polarization beam splitter.

Inventors of the present invention found the following problems in the above illumination optical systems. In the above illumination optical system using the wave plate for compensation for the residual phase difference, the contrast ratio decreases when the curvature radius of the micro-lens is small and the lens power is large. This is caused by rotation of the polarized light and especially by a difference of the compensation condition for the light of a large incident angle (angle of incidence). Further, in a reflection spatial light modulator, the angle of the incident light entering the wave plate may differ from the angle of the returning light which leaves the wave plate, and this causes further decrease of the contrast ratio.

In addition to the above problems, in the aforesaid display device, which uses the micro-lens array (MLA) to reduce the apparent pixel size of the spatial light modulation element and uses the pixel-shift function of the wobbling element to shift positions of pixels on a screen, after the illumination light is refracted by the micro-lens array, the incidence plane of a portion of the illumination light becomes not parallel or perpendicular to the polarization plane of the polarized light. In this case, even when the illumination light is linearly polarized, the illumination light ends up having a P polarization component and an S polarization component in the refraction plane. Because the P polarization component and the S polarization component of the illumination light have different transmittances, the polarization plane rotates after refraction by the micro-lens. For this reason, the polarization state of the illumination light after the micro-lens array changes. When such kind of illumination light is incident on the spatial light modulator, even in a dark state (no modulated light arrives at the projecting lens), leakage of the modulated light occurs, and the leaked modulated light arrives at the projecting lens and is projected onto the screen, causing decrease of the contrast ratio of the displayed image.

In order to solve the above problem, that is, when the micro-lens is used in the spatial light modulator to increase the efficiency of light utilization, and the contrast ratio decreases due to rotation of the polarization plane caused by refraction of the lens, the inventors of the present invention proposed a display device including a spatial light modulator (for example, a liquid crystal display panel) with an anti-reflection element being provided on a refracting side of the micro-lens, that is, a side possessing refraction power, and proposed a display device including this spatial light modulator and a pixel-shift element.

In this display device, the spatial light modulator has a plural number of pixels, and includes spatial light modulation elements each for modulating the polarization state or intensity of the light incident on one pixel. In the spatial light modulator, a micro-lens array is arranged near the spatial light modulation elements, and the micro-lens array has a lens pitch equaling the pixel pitch of the spatial light modulation elements. In addition, an anti-reflection element is provided on a refracting side of the micro-lens array so as to prevent the decrease of the contrast ratio. By providing the anti-reflection element, the polarization plane of the illumination light rotates very little when the illumination light is refracted by the micro-lens array, and this prevents the decrease of the contrast ratio.

A λ/4 wave plate is often used in a display device. The above display devices, however, are not proposed to include a configuration with a λ/4 wave plate being placed between the micro-lens array and the liquid crystal layer. In addition, when a wave plate is arranged between a polarized light splitting element and a micro-lens array, when the illumination light propagates in the wave plate, the angle of the illumination light is different from the angle of the projected light (that is, the light projected to the screen to form an image), and the spread of the projected light is larger than that of the illumination light. For this reason, phase of the illumination light differs from the phase of the projected light, and due to this, the screen in the dark state is somehow bright, that is, causing a decrease of the contrast ratio.

SUMMARY OF THE INVENTION

It is a general object of the present invention to solve one or more problems of the related art.

A first specific object of the present invention is to provide a spatial light modulation device that can be fabricated easily and is able to prevent decrease of a contrast ratio by suppressing a fringe effect, and a display device including the spatial light modulation device.

A second specific object of the present invention is to provide a display device with a high contrast ratio, which includes a pixel shift element and is able to display a number of pixels equaling an integral multiple of the number of pixels of a spatial light modulation device therein, and to reduce overlapping of adjacent pixels.

According to a first aspect of the present invention, there is provided a spatial light modulation device including a light transmission substrate; a liquid crystal layer; a pixel array; and a phase difference generation unit provided between the light transmission substrate and the liquid crystal layer.

According to the present invention, because a phase difference generation unit is provided between the light transmission substrate and the liquid crystal layer, it is possible to compensate for a residual phase difference in the liquid crystal layer.

As an embodiment, the pixel array includes a plurality of pixel electrodes arranged as a matrix. A lens array is formed on the light transmission substrate, and the lens array has a pitch corresponding to the pitch of the pixel electrode matrix. The phase difference generation unit is provided between the lens array and the liquid crystal layer.

According to the present invention, because of the lens array, it is possible to display an image of high brightness and high quality. Because the phase difference generation unit is provided between the lens array and the liquid crystal layer, it is possible to compensate for the residual phase difference in the liquid crystal layer.

Alternatively, as an embodiment, a lens array is formed in or on a surface of the light transmission substrate; the pixel array includes a plurality of pixel electrodes arranged as an array having a pitch corresponding to the pitch of the lens array; the liquid crystal layer is provided between the light transmission substrate and a pixel array substrate with the pixel array formed thereon; and the phase difference generation unit is provided between the lens array and the liquid crystal layer with a fixed alignment.

According to the present invention, it is possible to provide a spatial light modulation device having both high pixel downsizing performance and high contrast ratio. In addition, because the phase difference generation unit has a fixed liquid crystal alignment, it is easy to form a thin phase difference generation unit inside the spatial light modulation device, thereby obtaining a spatial light modulation device that is stable relative to temperature change.

As an embodiment, the phase difference generation unit includes a polymer liquid crystal film with a fixed alignment obtained by cooling an aligned polymer liquid crystal film to a glass state.

According to the present invention, the phase difference generation unit has high temperature stability and high alignment performance, and can be fabricated easily.

As an embodiment, the phase difference generation unit includes an aligned liquid crystal polymerized film or cross-linked film having a polymerized group.

According to the present invention, the phase difference generation unit has high temperature stability, high alignment performance, and can be fabricated easily. In addition, by appropriately selecting materials, it is possible to further improve stability of the phase difference generation unit.

As an embodiment, the phase difference generation unit includes a crystal film of an aligned lyotropic liquid crystal.

According to the present invention, the phase difference generation unit can be fabricated easily. In addition, because the finally obtained film is a crystal film, it is possible to further improve stability of the phase difference generation unit, which is suitable for usage in a high temperature environment, such as in a projection display apparatus.

As an embodiment, a surface of the light transmission substrate and a surface of the pixel array substrate adjacent to the phase difference generation unit are processed by liquid crystal alignment treatment.

According to the present invention, it is possible to obtain uniform alignment of the phase difference generation unit in a simple way.

As an embodiment, the phase difference generation unit is formed by transferring a film on another substrate to the light transmission substrate.

According to the present invention, it is not necessary to perform the alignment treatment, and there are many options for selecting a method of forming the phase difference generation unit.

As an embodiment, a transparent electrode is formed on the light transmission substrate for applying a voltage to the liquid crystal layer through the phase difference generation unit.

According to the present invention, because the phase difference generation unit can be made thin by making use of the high alignment performance of the phase difference generation unit, it is possible to apply a voltage through the phase difference generation unit. In addition, it is possible to obtain a spatial light modulation device with a built-in phase difference generation unit by using a simple configuration.

As an embodiment, the phase difference generation unit is processed by alignment treatment for aligning the liquid crystal layer.

According to the present invention, in a configuration in which the liquid crystal layer for displaying is adjacent to the phase difference generation unit, it is possible to use a liquid crystal layer having any alignment, which does not depend on the alignment direction of the phase difference generation unit. In addition, because the phase difference generation unit is processed by alignment treatment, it is possible to control the alignment of the liquid crystal layer with a simple configuration which can be fabricated easily.

As an embodiment, a light transmission interlayer is provided between the liquid crystal layer and the phase difference generation unit.

According to the present invention, it is possible to prevent contamination or damage to the liquid crystal layer and the phase difference generation unit from occurring when they contact each other directly, and therefore to obtain a spatial light modulation device of high reliability.

As an embodiment, a side of the light transmission interlayer adjacent to the liquid crystal layer is processed by alignment treatment for aligning the liquid crystal layer.

As an embodiment, the light transmission interlayer is a transparent electrode, and the side of the light transmission interlayer adjacent to the liquid crystal layer is processed by alignment treatment for aligning the liquid crystal layer.

According to the present invention, because the transparent electrode also acts as the interlayer, it is possible to obtain a spatial light modulation device of high reliability with a simple configuration. In addition, because the principal point of the lens is close to the liquid crystal layer, there is more freedom in optical design, and this makes it possible to further reduce the pixel size.

As an embodiment, each of the pixel electrodes is formed from a light-reflecting material.

According to the present invention, by using light-reflecting materials, it is possible to greatly improve the contrast ratio.

As an embodiment, the phase difference generation unit includes a $\lambda/4$ wave plate.

According to the present invention, by using a $\lambda/4$ wave plate as the phase difference generation unit, especially by applying the $\lambda/4$ wave plate in an optical system including a polarized-light splitter, which suffers from degradation of the contrast ratio caused by skewed light, it is possible to maintain a high contrast ratio even when the size of pixels is reduced.

As an embodiment, the phase difference generation unit generates a phase difference for compensating for a residual phase difference in an ON state or OFF state of the liquid crystal layer.

According to the present invention, it is possible to maintain a high contrast ratio even when the size of pixels is reduced.

As an embodiment, alignment of the phase difference generation unit is adjustable by applying an external electric field, and the alignment of the phase difference generation unit is fixed after being adjusted.

As an embodiment, the phase difference generation unit includes a liquid crystal alignment control film and a curable liquid crystal layer, and alignment of the liquid crystal alignment control film is adjustable in a plane including the liquid crystal alignment control film by applying an electric field in the thickness direction of the liquid crystal alignment control film.

As an embodiment, the phase difference generation unit further includes an alignment film; the liquid crystal alignment control film includes a liquid crystal film of a Smectic A phase and an electroniclinic effect; and the curable liquid crystal layer includes a light-curable liquid crystal layer.

As an embodiment, the phase difference generation unit further includes an alignment film; the liquid crystal alignment control film includes a ferroelectric liquid crystal film of a polymer stabilized Smectic C phase; and the curable liquid crystal layer includes a light-curable liquid crystal layer.

According to the present invention, it is possible to integrate the phase difference generation unit with the spatial light modulation device, and it is possible to fix a slow axis of the phase difference generation unit after rotating the slow axis for adjustment, making the spatial light modulation device compact.

As an embodiment, the phase difference generation unit does not include an alignment film.

According to the present invention, the structure of the phase difference generation unit is simplified.

As an embodiment, the curable liquid crystal layer includes a light-curable liquid crystal layer having a dielectric anisotropy being substantially zero.

According to the present invention, the light-curable liquid crystal layer is aligned with the orientation of an orientation-controllable liquid crystal layer even when the orientation-controllable liquid crystal layer is being manipulated by applying an electric field; therefore, a desired phase difference can be obtained reliably.

As an embodiment, a lens array is formed in the light transmission substrate or on a surface of the light transmission substrate, and is arranged to correspond to the pixel array.

According to a second aspect of the present invention, there is provided a display device including a light source that emits illumination light; an illumination unit that renders the illumination light to irradiate uniformly; and a spatial light modulation device including a light transmission substrate, a liquid crystal layer, a pixel array, and a phase difference generation unit provided between the light transmission substrate and the liquid crystal layer.

According to the present invention, because of the lens array, it is possible to display an image of high brightness and high quality. Because the phase difference generation unit is provided between the lens array and the liquid crystal layer, it is possible to compensate for the residual phase difference in the liquid crystal layer, and prevent degradation of the contrast ratio of the image.

According to a third aspect of the present invention, there is provided a display device including a light source that emits illumination light; an illumination unit that renders the illumination light from the light source to irradiate uniformly; a polarized-light splitting unit; and a spatial light modulation device including a light transmission substrate, a liquid crystal layer, a pixel array, and a phase difference generation unit provided between the light transmission substrate and the liquid crystal layer.

According to the present invention, because of the lens array, it is possible to display an image of high brightness and high quality. Because the phase difference generation unit is provided between the lens array and the liquid crystal layer, it is possible to compensate for the residual phase difference in the liquid crystal layer, and prevent degradation of the contrast ratio of the image.

According to a fourth aspect of the present invention, there is provided a display device including a light source that emits illumination light; an illumination unit that renders the illumination light to irradiate uniformly; a polarized-light splitting unit; a spatial light modulation unit that includes a plurality of spatial light modulation elements for forming an image with a pixel array, a lens array arranged to correspond to the pixel array, and a phase difference generation member; and a pixel shift element. The phase difference generation member is provided between the lens array and the spatial light modulation elements.

As an embodiment, the spatial light modulation unit comprises a light transmission substrate, a liquid crystal layer, and a reflection pixel array.

According to the present invention, because of the pixel shift element and the lens array, it is possible to display an image having a number of pixels greater than the number of pixels of the spatial light modulation unit. Because the phase difference generation member is provided between the lens array and the spatial light modulation unit, it is possible to compensate for the residual phase difference in the liquid crystal layer, and to prevent degradation of the contrast ratio of the image.

As an embodiment, the polarized-light splitting unit includes a polarized-light splitter, and the phase difference generation member includes a $\lambda/4$ wave plate.

According to the present invention, a $\lambda/4$ wave plate is provided between the lens array and the spatial light modulation unit, and the $\lambda/4$ wave plate prevents degradation of contrast ratio of incident light on the polarized-light splitter at an inclined incident angle, thereby improving the contrast ratio.

As an embodiment, the polarized-light splitting unit includes a wire grid polarizer.

According to the present invention, it is possible to compensate a residual phase difference in the liquid crystal layer.

As an embodiment, the spatial light modulation elements, the lens array, and the phase difference generation member are formed integrally. In addition, the spatial light modulation unit includes a reflection liquid crystal displaying element having a lens array substrate, a lower substrate having a reflection pixel array, and a liquid crystal layer between the lens array substrate and the lower substrate. The phase difference generation member is formed on the side of the lens array substrate facing the liquid crystal layer by oblique evaporation.

According to the present invention, the phase difference generation member can be obtained by forming a film, and the lens array can be arranged to be very close to the liquid crystal layer, which improves the efficiency of light utilization and enables displaying images of high resolution.

As an embodiment, the spatial light modulation unit includes a reflection liquid crystal displaying element having a lens array substrate, a lower substrate having a reflection pixel array, and a liquid crystal layer between the lens array substrate and the lower substrate. The phase difference generation member is formed on the side of the lens array substrate facing the liquid crystal layer by structural birefringence.

According to the present invention, because the phase difference generation member can be formed by structural birefringence, the lens array can be arranged very close to the liquid crystal layer, which improves the efficiency of light utilization and enables displaying images of high resolution.

According to a fifth aspect of the present invention, there is provided a display device including a light source that emits illumination light; an illumination unit that renders the illumination light to irradiate uniformly; a polarized-light splitting unit; and a spatial light modulation unit that includes a light transmission substrate, a liquid crystal layer, a pixel array, and a phase difference generation unit provided between the light transmission substrate and the liquid crystal layer. A lens array is formed in the light transmission substrate or on a surface of the light transmission substrate. The pixel array includes a plurality of pixel electrodes arranged as an array having a pitch corresponding to the pitch of the lens array. The liquid crystal layer is provided between the light transmission substrate and a pixel array substrate with the pixel array formed thereon. The phase difference generation unit is provided between the lens array and the liquid crystal layer with a fixed alignment.

According to the present invention, it is possible to obtain a display device with a high contrast ratio.

As an embodiment, the display device further includes a pixel shift element provided in a light path outgoing from the spatial light modulation unit for shifting or bending the light path so as to display images including pixels downsized by the lens array while changing displaying positions of the pixels with time.

According to the present invention, by using the pixel shift element and the spatial light modulation unit of a high contrast ratio, it is possible to display an image having a number of pixels greater than the number of pixels of the spatial light modulation unit with a high contrast ratio.

According to a sixth aspect of the present invention, there is provided a projection display apparatus which includes a display device that displays an image; and a projecting lens that projects the image. The display device includes a light source that emits illumination light; an illumination unit that renders the illumination light to irradiate uniformly; and a spatial light modulation device including a light transmission substrate, a liquid crystal layer, a pixel array, and a phase difference generation unit provided between the light transmission substrate and the liquid crystal layer.

According to a seventh aspect of the present invention, there is provided a projection display apparatus which includes a display device that displays an image; and a projecting lens that projects the image. The display device includes a light source that emits illumination light; an illumination unit that renders the illumination light to irradiate uniformly; a polarized-light splitting unit; a spatial light modulation unit that includes a plurality of spatial light modulation elements for forming an image with a pixel array, a lens array arranged to correspond to the pixel array, and a phase difference generation member provided between the lens array and the spatial light modulation elements; and a pixel shift element.

According to the present invention, it is possible to realize a projection display apparatus with high efficiency of light utilization able to display a high resolution image of a high contrast ratio.

These and other objects, features, and advantages of the present invention will become more apparent from the following detailed description of preferred embodiments given with reference to the accompanying drawings.

BRIEF DESCRIPTION OF THE DRAWINGS

FIG. 6 is a table summarizing the results obtained in the first and second experiments;

DESCRIPTION OF THE PREFERRED EMBODIMENTS

Below, preferred embodiments of the present invention are explained with reference to the accompanying drawings.

First Embodiment

Figure 1:
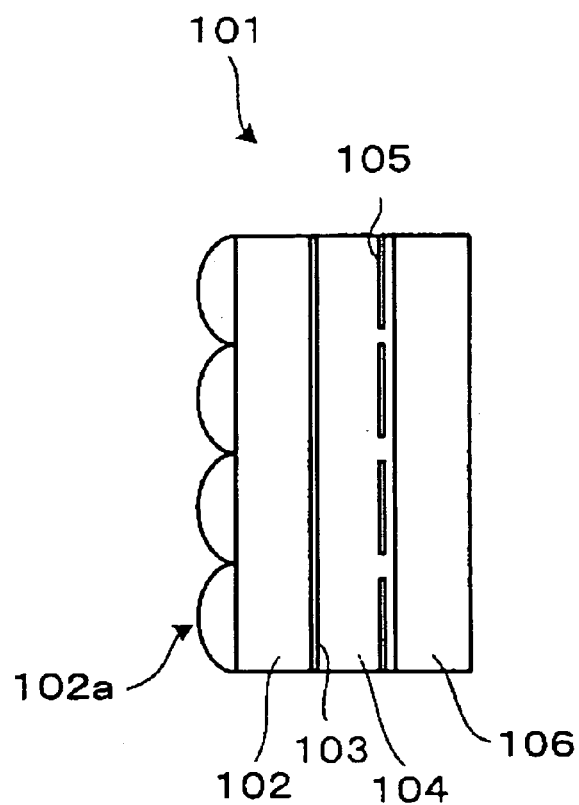
FIG. 1 is a schematic cross-sectional view of a principal portion of a spatial light modulator according to a first embodiment of the present invention.

FIG. 1 is a schematic cross-sectional view of a principal portion of a spatial light modulator according to a first embodiment of the present invention.

FIG. 1 illustrates a spatial light modulator 101 which includes a lens array substrate 102 with a lens array 102a formed thereon, a wave plate 103, a liquid crystal layer 104, pixel reflecting electrodes 105 which are elements of a reflecting pixel array, and a silicon back substrate 106. Although not illustrated, a transparent electrode array and an alignment film are formed between the wave plate 103 and the liquid crystal layer 104. Further, an alignment film is also formed between the liquid crystal layer 104 and pixel reflecting electrodes 105. A spatial light modulator, such as the spatial light modulator 101, which employs liquid crystal displaying elements, is referred to as "liquid crystal light valve".

Although not illustrated in FIG. 1, light from the left side in FIG. 1 is incident on the lens array 102a, condensed by the lens array 102a, and then emitted to the pixel reflecting electrodes 105. Due to this, illumination of light is reduced in regions between the pixel reflecting electrodes, where liquid molecules are not sufficiently aligned. Therefore, the light passes through regions where the liquid molecules are well aligned, and the efficiency of light utilization is improved. Here, the wave plate 103 is used for compensating for a residual phase difference in the liquid crystal layer 104.

In the related art, for example, the aforesaid reference 1 discloses only an arrangement in which the wave plate is placed in front of the lens array (referring to FIG. 1). In this arrangement, the angle of the light incident on the wave plate differs from the angle of the returning light, which is the light reflected by the reflecting pixel electrodes, then passing through the lens array, and finally leaving the wave plate. Because the phase difference between the incident light and the returning light is not constant, the phase difference cannot be correctly compensated for in the related art.

In contrast, in the present embodiment, because the angle of the incident light is the same as the angle of the returning light, the phase difference between the incident light and the returning light is constant, and hence, the residual phase difference can be correctly compensated for.

For example, the wave plate 103 is a birefringence film formed by oblique evaporation. Although not illustrated, by further adding a light source and an illumination optical system to the spatial light modulator 101, a display device can be constructed. A polarized-light splitting unit, such as a splitter, may be further installed in the display device.

As described above, this kind of display device is able to correctly compensate for the residual phase difference.

As another example, the display device according to the first embodiment of the present invention is characterized in that it includes a light source for emitting illumination light, an illumination optical system for projecting the illumination light uniformly, a polarized-light splitting unit, a spatial light modulation unit, and a pixel shift element. The spatial light modulation unit includes a plurality of spatial light modulation elements for forming an image from a pixel array, a lens array arranged in correspondence with the pixel array, and a phase difference generation member between the lens array and the spatial light modulation elements.

Two experiments were performed to show performance of a display device having such a configuration. Results of the two experiments are described below.

Figure 2:
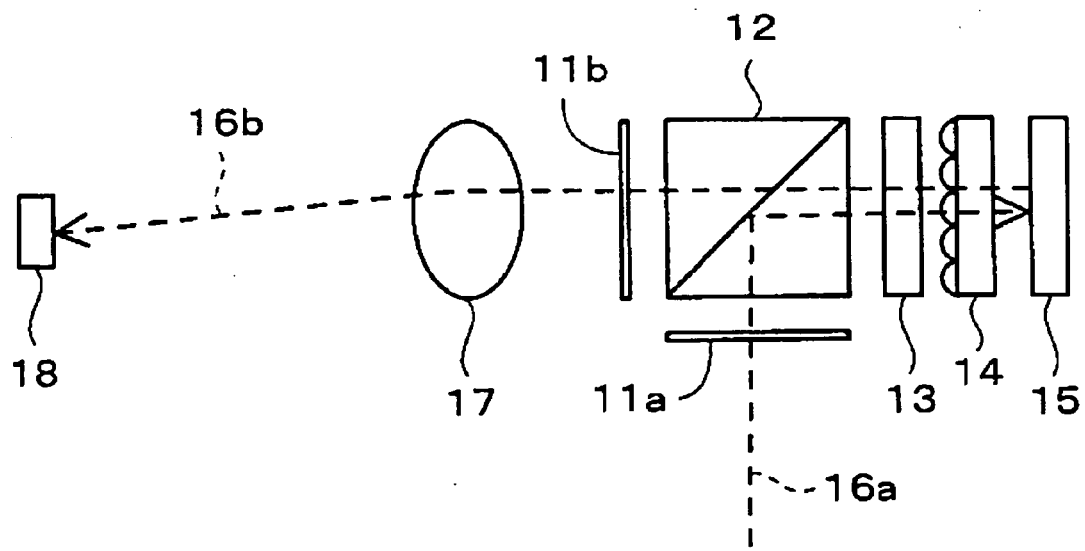
FIG. 2 is a schematic view of a display device used in the first experiment.

FIG. 2 is a view showing an optical system of a display device used in the first experiment.

Figure 3:
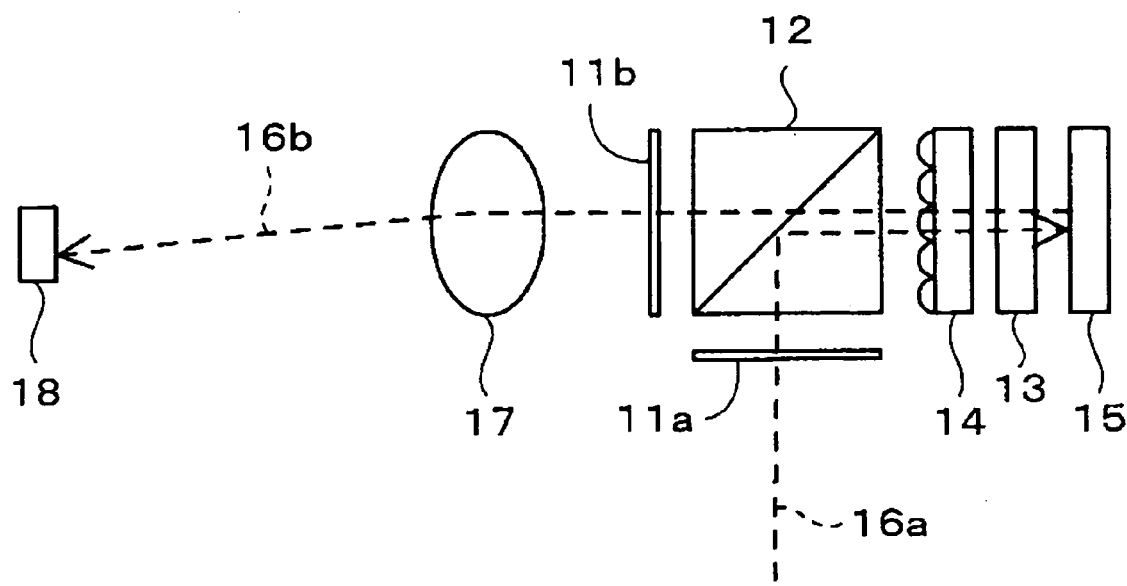
FIG. 3 is a schematic view of another display device used in the first experiment.

FIG. 3 is a view showing an optical system of another display device used in the first experiment.

In the first experiment, as illustrated in FIG. 2, a polarized beam splitter 12 was used as the polarized-light splitting unit in the claims. A not-illustrated dichroic filter was used to filter light emitted from a white discharging lamp, and green illumination light 16a was obtained. A polarization plate 11a was arranged in front of the polarized beam splitter 12 with the transmission axis of the polarization plate 11a being perpendicular to the paper.

As illustrated in FIG. 2, the portion of the spatial light modulator was formed by a wave plate 13 (for example, a λ/4 wave plate), a micro-lens array 14, and a reflection liquid crystal displaying element 15 (the spatial light modulating element), which are arranged in order.

The λ/4 wave plate 13 was used for reducing the contrast of light beams not parallel to the paper. The displaying element 15 generated a light beam 16b carrying image information. The light beam 16b passed through the micro-lens array 14, the λ/4 wave plate 13, the polarized beam splitter 12, then passed through a polarization plate 11b whose transmission axis is parallel to the paper, and then was projected by a projecting lens 17. An illuminance meter 18 was placed near the center of a screen (not illustrated) on which the light from the projecting lens 17 was projected. The displaying element 15 was operated to display a fully-bright image and a fully-dark image on the screen, and contrast ratios of the display device were obtained by measuring illuminations of the fully-bright image and the fully-dark image and calculating the ratio of the illuminations.

In the first experiment, first, the contrast ratio was measured with the micro-lens array 14 being not installed in the optical system in FIG. 2. Then, the contrast ratio was measured with the micro-lens array 14 being installed in the optical system, as illustrated in FIG. 2.

The measurement results showed that the contrast ratio with the micro-lens array 14 being installed was 15.6% relative to the contrast ratio when the micro-lens array 14 was not installed.

Then, the λ/4 wave plate 13 and the micro-lens array 14 were arranged in reverse order, as illustrated in FIG. 3, that is, in that portion of the spatial light modulator, the micro-lens array 14, the λ/4 wave plate 13, and the reflection liquid crystal displaying element 15 were arranged in that order. The measurement results showed that the contrast ratio in this case was 42.4% relative to the contrast ratio when the micro-lens array 14 was not installed.

Figure 4:
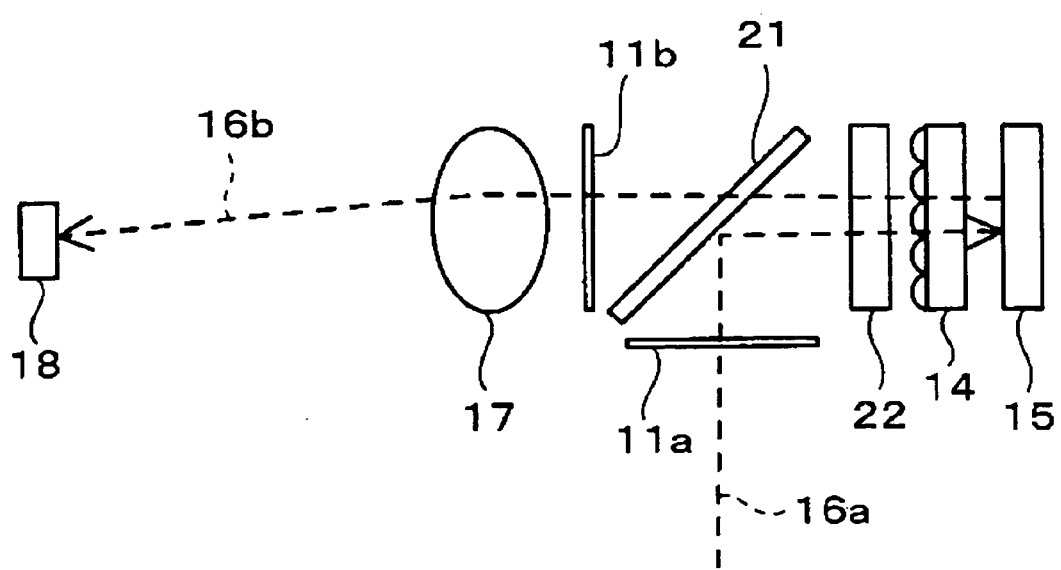
FIG. 4 is a schematic view of a display device used in the second experiment.

FIG. 4 is a view showing an optical system of a display device used in the second experiment.

Figure 5:
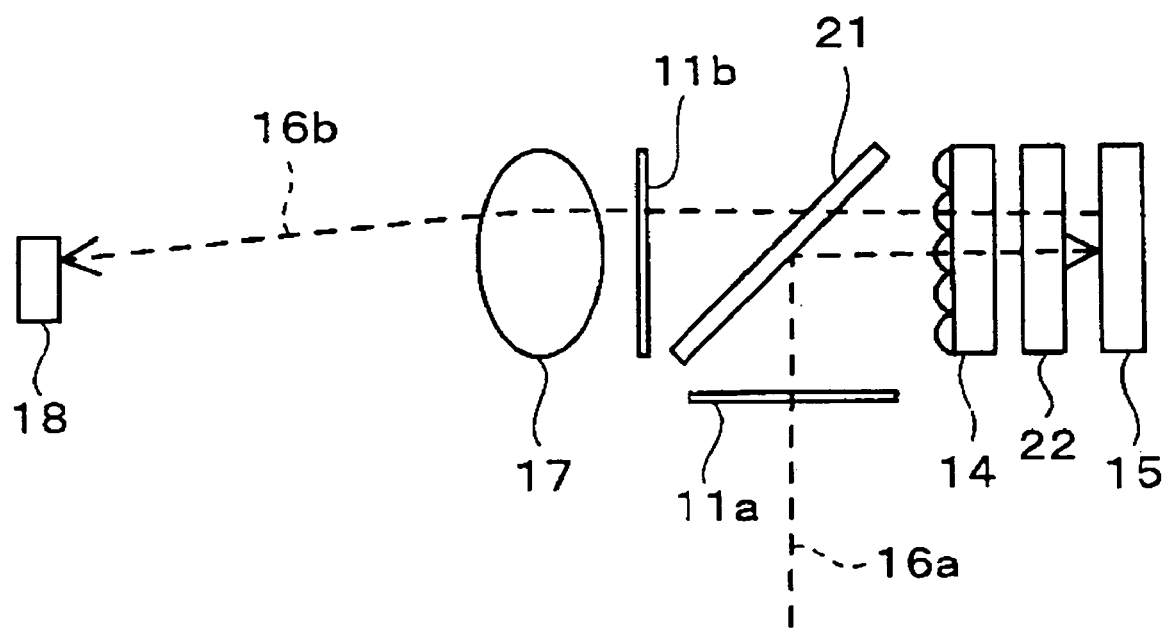
FIG. 5 is a schematic view of another display device used in the second experiment.

FIG. 5 is a view showing an optical system of another display device used in the second experiment.

In FIG. 4 and FIG. 5, the same reference numbers are used for the same constituent elements as in FIG. 2 and FIG. 3.

In the second experiment, a wire grid polarizer 21 (manufactured by Moxtek Inc., product name: Proflux) was used as the polarized-light splitting unit in the claims. A wave plate 22 shown in FIG. 4 and FIG. 5 was used for reducing a residual phase difference in the reflection liquid crystal displaying element 15. In the second experiment, the wave plate 22 gave a phase difference (retardation) of 20 nm.

Similar to the first experiment, in the second experiment, first, the contrast ratio was measured with the micro-lens array 14 being not installed in the optical system in FIG. 4. The measurement results showed that the contrast ratio in the present case was 146% relative to the contrast ratio when the beam splitter 12 was used as illustrated in FIG. 2.

Next, as shown in FIG. 4, when the micro-lens array 14 was placed between the wave plate 22 and the reflection liquid crystal displaying element 15, the measurement results showed that the contrast ratio decreased to be 21% relative to the contrast ratio without the micro-lens array 14.

Then the wave plate 22 and the micro-lens array 14 were arranged in reverse order, as illustrated in FIG. 5, that is, in that portion of the spatial light modulator, the micro-lens array 14, the wave plate 22, and the reflection liquid crystal displaying element 15 were arranged in that order. The measurement results showed that the contrast ratio increased to be 134% relative to the contrast ratio when the micro-lens array 14 was arranged in normal order.

FIG. 6 is a table summarizing the results obtained in the first and second experiments.

The experimental results revealed that reduction of the contrast ratio, which was attributed to the presence of the micro-lens array 14, was suppressed by arranging the wave plate (13 or 22) between the micro-lens array 14 and the reflection liquid crystal displaying element 15, as shown in FIG. 3 and FIG. 5. In addition, in the optical systems shown in FIG. 3 and FIG. 5, the micro-lens array 14, the wave plate 13 (or 22), and the reflection liquid crystal displaying element 15 may be integrated together.

Below, examples of specific spatial light modulators and display devices according to the present embodiment of the present invention are presented.

EXAMPLE 1

Figure 7:
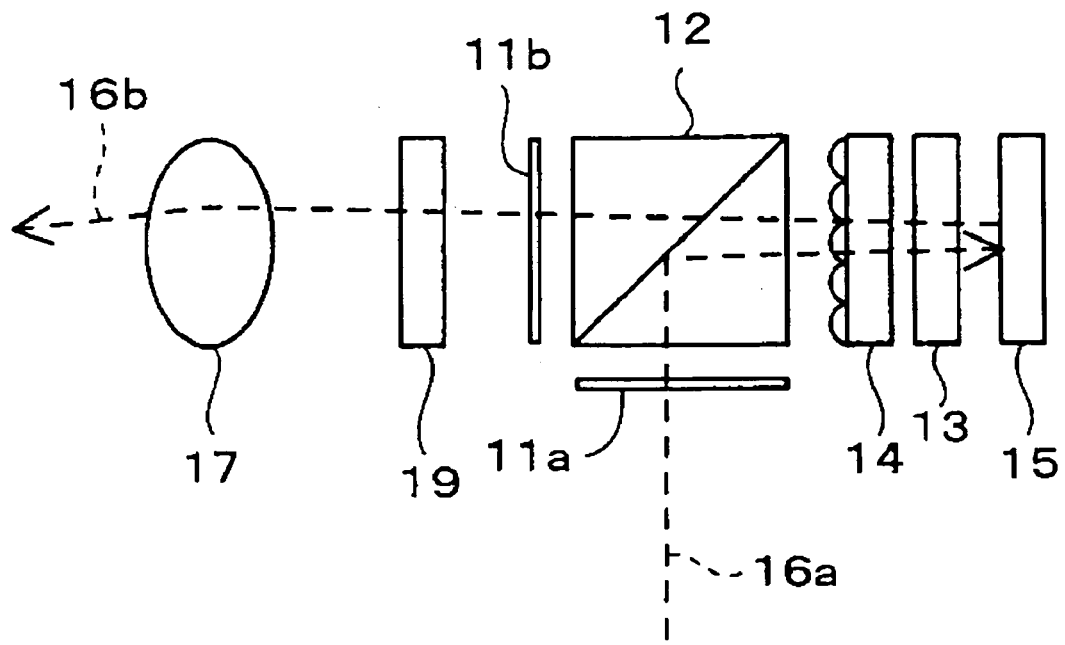
FIG. 7 is a schematic view of a first example of a display device according to the first embodiment.

FIG. 7 is a view schematically showing a first example of an optical system of a display device according to the first embodiment.

The display device in FIG. 7 includes a polarized-light splitting unit; a spatial light modulator formed by a micro-lens array 14, a wave plate 13, and a reflection liquid crystal displaying element 15; a pixel shift element 19; a projecting lens 17; and not illustrated, a light source and an illumination optical system.

For example, the light source is a discharging lamp. The illumination optical system is used to make the light emitted from the light source to irradiate uniformly, for example, the illumination optical system may be a fly's eye integrator.

The polarized-light splitting unit includes two polarization plates 11a, 11b, and a polarized beam splitter 12. The polarization plate 11a is arranged in front of the polarized beam splitter 12 along the light path with the transmission axis of the polarization plate 11a being perpendicular to the paper. The polarization plate 11b is arranged behind the polarized beam splitter 12 along the light path with the transmission axis of the polarization plate 11b being parallel to the paper. The wave plate 13 may be a λ/4 wave plate, or a birefringence plate like a liquid crystal.

The reflection liquid crystal displaying element 15 includes a light transmission substrate, a liquid crystal layer, and a reflection pixel array (pixel reflection electrode). The pixels are bi-dimensionally arranged, and by controlling the voltage on the pixels, the polarization state of the light incident on the pixels can be changed, thereby forming an image. If the pixel array and the micro-lens array 14 are arranged in the same manner, due to refraction of each lens of the micro-lens array 14 the apparent size of each pixel can be reduced.

The pixel-shift element 19 shifts the optical axis of a projected light beam by a half-pixel. For example, in the pixel-shift element 19, an orientation of parallel transparent electrodes is changed periodically by using a piezoelectric element, and in synchronization with this change, an image is displayed by the liquid crystal displaying element 15. As a result, with the pixel-shift element 19, it is possible to display pixels of a number equaling an integral multiple of the number of the pixels of the liquid crystal displaying element 15. In addition, because of the micro-lens array 14, the size of each pixel becomes small, thus overlapping of adjacent pixels is reduced.

It should be noted that the polarization plates 11a and 11b are not always necessary.

The illumination light 16a is converted by the polarization plate 11a to a beam linearly polarized perpendicular to the paper, and is reflected by the polarized beam splitter 12. After passing through the micro-lens array 14, the illumination light 16a spreads.

The λ/4 wave plate 13 is used to prevent leakage of light to the side of the projecting lens 17 when inclined light beams (light beams not parallel to the paper) are displayed as a dark image. In FIG. 7, because the λ/4 wave plate 13 is provided between the micro-lens array 14 and the liquid crystal displaying element 15, the spread of the illumination light 16a is the same as that of the projected light 16b, and the same phase difference may be added to the inclined incident light. Therefore, it is possible to prevent reduction of the contrast ratio.

The display device in FIG. 7 includes only one spatial light modulator; certainly, three spatial light modulators can be provided to display color images.

Figure 11:
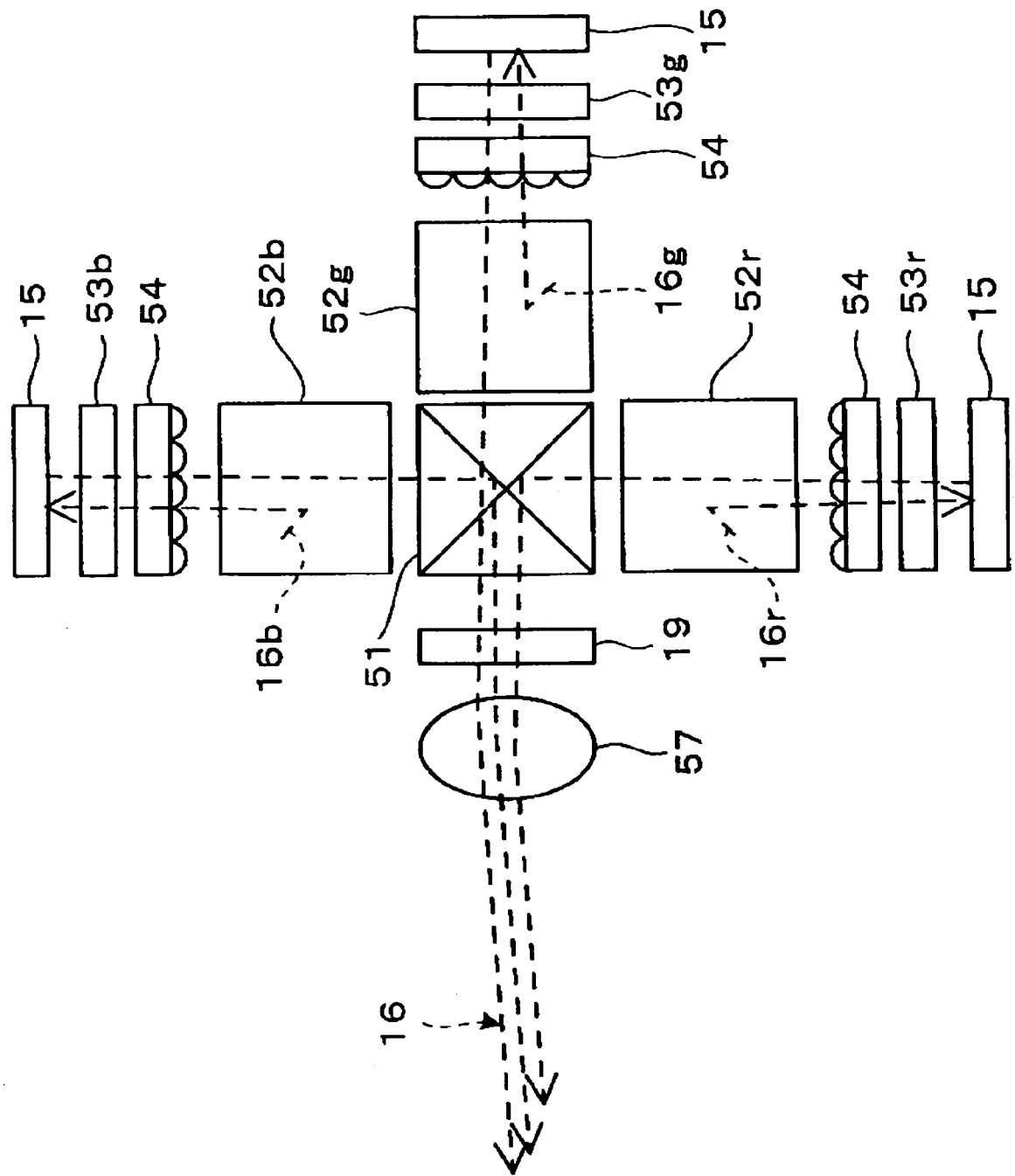
FIG. 11 is a schematic view of a display device for displaying color images.

FIG. 11 is a view schematically showing a display device for displaying color images.

In FIG. 11, a not-illustrated dichroic filter is used to decompose illumination light emitted from a white discharging lamp to red, green and blue lights 16r, 16g, and 16b. The red, green and blue lights 16r, 16g, 16b respectively pass through polarized beam splitters 52r, 52g, 52b, micro-lens arrays 54, λ/4 wave plates 53r, 53g, 53b, and the liquid crystal displaying elements 15 sequentially. The liquid crystal displaying elements 15 modulate the corresponding incident light beams according to image data, the modulated light beams pass through the corresponding polarized beam splitters 52r, 52g, 52b, and are combined by a dichroic prism 51. The combined light beam 16 passes through the pixel shift element 19 and a projecting lens 57, and is projected to a not-illustrated screen. As a result, a color image is displayed on the screen.

EXAMPLE 2

Figure 8:
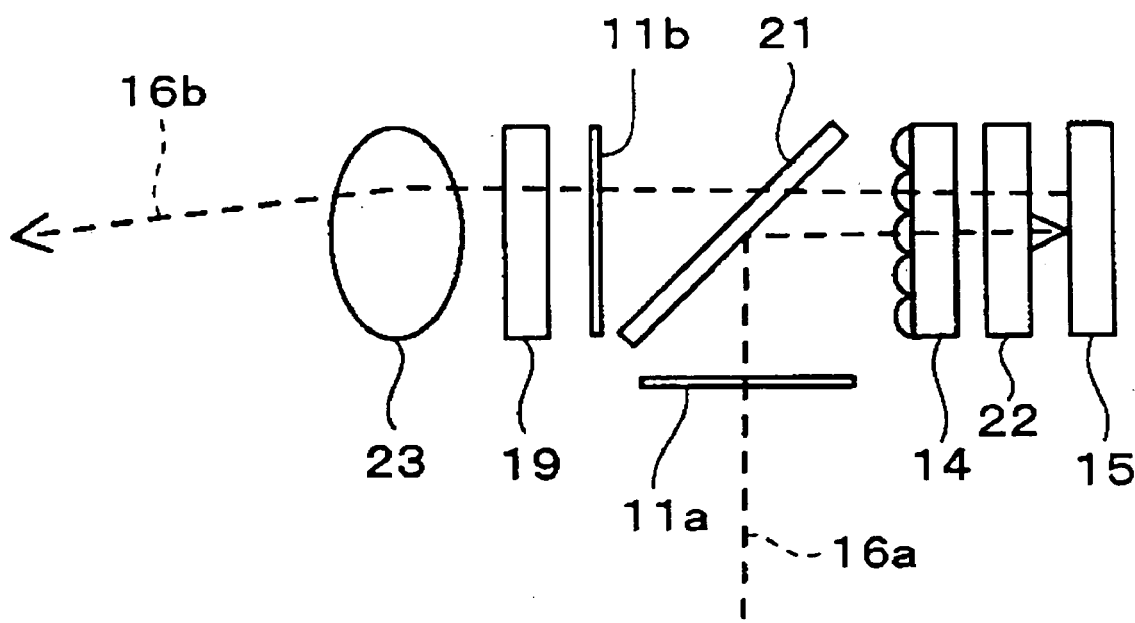
FIG. 8 is a schematic view of a second example of the display device according to the first embodiment.

FIG. 8 is a view schematically showing a second example of the optical system of the display device according to the first embodiment.

In this example, instead of the polarized beam splitter 12, the wire grid polarizer 21 is used as the polarized-light splitting unit, and instead of the λ/4 wave plates 13, the wave plate 22 having a smaller phase difference (retardation) than the λ/4 wave plates 13 is used. In addition, a lens having a long back focus length is used as a projecting lens 23. Except for the above points, the display device of this example is the same as that in the first example.

The wave plate 22 is used for reducing the residual phase difference in the liquid crystal displaying element 15, for example, the wave plate 22 gives a retardation of 20 nm. The optimum value of the retardation can be appropriately changed with the characteristics of the liquid crystal displaying element 15.

Similar to the first example, the pixel-shift element 19 is provided to periodically shift the optical axis of a projected light beam by a half-pixel, and the displayed image is updated in synchronization with this shift. As a result, it is possible to display pixels of a number equaling an integral multiple of the number of the pixels of the liquid crystal displaying element 15. In addition, because of the micro-lens array 14, the size of each pixel becomes small, thus overlapping of adjacent pixels is reduced. Further, because the wave plate 22 is arranged between the micro-lens array 14 and the liquid crystal displaying element 15, it is possible to suppress reduction of the contrast ratio, which can be attributed to presence of the micro-lens array 14.

EXAMPLE 3

Figure 9:
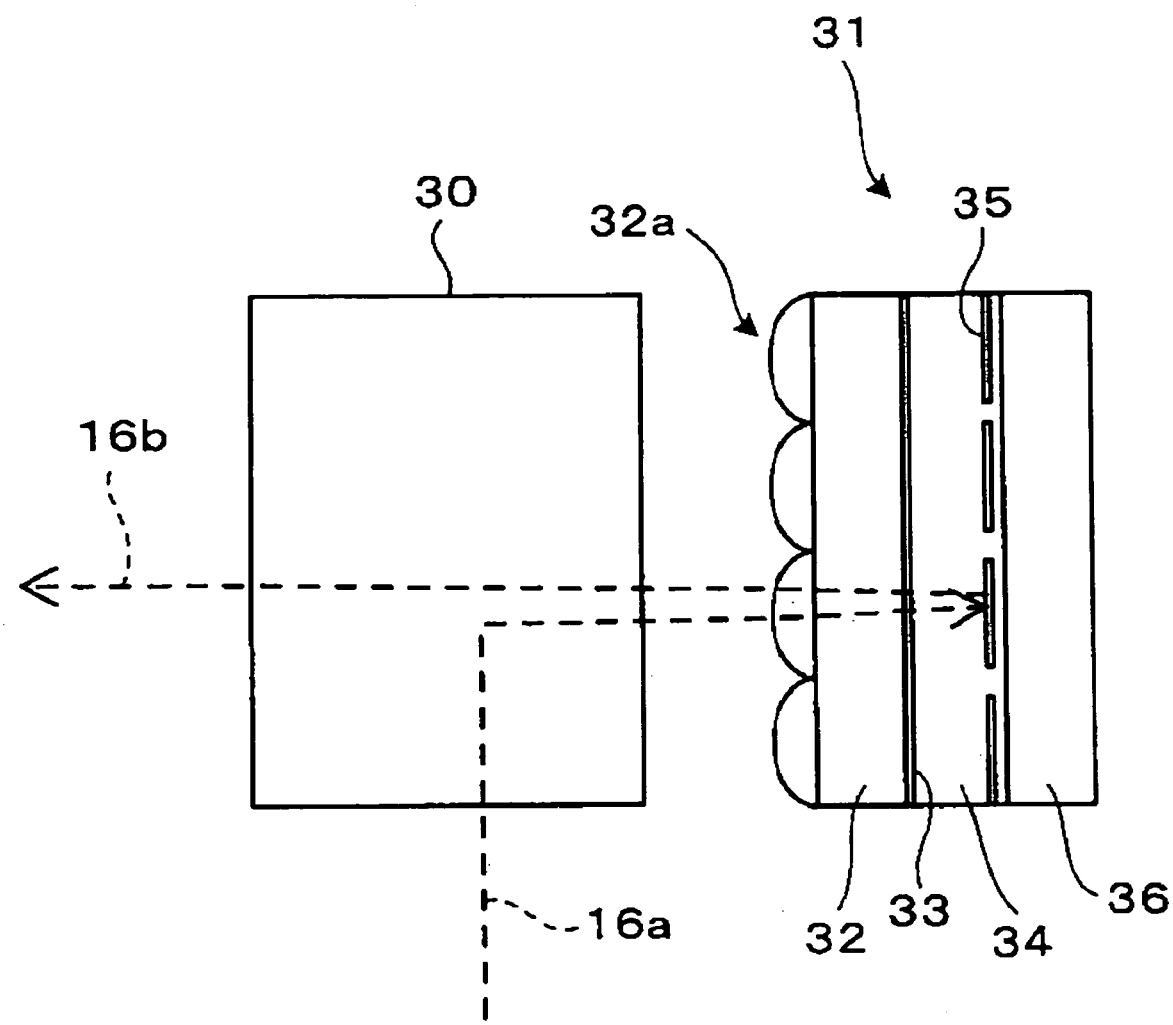
FIG. 9 is a schematic view of a third example of the display device according to the first embodiment.

FIG. 9 is a view schematically showing a third example of the optical system of the display device according to the first embodiment.

FIG. 9 illustrates an enlarged portion of the optical system including a polarized-light splitting unit 30 and a spatial light modulator 31, and other elements of the display device are omitted.

The polarized-light splitting unit 30 may be a polarized beam splitter or a wire grid polarizer.

In this example, a micro-lens array, a wave plate, and a spatial light modulation element in the spatial light modulator 31 are integrated together, for example, similar to the configuration of the spatial light modulator 101 in FIG. 1.

Specifically, the spatial light modulator 31 is a reflection liquid crystal displaying element, in which a liquid crystal layer 34 is sealed between a micro-lens array substrate 32 on which a micro-lens array 32a is formed, and a silicon substrate 36 on which pixel reflecting electrodes 35, as elements of a reflecting pixel array, are formed.

A birefringence film 33, which acts as a wave plate, is formed by oblique evaporation on the side of the micro-lens array substrate 32 adjacent to the liquid crystal layer 34.

When the polarized-light splitting unit 30 is a polarized beam splitter, the birefringence film 33 is arranged so that a slow axis or a fast axis at a retardation of λ/4 is parallel to the paper, that is, a plane including the optical axis of the illumination light 16a and the optical axis of the projected light 16b.

When the polarized-light splitting unit 30 is a wire grid polarizer, for example, the retardation of the birefringence film 33 is 22 nm.

According to the display device in this example, it is possible to display images of high resolution with a not-illustrated pixel shift element and the micro-lens array 32a. Because the wave plate is provided between the micro-lens array substrate 32 of the spatial light modulator 31 and the liquid crystal layer 34, it is possible to prevent reduction of the contrast ratio. In addition, because the micro-lens array 32a can be arranged to be very close to pixels of the liquid crystal displaying element, it is possible to reduce leakage of light from mirrors of pixels nearby even when the illumination light has a relatively large spread; hence, efficiency of light utilization is increased.

EXAMPLE 4

Figure 10:
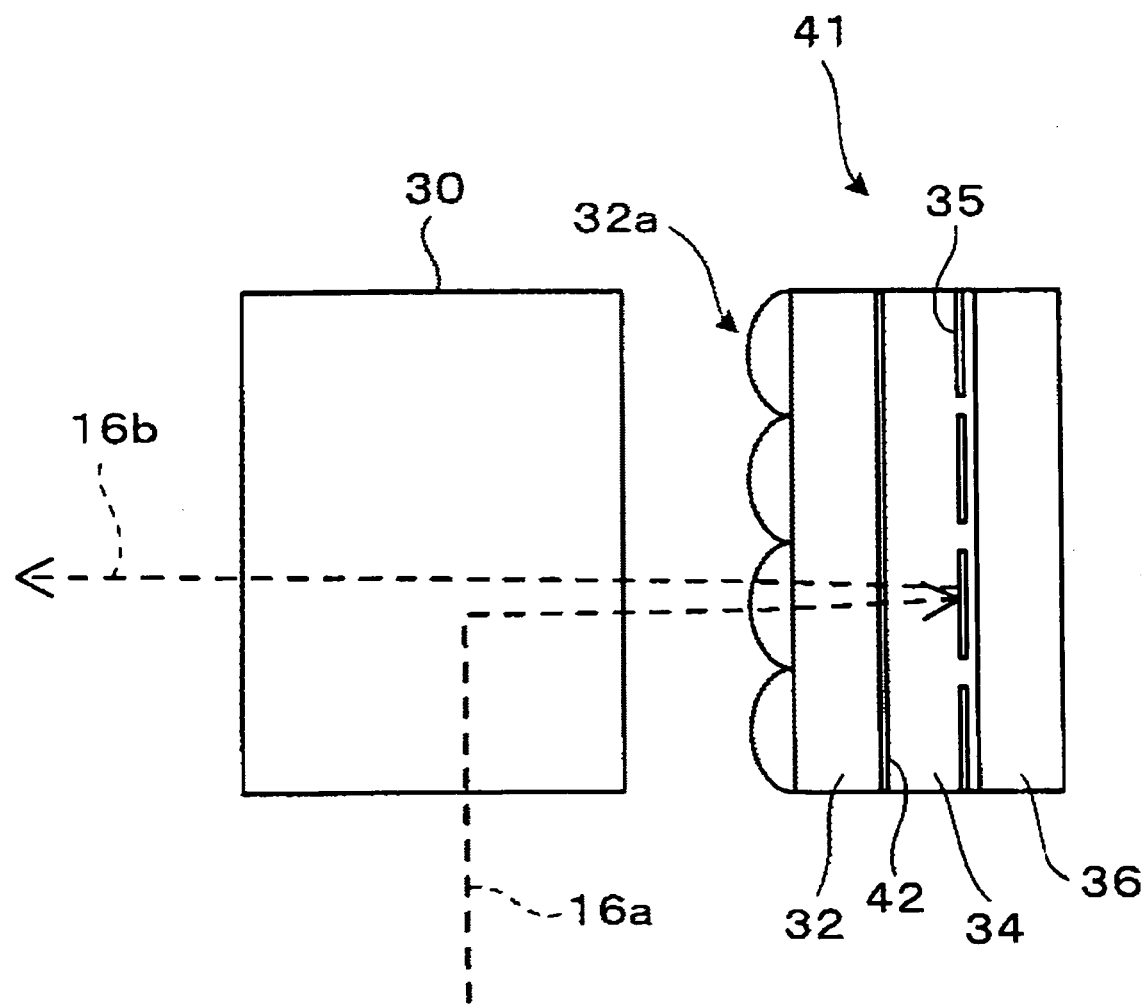
FIG. 10 is a schematic view of a fourth example of the display device according to the first embodiment.

FIG. 10 is a view schematically showing a fourth example of the optical system of the display device according to the first embodiment.

FIG. 10 illustrates an enlarged portion of the optical system including a polarized-light splitting unit 30 and a spatial light modulator 41, and other elements of the display device are omitted.

In this example, a micro-lens array, a wave plate, and a spatial light modulation element in the spatial light modulator 41 are integrated together, for example, similar to the configuration of the spatial light modulator 101 in FIG. 1.

Specifically, the spatial light modulator 41 is a reflection liquid crystal displaying element, in which a liquid crystal layer 34 is sealed between a micro-lens array substrate 32 on which a micro-lens array 32a is formed, and a silicon substrate 36 on which pixel reflecting electrodes 35, as elements of a reflecting pixel array, are formed.

A structural birefringence film 42, which acts as a wave plate, is formed on the side of the micro-lens array substrate 32 adjacent to the liquid crystal layer 34. The structural birefringence film 42 may be formed by fabricating a fine periodic structure with birefringence being given on a flat surface of the micro-lens array substrate 32. The period of fine periodic structure may be shorter than the wavelength of the incident light.

According to the display device in this example, it is possible to display images of a high resolution with a not-illustrated pixel shift element and the micro-lens array 32a. Because the wave plate is provided between the micro-lens array substrate 32 of the spatial light modulator 41 and the liquid crystal layer 34, it is possible to prevent reduction of the contrast ratio. In addition, because the micro-lens array 32a can be arranged very close to pixels of the liquid crystal displaying element, it is possible to reduce leakage of light from mirrors of pixels nearby even when the illumination light has relatively large spread, and hence, efficiency of light utilization is increased.

Second Embodiment

In the spatial light modulator or display device of the first embodiment, a phase difference member is provided between a micro-lens array of the spatial light modulator and a liquid crystal layer, and the phase difference member is a structural birefringence film or an oblique evaporation film.

In the present embodiment, the phase difference member has a fixed liquid crystal alignment, even when the phase difference member is a structural birefringence film or an oblique evaporation film. In the related art, fabrication of such kinds of phase difference members is complicated, thus resulting in high cost. The present embodiment provides a spatial light modulator that can be easily fabricated.

Figure 12:
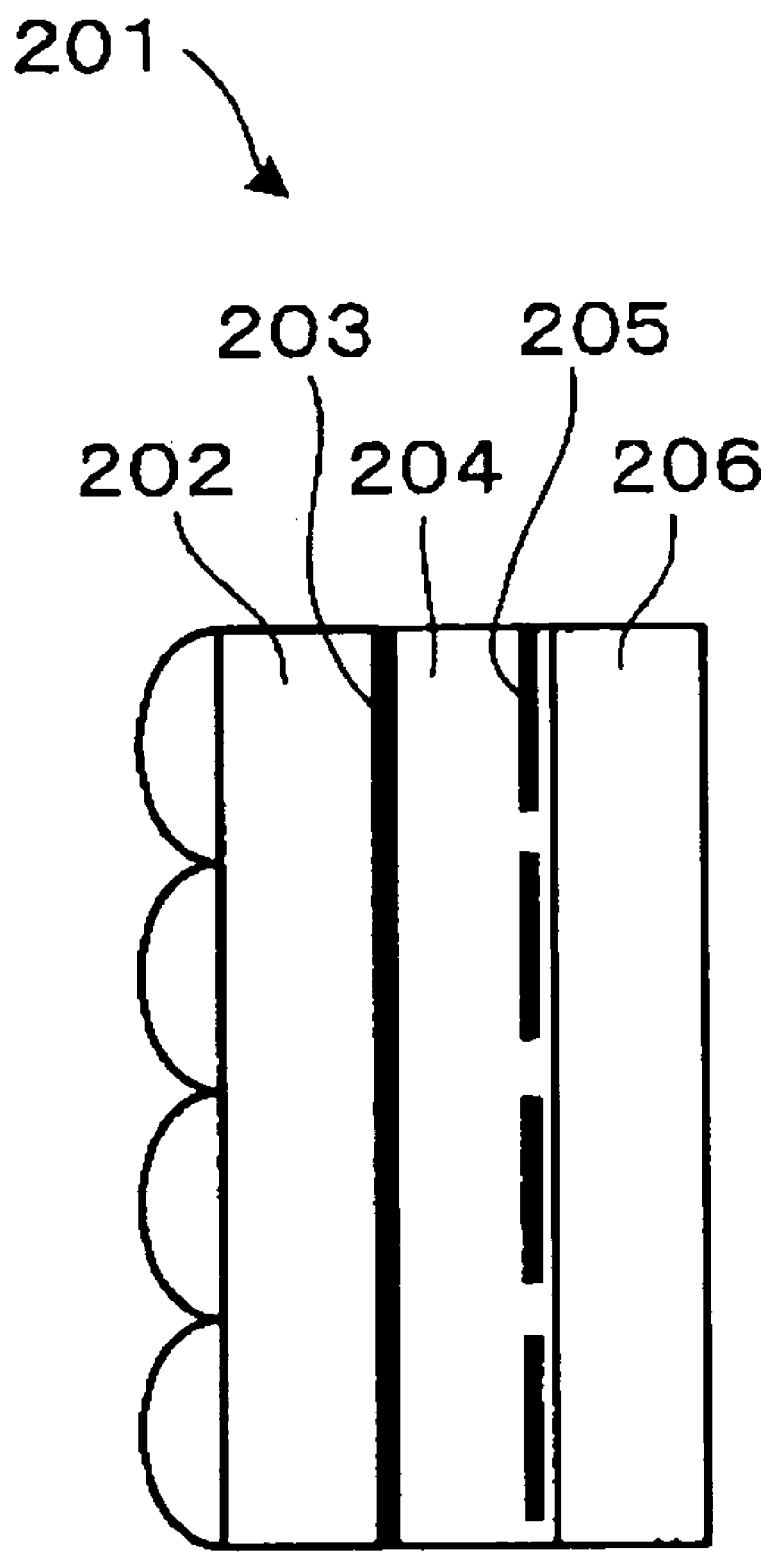
FIG. 12 is a schematic cross-sectional view of a principal portion of a spatial light modulator according to a second embodiment of the present invention.

FIG. 12 is a schematic cross-sectional view of a principal portion of a spatial light modulator according to the second embodiment of the present invention.

The spatial light modulator 201 illustrated in FIG. 12 includes a lens array substrate 202 with a micro-lens array formed thereon, a phase difference member 203, a liquid crystal layer 204 for displaying images by the electro-optic effect thereof, pixel electrodes 205, and a switching element array substrate 206 on which transistors, each acting as a switching element, are formed thereon in correspondence with pixels.

Although not illustrated, a transparent electrode for applying a voltage to the liquid crystal layer 204 and an alignment film for aligning the liquid crystal in a desired direction are formed between the phase difference member 203 and the liquid crystal layer 204. Further, an alignment film is also formed between the liquid crystal layer 204 and the pixel electrodes 205.

The micro-lens array on the lens array substrate 202 has a pitch equaling the pitch of the switching element array substrate 206, which is in turn determined by the pixel electrodes 205. In FIG. 12, light from the left side is incident on the micro-lens array, condensed by the micro-lens array, and emitted to the pixel electrodes 205. In FIG. 12, for simplicity, it is shown that the micro-lens array does not project out of the lens array substrate 202, but the micro-lens array may have any layout provided so that it can condense incident light. For example, the micro-lens array may be formed by burying materials having different refraction indices.

The phase difference member 203 is provided for compensating for a residual phase difference in the liquid crystal layer 204. In addition, when the spatial light modulator is a reflecting type, the phase difference member 203 is also used for correcting skewness of a polarized beam caused by a not-illustrated polarized beam splitter arranged on the left side of the elements in FIG. 12.

One feature of the present embodiment is that (as illustrated in FIG. 12) the phase difference member 203 is placed between the lens array substrate 202 and the liquid crystal layer 204.

The related art, for example, the aforesaid reference 1, discloses an arrangement in which the phase difference member is placed in front of (that is, on the left side of) the lens array substrate (referring to FIG. 12). In this arrangement, because of the micro-lens, the plane of polarization of the illumination light rotates, particularly with the illumination light having a large incident angle. Thus, polarization compensation cannot be performed properly, resulting in a low contrast ratio.

In contrast, in the present embodiment, these situations do not happen, and polarization compensation can be performed properly, so that a very high contrast ratio is obtainable.

For example, when the phase difference member 203 is used for compensating for the residual phase difference in the liquid crystal layer 204, even when the phase difference of the phase difference member and the incident angle relative to the phase difference member are adjusted, due to the rotation of the plane of polarization caused by the micro-lens array, the light component having a large incident angle does not fulfill the compensation conditions, and the contrast ratio decreases.

In contrast, in the present embodiment, the micro-lens array is not between the phase difference member 203 and the liquid crystal layer 204, conditions of phase compensation are satisfied, and thus a high contrast ratio can be obtained.

The switching element array substrate 206 may be a transmission array substrate including a glass substrate or a silica substrate on which a TFT (thin film transistor) array and a transparent electrode are formed. Alternatively, the switching element array substrate 206 may be a reflection array substrate including a silicon single crystal substrate on which a transistor array and a reflection electrode are formed. Especially, when the spatial light modulator is a reflecting type, which includes a reflection array substrate, because light passes through the micro-lens array forth and back, the contrast ratio degrades largely in the related art. By applying the spatial light modulator of the present embodiment, it is possible to greatly improve the contrast ratio.

Generally, the pitch of pixels is from a few micrometers to 20 micrometers.

Another feature of the present embodiment is in the phase difference member 203 itself, specifically, in addition to being arranged between the lens array substrate 202 and the liquid crystal layer 204, the phase difference member 203 has a fixed liquid crystal orientation. Preferably, retardation of the phase difference member 203 is from 10 nm to 100 nm for compensation for the residual phase difference, and is from 100 nm to 200 nm for correction of light skewness.

In the related art, the phase difference member is generally formed from a stretched polymer film, silica, or other optical crystals. When it is desired to arrange such a phase difference member 203 between the lens array substrate 202 and the liquid crystal layer 204, as illustrated in FIG. 12, for example, the phase difference member 203 should be made very thin in order to compensate for the residual phase difference, and it is very difficult to handle the film during fabrication. In addition, a very thin optical crystal film is expensive.

In the present embodiment, the phase difference member 203 has a fixed liquid crystal alignment, that is, a material able to exhibit a crystalline state is aligned when the material is in the crystalline state; after phase transitions or chemical reactions and composition changes by such as solvent evaporation, the alignment state is fixed in a solid phase, or a crystalline phase, or a glass phase. Such a phase difference member is physically and chemically stable, furthermore, this thin film can be easily fabricated by coating.

As the first example, the phase difference member 203 having a fixed liquid crystal alignment may be a polymer liquid crystal film having a fixed alignment, which is obtained by cooling an aligned polymer liquid crystal film to a glass state. Preferably, the polymer liquid crystal is a thermotropic polymer liquid crystal, and is in a glass phase at the low temperature side of the liquid crystal phase; it is an immobilized film, thus good alignment can be obtained. Preferably, the liquid crystal phase is a Nematic phase.

The aforesaid polymer liquid crystal can be formed by coating a polymer liquid crystal solution on a substrate, which is processed by alignment treatment if necessary, and drying the coated polymer liquid crystal solution. Alternatively, the aforesaid polymer liquid crystal can be formed by coating a fused polymer liquid crystal on the substrate, and aligning the polymer liquid crystal at a liquid crystal phase temperature, and then cooling the polymer liquid crystal. For example, the specific technique described in Japanese Patent Gazette No. 2784680 can be employed.

In order to achieve alignment stability, preferably, the temperature at which the polymer liquid crystal exhibits a liquid crystal phase is higher than the operational temperature of the spatial light modulator, for example, higher than 50° C. In applications in which components of the device are at a high temperature, such as a projector, preferably, the temperature is higher than 60° C., and more preferably, higher than 70° C.

Any liquid material can be used as long as the liquid material has the above properties. For example, main chain polymer liquid crystals, such as polyester, or poly-acrylates or poly-methacrylates, which have liquid crystalline radicals on the side chain, or side chain polymer liquid crystals, such as polysiloxanes, or rigid-rod main chain polymer liquid crystals, such as polypeptides, can be used.

By using a phase difference member 203 having a fixed liquid crystal alignment, which is obtained by cooling an aligned polymer liquid crystal film to a glass state, the phase difference member can be formed easily by just coating, drying, and so on. In addition, the thus obtained phase difference member has a large birefringence, and is stable due to its glass state.

As the second example, the phase difference member 203 having a fixed liquid crystal alignment may be an aligned liquid crystal polymerized film or cross-linked film having a polymerized group.

A liquid crystal including a polymerized group may be a monofunctional monomer or polyfunctional monomer having a liquid crystal skeleton, or a mixture of them, as disclosed in Japanese Laid-Open Patent Application No. 8-29618. Preferably, the liquid crystal phase is a Nematic phase.

Preferably, the liquid crystal having a polymerized group may be formed by coating a solution of a liquid crystal having a polymerized group on a substrate, which is processed by alignment treatment if necessary, and drying the coated liquid crystal solution. Alternatively, the aforesaid liquid crystal can be formed by coating a liquid crystal of a liquid crystalline phase or an isotropic phase, and aligning the liquid crystal at a liquid crystal phase temperature, and then inducing a reaction of the polymerized group.

When necessary, a thermal polymerization initiator or an optical polymerization initiator can be added to the liquid crystal having a polymerized group to be coated. To obtain a cross-linked structure, a polyfunctional monomer may be added appropriately. One of the thermal polymerization and the optical polymerization can be selected depending on the added polymerization initiator. Considering productivity and the selectable range of the temperature during polymerization, the optical polymerization is preferable.

In this way, by appropriately selecting the liquid crystal material having a polymerized group, a polymerized film is obtainable which has a stable alignment in a range of the operational temperature of the components.

A cross-linked liquid crystal may also be formed by coating a polymer liquid crystal having a cross-linked group on a substrate, and then inducing a reaction of the cross-linked group to stabilize the polymer liquid crystal. Alternatively, by using a polymer liquid crystal that performs an anisotropic thermal cross-linked reaction, and inducing a reaction of the cross-linked group through exposure with polarized light, an aligned polymer film can be obtained to act as the phase difference member 203. Such kind of examples are described by M. Shadt et al., in "Jpn. J. Appl. Phys, 34, 3240(1995)".

Furthermore, the above two methods can be combined, that is, use a cross-linked film, which is obtained from a polymer liquid crystal having a cross-linked group processed by exposure with polarized light, as an alignment film to align a polymerized liquid crystal, and induce a polymerization reaction.

By employing the aforesaid aligned liquid crystal polymerized film or cross-linked film having a polymerized group, the phase difference member can be formed easily by just coating, or drying and curing where necessary. In addition, the thus obtained phase difference member has a large birefringence and is stable because of the polymerized and stabilized structure.

In addition, by coating the aforesaid polymer liquid crystal having a cross-linked group and then inducing a reaction of the cross-linked group to stabilize the polymer liquid crystal, the phase difference member can be formed easily by just coating, or drying and curing if necessary, and alignment treatment is not necessary because of the polarization exposure treatment. In addition, the thus obtained phase difference member is stable because of the polymerized and stabilized structure. Further, when combining the above two methods, the thus obtained phase difference member can be made to have a large birefringence and a small thickness.

As the third example, the phase difference member 203 having a fixed liquid crystal alignment may be a crystal film of an aligned lyotropic liquid crystal.

As is well-known, the lyotropic liquid crystal exhibits a liquid crystal phase in a solution state. Thus, by aligning the lyotropic liquid crystal in a liquid crystal phase, evaporating the solvent, and crystallizing the lyotropic liquid crystal, an aligned liquid crystal can be obtained. This technique is described by P. Lazarev et al. in "12th International Symposium, Advanced Display Technologies: Basic Studies of Problems in Information Display (FLOWERS' 2003), August 25-28, p. 186-189(2003)".

Preferably, the lyotropic liquid crystal can be aligned by coating the lyotropic liquid crystal on an alignment film, for example, those used in a display element, and aligning the lyotropic liquid crystal, or alternatively, by coating the lyotropic liquid crystal while applying a shearing stress to the coating liquid.

The thus obtained aligned lyotropic liquid crystal, after evaporation of the solvent, becomes a crystal film having a fixed liquid crystal alignment.

The thus obtained crystal film of an aligned lyotropic liquid crystal has a very high heat resistance, and can be easily fabricated as shown above. Furthermore, it can be made to have a large birefringence but small thickness.

The phase difference member having a fixed liquid crystal alignment described in the above examples is very thin, hence it can be fabricated by directly coating the material of the phase difference member onto the micro-lens substrate or other components, or it can also be prepared separately, and then be transferred to the micro-lens substrate or other components. When the phase difference member is fabricated by direct coating, in order to obtain a spatial light modulator having a uniform and high contrast ratio, it is required that the phase difference member have a good alignment and uniform birefringence. To arrange for this, preferably, the surface of the substrate adjacent to the phase difference member may be processed by alignment treatment for aligning the liquid crystal.

Figure 13:
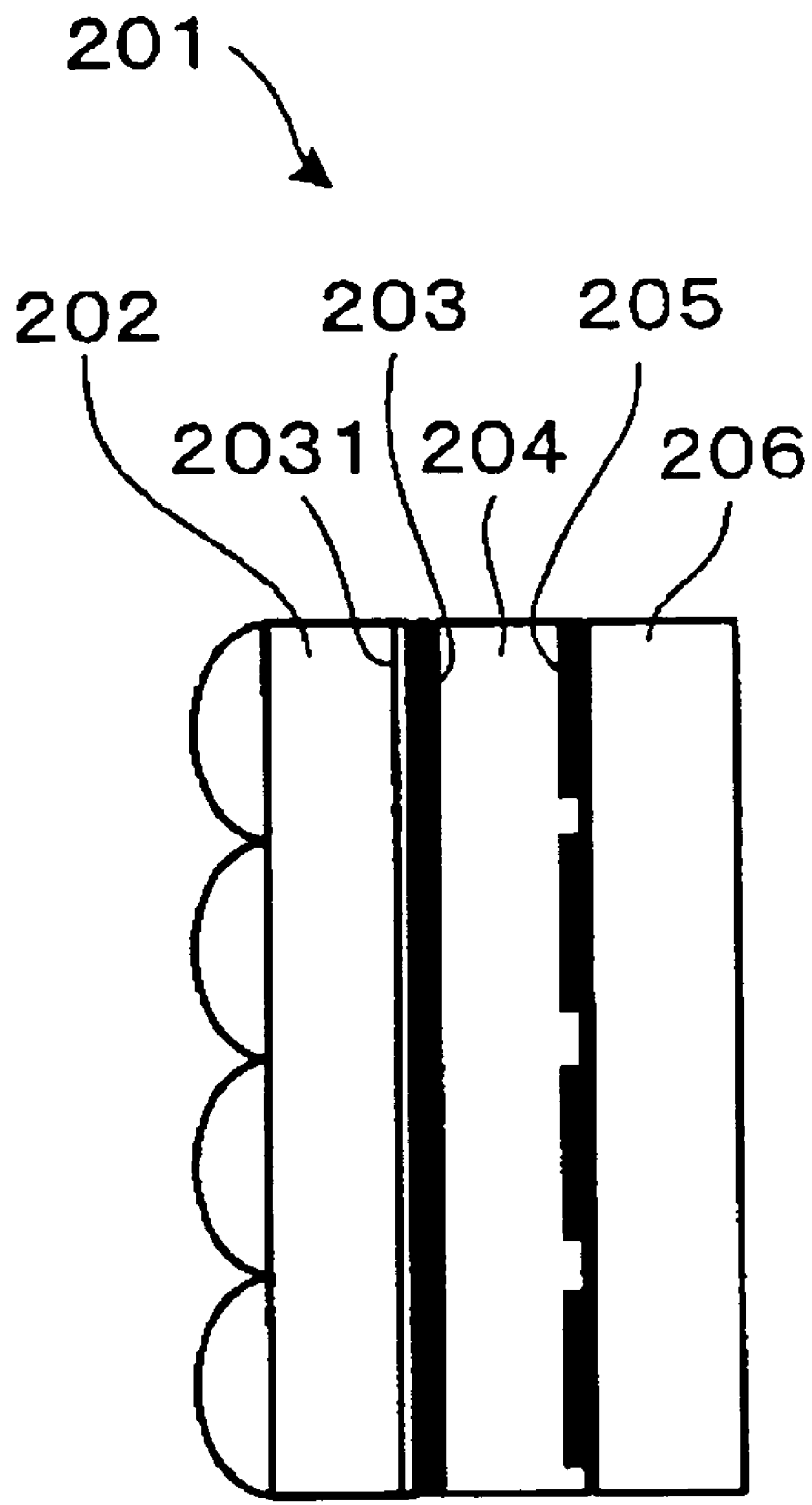
FIG. 13 is a schematic cross-sectional view of a principal portion of a spatial light modulator including a phase difference member of a fixed liquid crystal alignment according to the second embodiment of the present invention.

FIG. 13 is a schematic cross-sectional view of a principal portion of a spatial light modulator including a phase difference member of a fixed liquid crystal alignment according to the second embodiment of the present invention.

Similar to the spatial light modulator in FIG. 12, FIG. 13 illustrates a spatial light modulator 201 includes a lens array substrate 202 with a micro-lens array formed thereon, an alignment film 2031 processed by alignment treatment, a phase difference member 203 having a fixed liquid crystal alignment, a liquid crystal layer 204 for displaying images by the electro-optic effect thereof, pixel electrodes 205, and a switching element array substrate 206 on which transistors, each acting as a switching element, are formed thereon in correspondence with pixels.

Preferably, the alignment film 2031 may be a rubbing film obtained by rubbing a polyimide film or other films in one direction with a cloth, or an anisotropic polymer cross-linked or optically decomposed film treated by polarization exposure on polymer materials, or a SiO oblique evaporation film. The thickness of the alignment film 2031 depends on the materials and formation methods, and generally it is in a range from a few nanometers to 0.3 µm.

In order to transfer a separately-prepared phase difference member to the lens array substrate 202 or other components, a film having a fixed liquid crystal alignment may be formed in the same way but on a glass substrate, a metal substrate, or a resin substrate, and then the film is transferred to the lens array substrate 202 or other components. Before the transfer process, if necessary, a mold-release layer may be provided on the separate substrate, or an adhesive agent may be provided on the lens array substrate 202 or other components. In the transfer method, it is not necessary to perform alignment treatment for aligning the phase difference member 203, and a large variety of methods of coating can be selected.

In a spatial light modulator employing liquid crystal, it is necessary to provide electrodes to sandwich the liquid crystal so as to apply a voltage to the liquid crystal.

As an example, a transparent electrode may be formed on the lens array substrate 202 for applying a voltage to the liquid crystal layer 204, and the voltage is applied to the liquid crystal layer 204 through the phase difference member 203.

Figure 14:
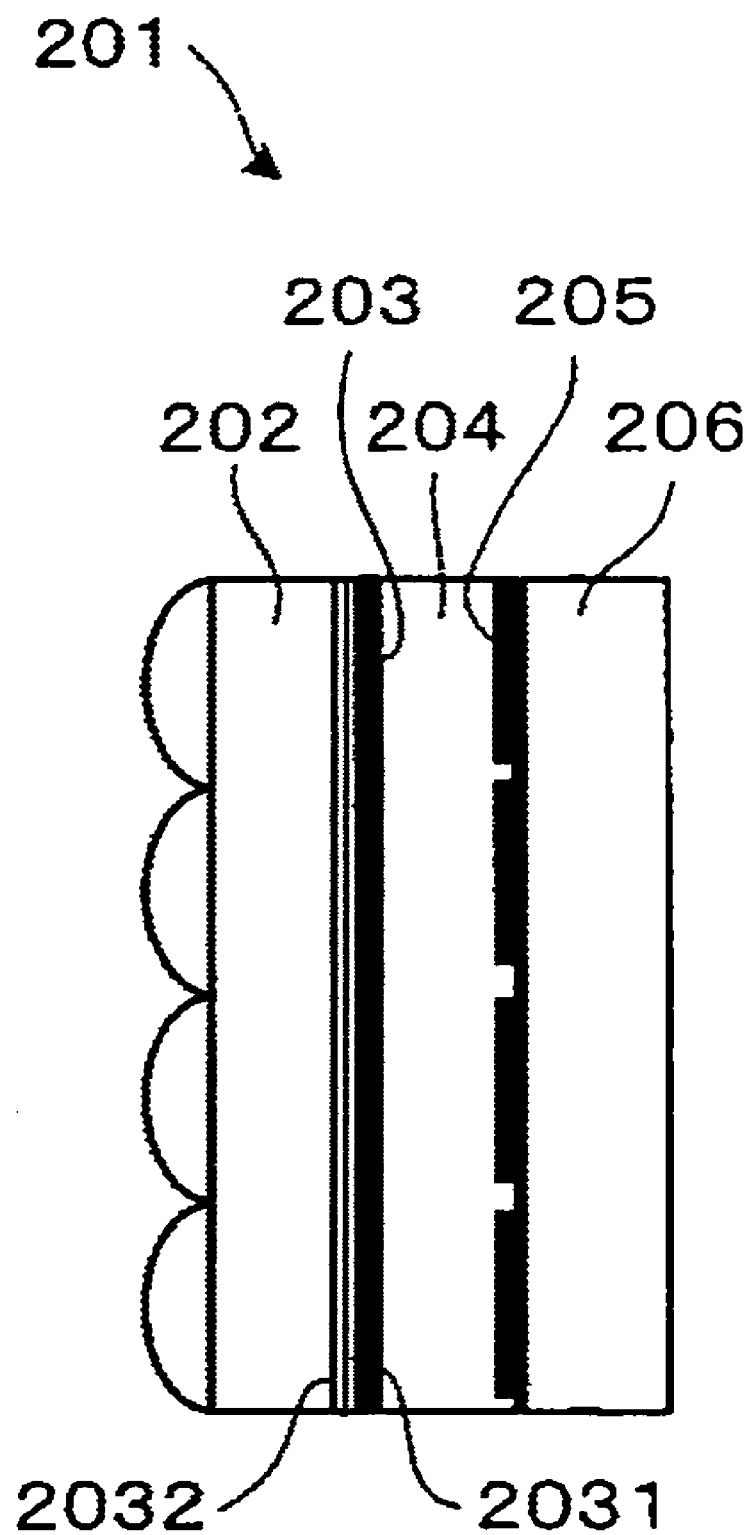
FIG. 14 is a schematic cross-sectional view of an example of a spatial light modulator according to the second embodiment of the present invention.

FIG. 14 is a schematic cross-sectional view of an example of a spatial light modulator according to the second embodiment of the present invention.

As illustrated in FIG. 14, a transparent electrode 2032 is provided between the lens array substrate 202 and the alignment film 2031, and a voltage corresponding to a potential difference between the transparent electrode 2032 and the pixel electrodes 205 is applied to the liquid crystal layer 204.

In the present embodiment, because the phase difference member 203 has a fixed liquid crystal alignment and exhibits a high alignment characteristic, it shows a large value of birefringence. For example, when the refraction anisotropy of the phase difference member 203 is 0.1, the thickness of the phase difference member 203 is 200 nm to generate a phase difference of 20 nm. This thickness is so small that there is little voltage drop even on an insulating film having such a thickness. Therefore, the small thickness of the phase difference member 203 allows a sufficiently large voltage to be applied to the liquid crystal layer 204.

In other words, a phase difference member having a fixed liquid crystal alignment is a novel structure and is superior in productivity.

Generally, the transparent electrode may be an $InO_2$ film, or a $SnO_2$ film, or an $InO_2$ film doped with $SnO_2$.

In the above configuration, if the phase difference member 203 is in contact with the liquid crystal layer 204, it is preferable that the phase difference member 203 be processed by alignment treatment for aligning the liquid crystal layer 204.

Figure 15:
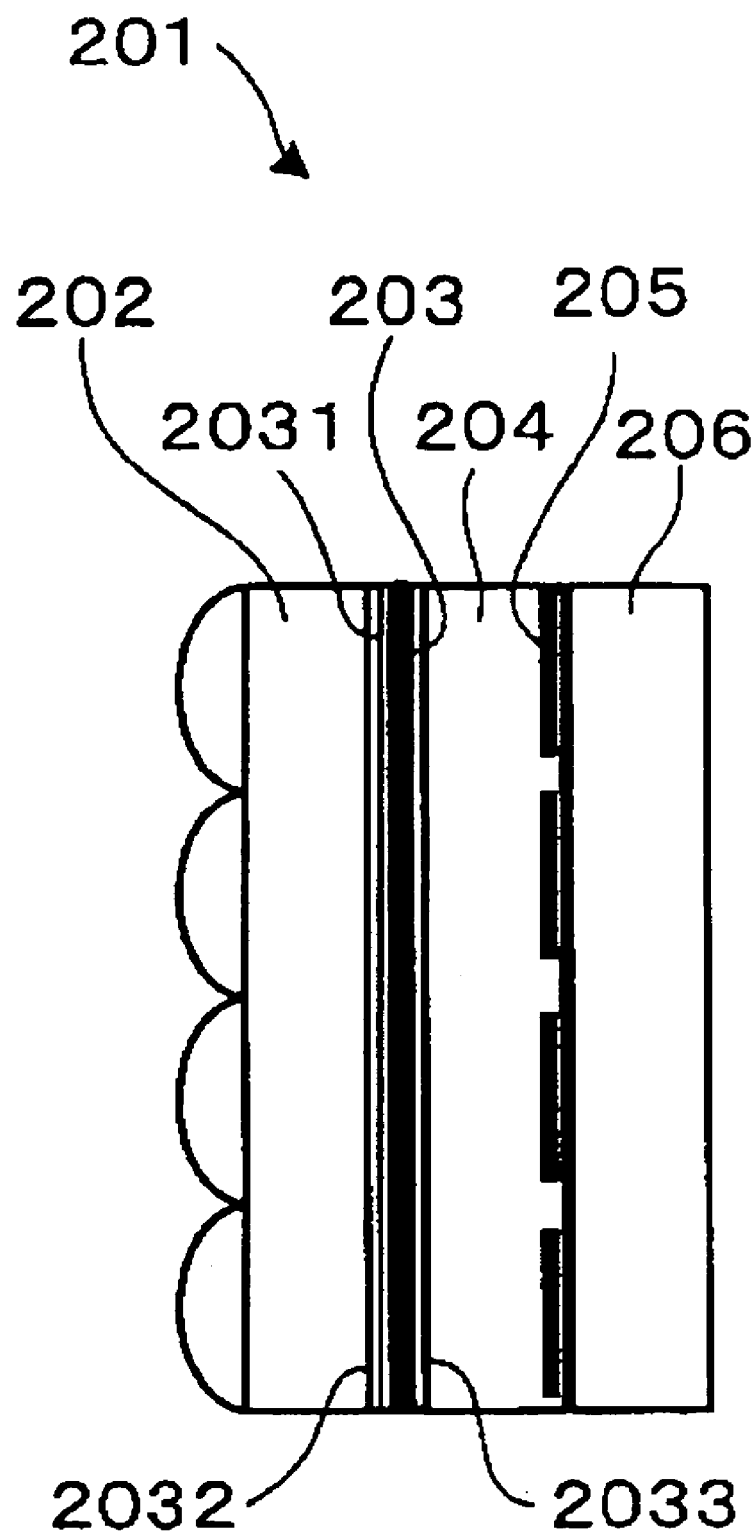
FIG. 15 is a schematic cross-sectional view of another example of the spatial light modulator according to the second embodiment of the present invention.

FIG. 15 is a schematic cross-sectional view of another example of a spatial light modulator according to the second embodiment of the present invention.

The spatial light modulator 201 illustrated in FIG. 15 includes an alignment film 2033, which has been processed by alignment treatment. When aligning the liquid crystal layer 204 in the horizontal direction, preferably, the alignment film 2033 is a rubbing film obtained by rubbing a polyimide film or other films in one direction with a cloth, an anisotropic polymer cross-linked or optically decomposed film treated by polarization exposure on polymer materials, or a SiO oblique evaporation film.

When aligning the liquid crystal layer 204 in the vertical direction, preferably, use can be made of well-known films as the alignment film 2033, for example, a vertically-aligned polyimide film, a film of a silane having a long chain alkyl group, a film of a titanate coupling agent, or a SiO oblique evaporation film. In this way, it is possible to give the liquid crystal layer 204 any kind of alignment regardless of the alignment direction of the phase difference member 203.

On the other hand, the alignment treatment may also be conducted on the phase difference member 203, for example, by subbing the surface of the phase difference member 203, or by exposing the phase difference member 203 with polarized ultraviolet rays. In this case, the alignment film 2033 can be omitted.

Figure 16:
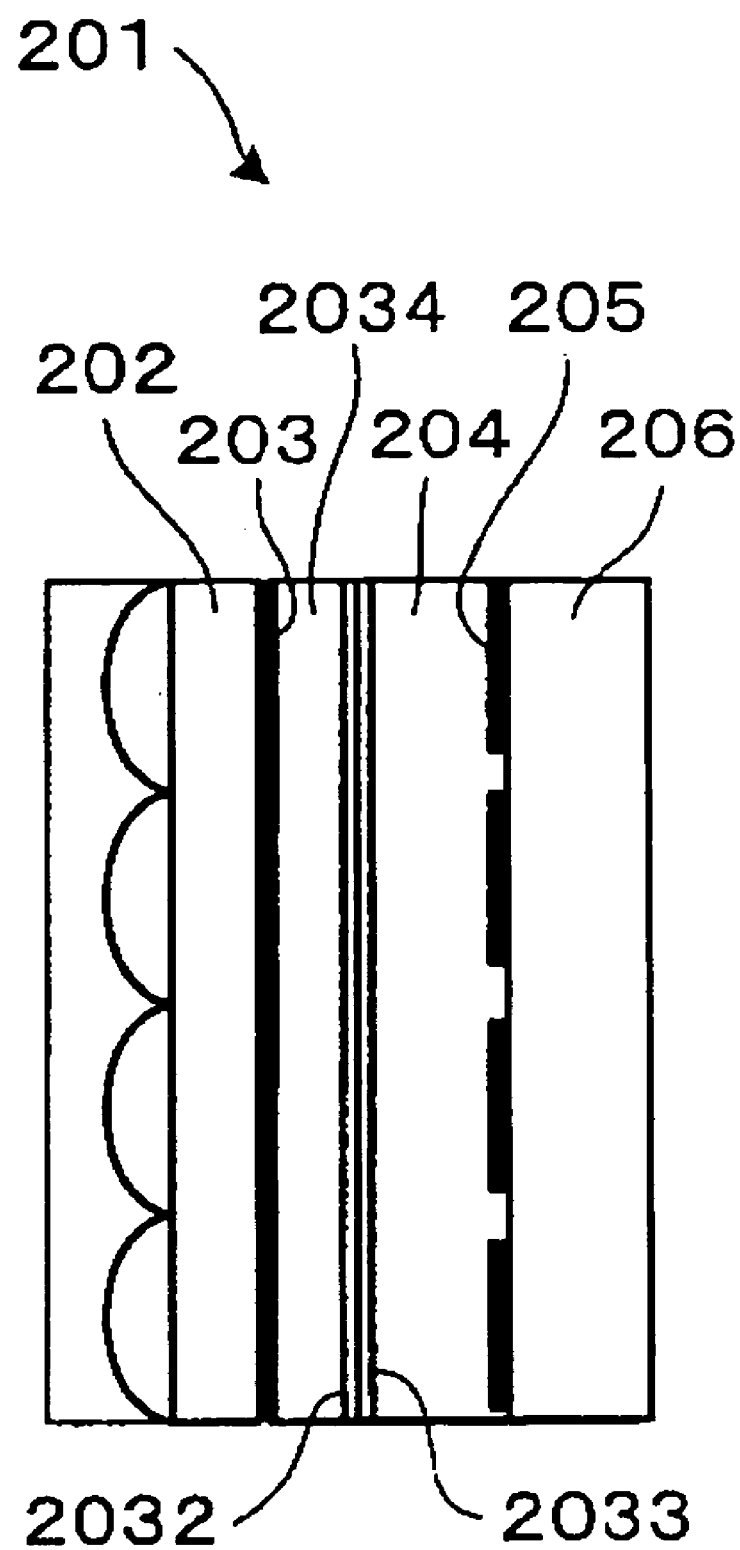
FIG. 16 is a schematic cross-sectional view of another example of the spatial light modulator according to the second embodiment of the present invention.

FIG. 16 is a schematic cross-sectional view of another example of a spatial light modulator according to the second embodiment of the present invention.

As illustrated in FIG. 16, a light transmission interlayer 2034 is provided between the lens array substrate 202 and the liquid crystal layer 204. The interlayer 2034 may be formed from a glass film, a resin film, or an oxide-based film such as a $SiO_2$ film or a $TiO_2$ film.

In this example, due to the interlayer 2034, it is possible to prevent direct contact of the phase difference member 203 and the liquid crystal layer 204. The interlayer 2034 is particularly useful when the phase difference member 203 is formed from materials apt to be dissolved by or become swelled due to the liquid crystal layer 204.

In an optical system including such a micro-lens, because the design margin is larger when the principal point of the micro-lens is closer to the liquid crystal layer, preferably, the interlayer 2034 is as thin as possible. For example, preferably, the thickness of the interlayer 2034 is from 50 nm to 100 μm, and more preferably, from 50 nm to 40 μm. If the thickness of the interlayer 2034 is too small, it becomes difficult to effectively prevent direct contact of the phase difference member 203 and the liquid crystal layer 204, on the other hand, if the thickness of the interlayer 2034 is too large, the optical characteristics of the micro-lens decline. From the point of view of easy formation of the thin film, preferably, the interlayer 2034 may be an oxide-based film formed in a vacuum, a coating film formed by coating and sintering an alkoxide precursor of an oxide-based material, or an organic material-based film formed in a vacuum or by coating.

The spatial light modulator 201 illustrated in FIG. 16 includes a transparent electrode 2032 for applying a voltage to the liquid crystal layer 204, and an alignment film 2033 for aligning the liquid crystal layer 204. The alignment film 2033 is provided when necessary. When the interlayer 2034 is thin, the transparent electrode 2032 may be provided on the side of the interlayer 2034 close to the micro-lens.

In addition, the transparent electrode 2032 may be used as the interlayer.

Figure 17:
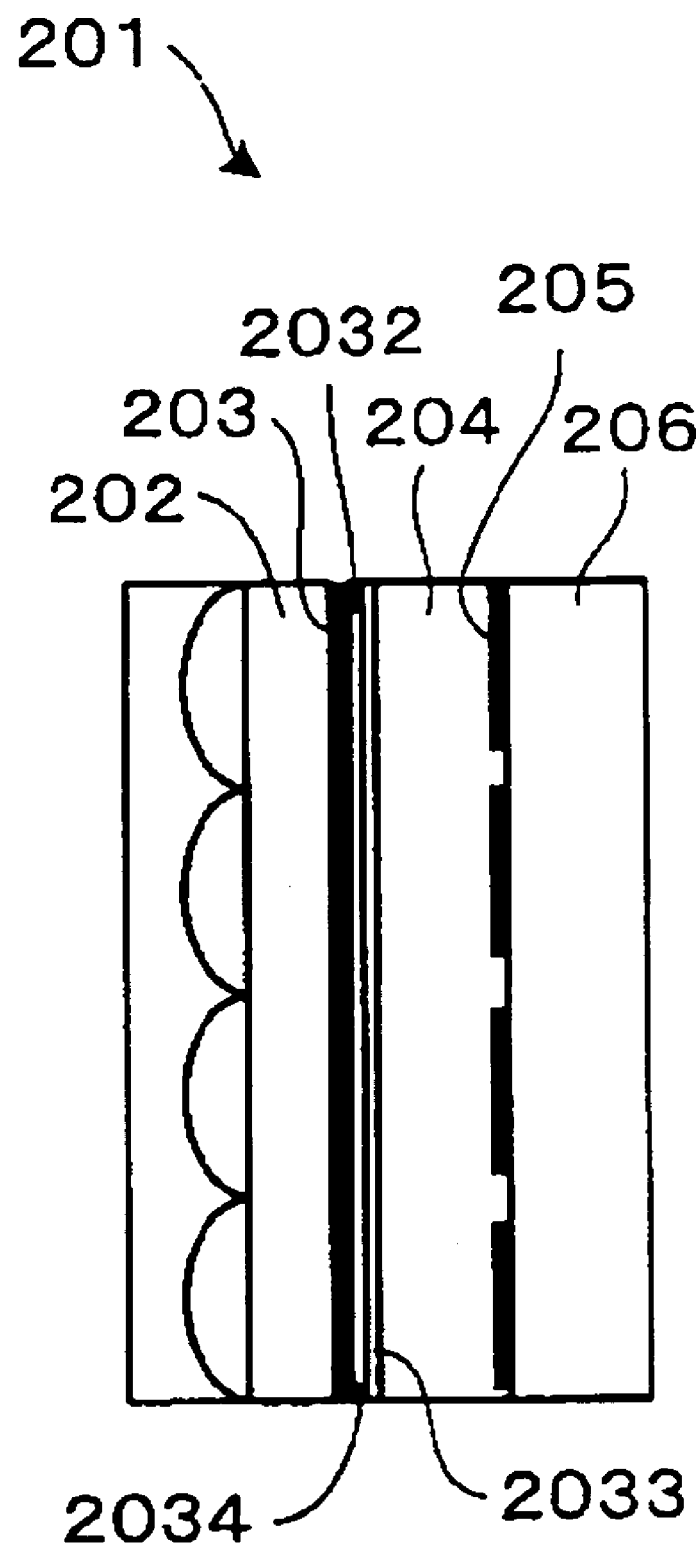
FIG. 17 is a schematic cross-sectional view of another example of the spatial light modulator according to the second embodiment of the present invention.

FIG. 17 is a schematic cross-sectional view of another example of a spatial light modulator according to the second embodiment of the present invention.

In FIG. 17, the transparent electrode 2032 also acts as the interlayer 2033.

In this example, because the principal point of the microlens can be set close to the liquid crystal layer 204, additional insulating layers are not needed between the transparent electrode 2032 and the liquid crystal layer 204; thus a voltage can be applied to the liquid crystal layer 204 effectively.

The present embodiment can be applied to both a reflecting type spatial light modulator and a transmission type spatial light modulator. Especially when applying the present embodiment to the reflecting type spatial light modulator, the angle of the light incident on the phase difference member is the same as the angle of the returning light relative to the phase difference member, so that optical compensation can be performed correctly and the contrast ratio can be improved greatly.

Preferably, the reflecting member of the pixel electrode may be Al, Ag, or alloys of them. Concerning the liquid crystal, any one can be used as long as it is able to modulate a polarized beam for displaying images. For example, a Twisted Nematic liquid crystal using a Nematic liquid crystal having a positive dielectric anisotropy, a vertical alignment liquid crystal using a liquid crystal having a negative dielectric anisotropy, or other well-known ones used in LCDs.

A display device according to the present embodiment of the present invention includes a light source for emitting illumination light, an illumination optical system for making-the illumination light to be projected uniformly, and a spatial light modulator as described above.

There is not any limitation on the light source. For example, when used in a projection display apparatus, the light source may be a discharging lamp, such as a high-pressure mercury lamp. In applications requiring low illuminance, or in applications of a head mount display, solid light sources like a light emitting diode or a semiconductor laser may be used. The illumination light from the light source is made uniform by an illumination uniformity portion, such as a fly's-eye lens or a rod integrator, is directed to the spatial light modulator, and an image-formation lens forms a real image or a virtual image.

Figure 18:
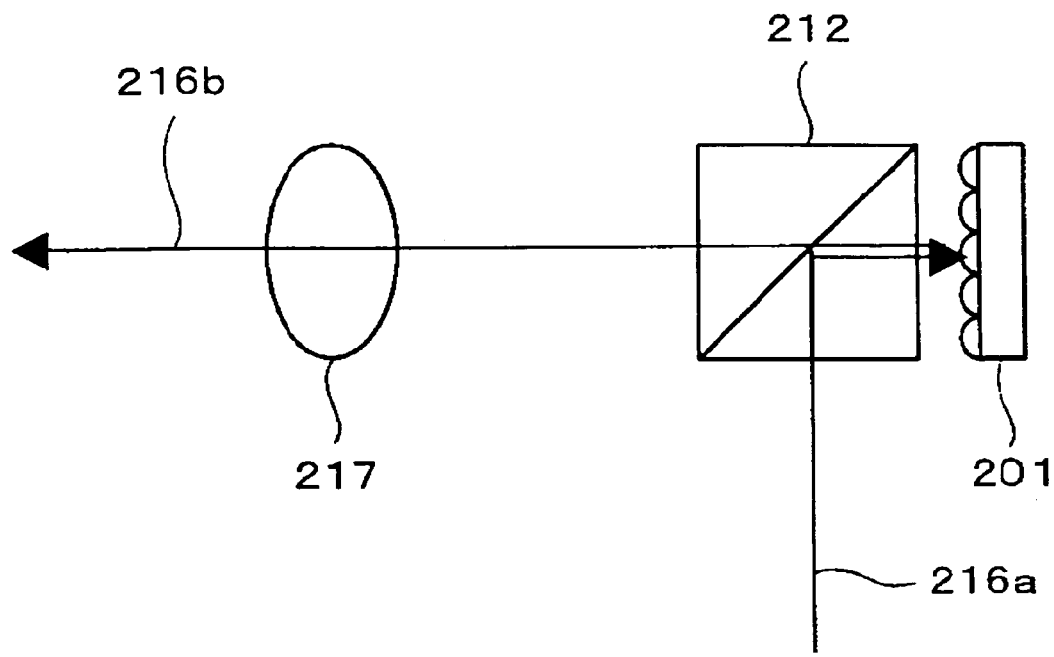
FIG. 18 is a schematic view of an example of a display device according to the second embodiment.

FIG. 18 is a schematic view of an example of a display device according to the present embodiment.

The display device illustrated in FIG. 18 includes a simple optical system employing a reflecting type spatial light modulator. A light beam 216a from a not-illustrated uniform illumination portion is directed to the reflecting type spatial light modulator 201 by a polarized beam splitter 212, and the spatial light modulator 201 is illuminated by a polarized light beam (for example, S component). The spatial light modulator 201 rotates the plane of polarization by 90 degrees and generates an image-formation light beam. The image-formation light beam passes through the polarized beam splitter 212, and forms an image by a projecting lens 217.

Although not illustrated in FIG. 18, the phase difference member 203 is installed in the spatial light modulator 201.

Figure 19:
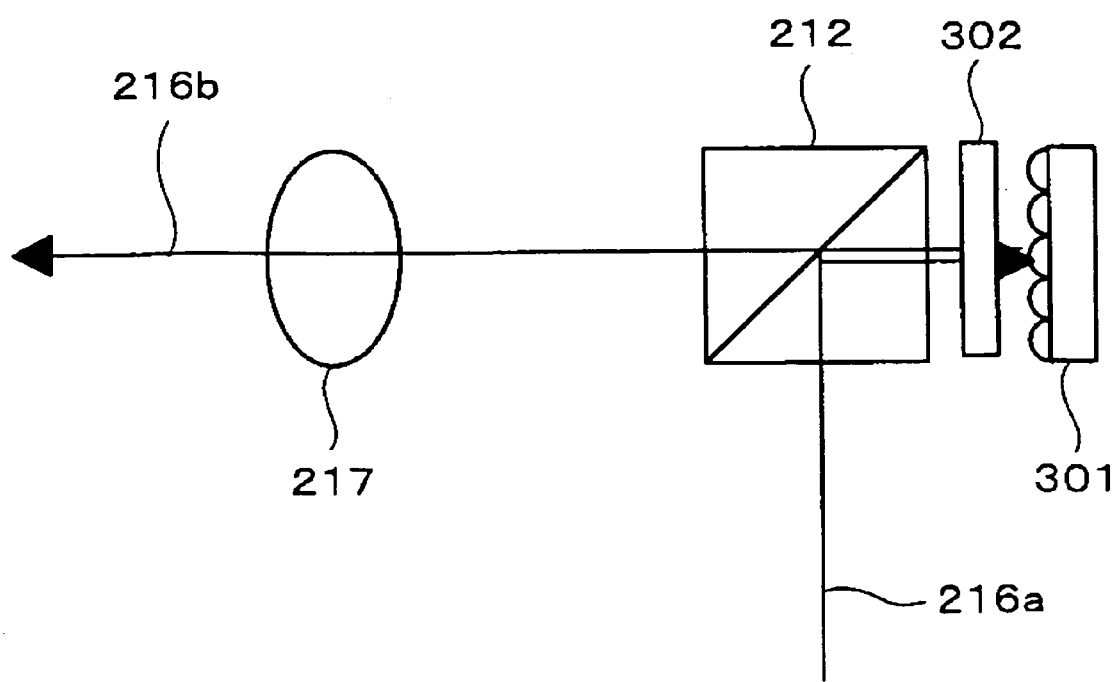
FIG. 19 is a schematic view showing a display device in the related art.

In comparison, FIG. 19 is a schematic view showing a display device of the related art.

The display device illustrated in FIG. 19 includes a spatial light modulator 301 without a phase difference member, a polarized beam splitter 212, and a phase difference member 302 that is provided between the spatial light modulator 301 and the polarized beam splitter 212.

Comparing the display devices in FIG. 18 and FIG. 19, because the phase difference member 203 is installed in the spatial light modulator 201 in FIG. 18, the phase difference member 302 shown in the related art is omitted from FIG. 18.

As described above, because of the phase difference member being in the spatial light modulator 201 in FIG. 18, optical compensation can be performed correctly. Hence, the spatial light modulator 201 gives a high contrast ratio, and a display device as configured in FIG. 18 also gives a high contrast ratio. The contrast ratio does decrease even when the incident angle is large. For this reason, an optical system having a small F value can be utilized, and a display device of high efficiency and high brightness can be provided.

In addition, because the contrast ratio does not decrease too much even when the curvature radius of the micro-lens is small, the incident light can be condensed in a region smaller than a pixel electrode. As a result, it is possible to display images without adverse influences caused by the fringe effect or other effects occurring in the region surrounding a pixel.

The display device in FIG. 18 includes only one spatial light modulator 201. Certainly, multiple spatial light modulators may be installed in the display device to form a color separation system and a color combination system to display color images.

Because the spatial light modulator of the present embodiment can condense the incident light in a region smaller than a pixel electrode, this spatial light modulator is suitable for usage in a display device including a pixel shift element arranged in the outgoing light path to shift or bend the light path.

Figure 20:
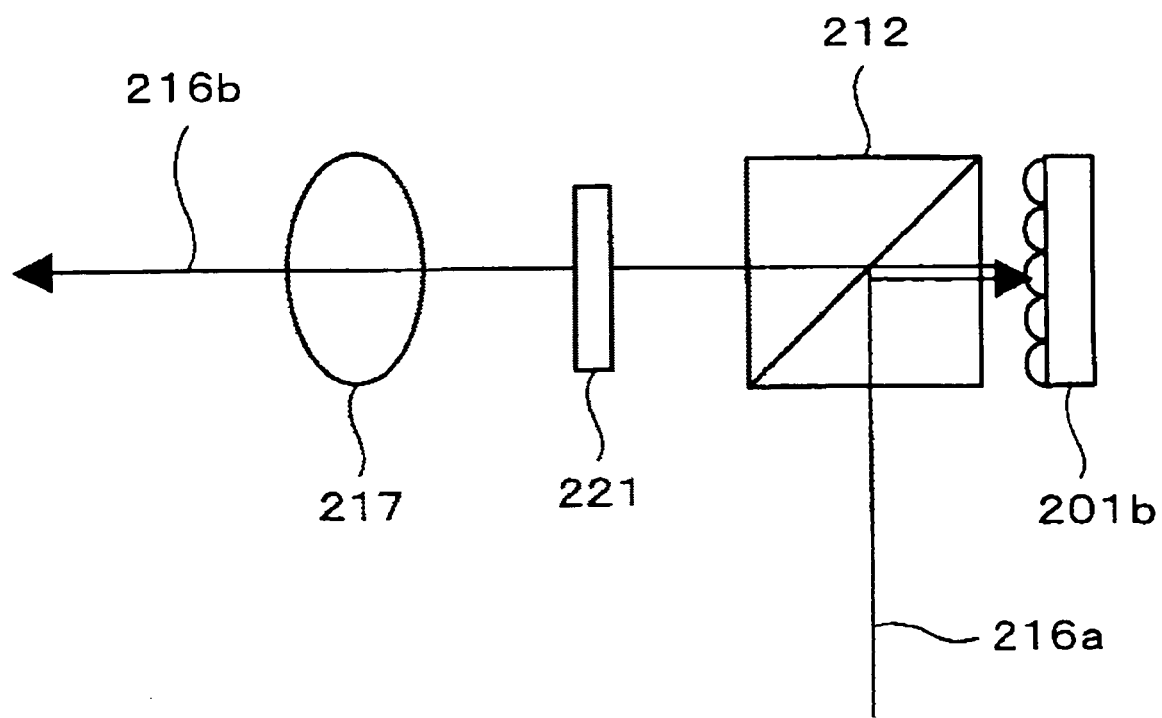
FIG. 20 is a schematic view of another example of a display device including a pixel shift element according to the second embodiment.

FIG. 20 is a schematic view of another example of a display device according to the present embodiment, which includes a pixel shift element.

The display device illustrated in FIG. 20 includes a spatial light modulator 201b, a polarized beam splitter 212, a pixel shift element 221, and a projecting lens 217. The pixel shift element 221 displays images formed from pixels downsized by a lens array in the spatial light modulator 201b while changing displaying positions of the pixels with time.

The spatial light modulator 201b is able to update the images rapidly, and it updates images which are set in correspondence with pixel positions, in synchronization with operations of the pixel shift element 221. Due to such a configuration, by changing the displaying position by half of a pixel, it is possible to display twice the number of pixels. By further shifting pixels in the vertical direction, it is possible to display four-fold the number of pixels, forming an image of high resolution.

Because the spatial light modulator of the present embodiment is able to realize a high contrast ratio and large reduction rate, by incorporating such a spatial light modulator into a display device, it is possible to display images of a high contrast ratio and a high resolution but with reduced pixel overlapping.

In the configurations described above, when the phase difference member is used for correcting skewness of a polarized beam caused by a polarized beam splitter, preferably, the phase difference member is a λ/4 wave plate, and the principal optical axis of the phase difference member is arranged to be parallel or perpendicular to the polarization direction of the illumination light parallel to the optical axis of the optical system. When the phase difference member is used for compensating for a residual phase difference of the ON state and OFF state of the liquid crystal layer, preferably, the phase difference given by the phase difference member is from a few nm to 100 nm, and the principal optical axis of the phase difference member is arranged to be inclined relative to the polarization direction of the illumination light parallel to the optical axis of the optical system.

Below, examples of the spatial light modulator and display device according to the present embodiment are presented following an example of a display device of the related art.

EXAMPLE OF DISPLAY DEVICE OF THE RELATED ART

Figure 21:
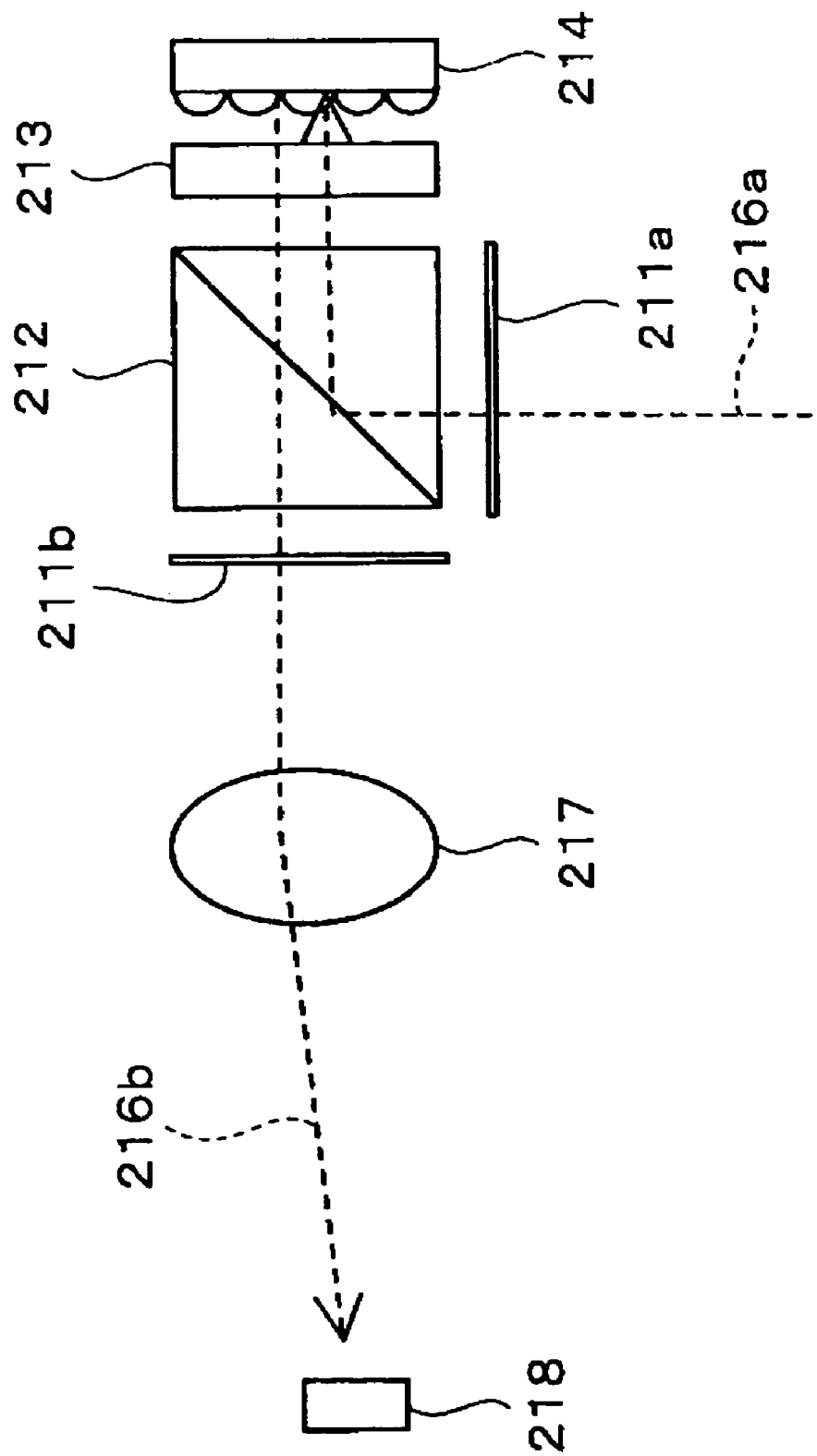
FIG. 21 is a schematic view of an example of a display device of the related art.

FIG. 21 is a schematic view of an example of a display device of the related art. Performance of the display device in FIG. 21 was studied.

The display device in FIG. 21 included a polarized beam splitter 212 as a polarized-light splitting unit, a spatial light modulator 214 having a micro-lens array thereon, a wave plate (a λ/4 wave plate) 213, a projecting lens 217, and an illuminance meter 218.

A not-illustrated dichroic filter was used to filter light emitted from a white discharging lamp to generate green illumination light 216a. A polarization plate 211a was arranged in front of the polarized beam splitter 212 with the transmission axis of the polarization plate 211a being perpendicular to the paper. The wave plate 213 and the reflecting type spatial light modulator 214 having the micro-lens array were arranged as illustrated in FIG. 21.

A light beam 216b modulated by the spatial light modulator 214 passed through the λ/4 wave plate 213, the polarized beam splitter 212, then passed through a polarization plate 211b whose transmission axis was parallel to the paper, and then was enlarged and projected by the projecting lens 217. An illuminance meter 218 was placed near the center of a screen (not illustrated) on which the light from the projecting lens 217 was projected.

The spatial light modulator 214 was operated to display a fully-bright image and a fully-dark image on the screen, and contrast ratios of the display device were obtained by measuring illuminations of the fully-bright image and the fully-dark image and calculating the ratio of the illuminations.

First, the contrast ratio was measured with the micro-lens array being not installed in the optical system. Then, the contrast ratio was measured with the micro-lens array being installed in the optical system.

The measurement results showed that the contrast ratio with the micro-lens array being present was 15.6% relative to the contrast ratio when the micro-lens array was not installed.

EXAMPLE 1

Figure 22:
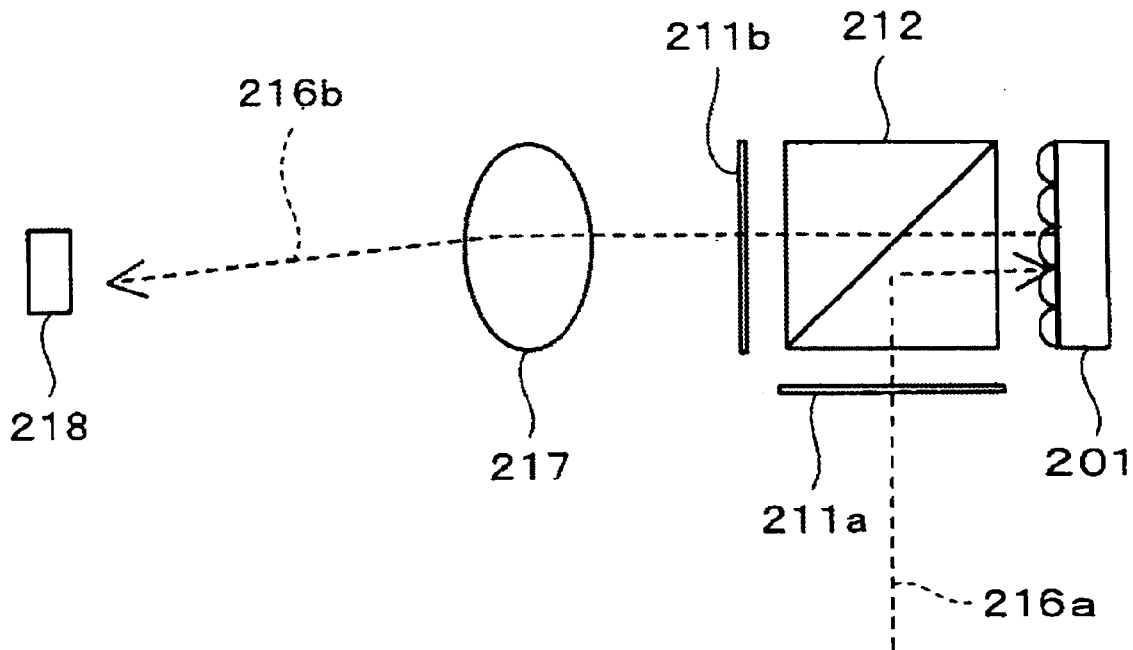
FIG. 22 is a schematic view of a first example of a display device according to the second embodiment.

FIG. 22 is a schematic view of a first example of a display device according to the present embodiment.

Performance of the display device in FIG. 22 was studied.

In the display device in FIG. 22, a reflecting type spatial light modulator 201 was installed, and a polarized beam splitter 212 was used as a polarized-light splitting unit.

A not-illustrated dichroic filter was used to filter light emitted from a white discharging lamp and to generate green illumination light 216a. A polarization plate 211a was arranged in front of the polarized beam splitter 212 with the transmission axis of the polarization plate 211a being perpendicular to the paper.

The reflecting type spatial light modulator 201 had a structure as shown in FIG. 16. In the reflecting type spatial light modulator 201, the phase difference member 203 was a 1.4 μm thick polyester-based polymer nematic liquid crystal film (the glass phase to liquid phase transition temperature is 120° C.), and was formed by coating the polyester-based polymer nematic liquid crystal onto a micro-lens substrate processed by alignment treatment using a polyimide rubbing film. The phase difference member 203 functioned as a λ/4 wave plate relative to green light.

An interlayer 2034 was formed on the surface of the phase difference member 203 by sputtering $SiO_2$ to a thickness of 200 nm. Next, a transparent electrode 2032 was formed on the interlayer 2034 by sputtering Indium Oxide to a thickness of 150 nm. Further, a polyimide film was formed on the transparent electrode and was processed by rubbing.

The spatial light modulator 201 was formed by the micro-lens array substrate 202 carrying the phase difference member 203, and the pixel electrode 205 on a silicon wafer acting as both a driving transistor and a reflecting plate. The pitches of the pixels and the micro-lens were 14 μm, and the curvature radius r of the micro-lens was r=130 μm.

The light beam 216b modulated by the spatial light modulator 201 passed through the polarized beam splitter 212, and a polarization plate 211b whose transmission axis was parallel to the paper, and then was enlarged and projected by the projecting lens 217. The illuminance meter 218 was placed near the center of the screen (not illustrated).

The spatial light modulator 201 was operated to display a fully-bright image and a fully-dark image on the screen, and contrast ratios of the display device were obtained by measuring illuminations of the fully-bright image and the fully-dark image and calculating the ratio of the illuminations.

The measurement results showed that the contrast ratio was increased to 42.4% relative to the contrast ratio when the micro-lens array was not installed.

EXAMPLE 2

Figure 23:
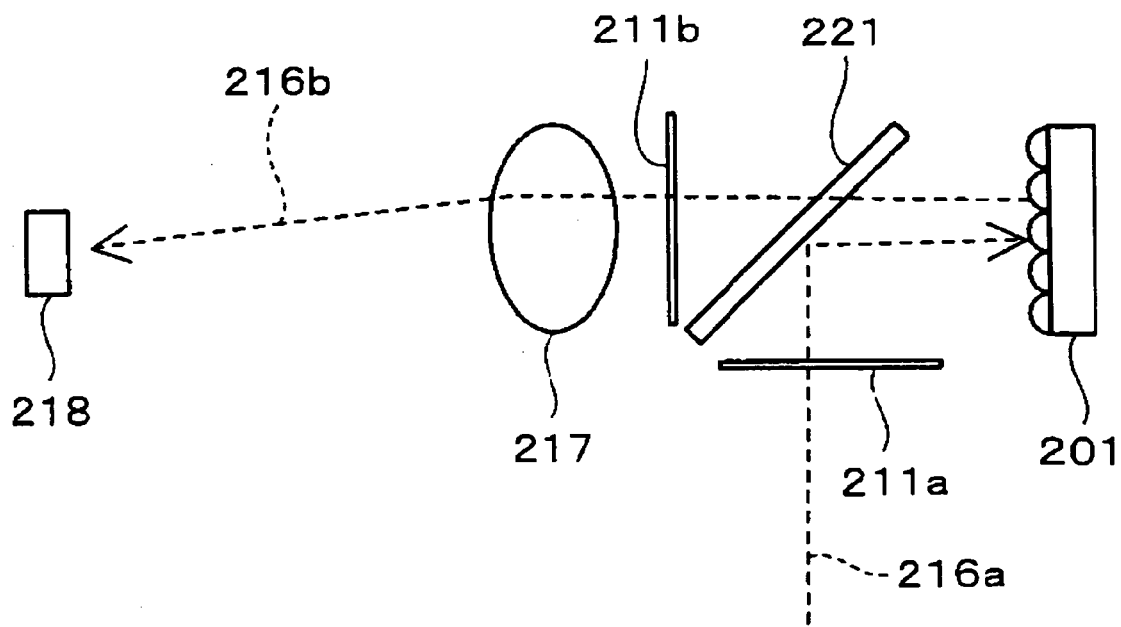
FIG. 23 is a schematic view of a second example of the display device according to the second embodiment.

FIG. 23 is a schematic view of a second example of the display device according to the present embodiment.

In this example, instead of the polarized beam splitter 212, a wire grid polarizer 221 (manufactured by Moxtek Inc., product name: Proflux) was used as the polarized-light splitting unit. The phase difference member 203 of the reflecting type spatial light modulator 201 was set to generate a phase difference of 20 nm so as to compensate for the residual phase difference of a 63.6 degrees twisted TN liquid crystal in ON state. The direction of rubbing was adjusted so as to be at 38 degrees relative the alignment direction of the liquid crystal on the incident side.

With the above configuration, the contrast ratio was first measured with the micro-lens array being not installed in the spatial light modulator 201. The measurement results showed that the contrast ratio was 146% relative to the contrast ratio when the beam splitter 12 was used and the micro-lens array was not installed.

Then, the contrast ratio was measured with the micro-lens array being installed in the spatial light modulator 201. The measurement results showed that the contrast ratio was 134% relative to the contrast ratio when the beam splitter 12 was used and the micro-lens array was installed. Further, the contrast ratio was 92% relative to the contrast ratio when the wire grid polarizer was used and the micro-lens array was not installed.

As a comparison, the contrast ratio was measured by modifying the configuration in FIG. 23. In the modified configuration, the phase difference member 203 was not installed, the micro-lens array was installed in the spatial light modulator 201, and a phase difference member having the same performance as the phase difference member 203 was placed between the wire grid polarizer 221 and the spatial light modulator 201.

The measurement results showed that the contrast ratio was decreased to 21% relative to the contrast ratio when the beam splitter 12 was used and the micro-lens array was not installed. Further, the contrast ratio was only 15% relative to the contrast ratio when the wire grid polarizer was used and the micro-lens array was not installed.

EXAMPLE 3

The third example of the display device was a modification to the second example.

In this example, the $SiO_2$ interlayer 2034 was not provided in the spatial light modulator 201. Instead, a 200 nm Indium Oxide film, acting as the transparent electrode 2032, was directly formed on the phase difference member 203. Then the alignment treatment was performed in the same way, and a spatial light modulator similar to the example 2 was obtained.

The display device of the third example showed the same optical performance as the second example.

EXAMPLE 4

The fourth example of the display device was another modification to the second example.

In this example, the phase difference member 203 of the spatial light modulator 201 was formed from a cured mixture of three polymerized liquid crystalline compounds (Tni=64.8° C.) represented by the following chemical formulae (1) to (3), and an optical polymerization initiator IRGACURE 184(0.5% weight percentage relative to the polymerized liquid crystalline compounds). This mixture was coated on the micro-lens substrate 202 processed by alignment treatment by using a polyimide rubbing film, and irradiated using ultraviolet rays at 50° C., and thus forming a phase difference member 203 having a thickness of 220 nm.

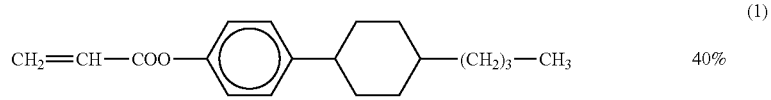

(1)

-continued

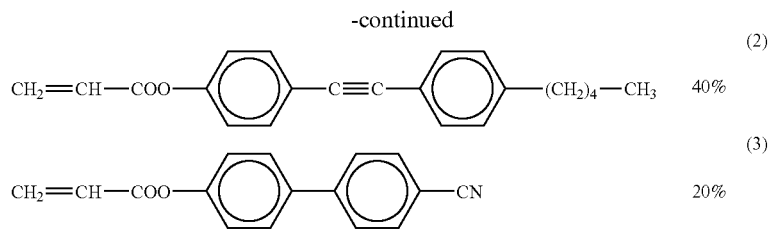

The thus formed phase difference member 203 generated a phase difference of 20 nm (Δn=0.09) relative to green light.

The interlayer 2034 was formed on the surface of the phase difference member 203 by sputtering SiO$_2$ to a thickness of 200 nm. Next, the transparent electrode 2032 was formed on the interlayer 2034 by sputtering Indium Oxide to a thickness of 150 nm. Further, a polyimide film was formed on the transparent electrode 2032 and was processed by rubbing.

The spatial light modulator 201 similar to that in the second example was formed from a transistor substrate 206, which includes the micro-lens array substrate 202 carrying the thus formed phase difference member 203, and the pixel electrode 205 on a silicon wafer acting as both a driving transistor and a reflecting plate.

Measurement results showed that the contrast ratio of the display device in the present example was 135% relative to the contrast ratio when the polarized beam splitter was used in the spatial light modulator 201 but the micro-lens array was not installed therein.

EXAMPLE 5

The fifth example of the display device was another modification to the second example.

In this example, the phase difference member 203 of the spatial light modulator 201 was formed from an aligned lyotropic liquid crystal film. A mixture of isomers represented by the following chemical formulae (4) and (5) was used as the lyotropic liquid crystal. The lyotropic liquid crystal, which was a solution of the mixture in water, was coated on the micro-lens substrate 202 by a doctor blade and was then dried, thus forming a phase difference member 203 having a thickness of 37 nm.

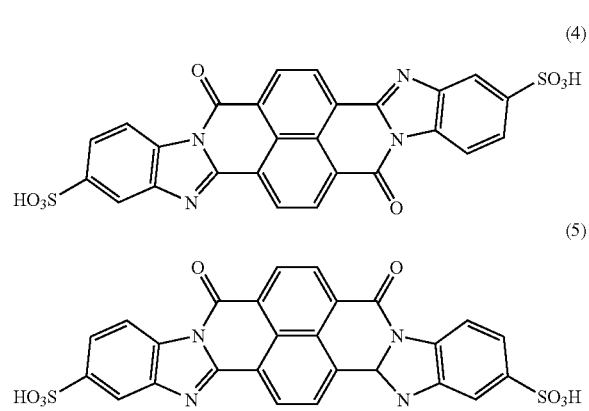

The thus formed phase difference member 203 generated a phase difference of 20 nm (Δn=0.5) relative to red light. In this way, a very thin phase difference member was obtained.

The interlayer 2034 was formed on the surface of the phase difference member 203 by sputtering SiO$_2$ to a thickness of 200 nm. Next, the transparent electrode 2032 was formed on the interlayer 2034 by sputtering Indium Oxide to a thickness of 150 nm. Further, a polyimide film was formed on the transparent electrode and was processed by rubbing.

The spatial light modulator 201 similar to that in the second example was formed from a transistor substrate 206, which includes the micro-lens array substrate 202 carrying the thus formed phase difference member 203, and the pixel electrode 205 on a silicon wafer acting as both a driving transistor and a reflecting plate.

Measurement results showed that the contrast ratio of the display device in the present example was 140% relative to the contrast ratio when the polarized beam splitter was used in the spatial light modulator 201 but the micro-lens array was not installed therein. Red light was used in this measurement.

EXAMPLE 6

The sixth example of the display device was a modification to the fourth example.

In this example, the position of the Indium Oxide film was changed. Specifically, the Indium Oxide film was disposed between the micro-lens array substrate 202 and the phase difference member 203, thus obtaining a spatial light modulator similar to that in the fourth example. With the spatial light modulator in the present example, a high contrast ratio the same as that in the fourth example was obtained.

EXAMPLE 7

The seventh example of the display device was a modification to the fifth example.

In this example, the position of the Indium Oxide film was changed. Specifically, the Indium Oxide film was disposed between the micro-lens array substrate 202 and the phase difference member 203, thus obtaining a spatial light modulator similar to that in the fifth example. With the spatial light modulator in the present example, a high contrast ratio the same as that in the fifth example was obtained.

EXAMPLE 8

The eighth example of the display device was a modification to the fourth example.

In this example, the polyimide film for aligning the interlayer and liquid crystal layer was not provided. Instead, the rubbing processing for aligning the liquid crystal was conducted on the phase difference member directly.

With the spatial light modulator in the present example, regardless of a simplified structure, a high contrast ratio the same as that in the fourth example was obtained.

EXAMPLE 9

The ninth example of the display device was a modification to the sixth example.

In this example, the polyimide film for aligning the interlayer and liquid crystal layer was not provided. Instead, the rubbing processing for aligning the liquid crystal was conducted on the phase difference member directly.

With the spatial light modulator in the present example, regardless of a simplified structure, a high contrast ratio the same as that in the fourth example was obtained.

EXAMPLE 10

The 10th example of the display device was a modification to the first example.

In this example, instead of a Nematic polymer liquid crystal, the phase difference member 203 of the spatial light modulator 201 was formed from a cured film of a polymerized liquid crystalline compound having a thickness of 1.5 μm.

The interlayer 2034 was formed on the surface of the phase difference member 203 by sputtering $SiO_2$ to a thickness of 200 nm. Next, the transparent electrode 2032 was formed on the interlayer 2034 by sputtering Indium Oxide to a thickness of 150 nm. Further, a polyimide film was formed on the transparent electrode and was processed by rubbing.

The spatial light modulator 201 similar to that in the first example was formed from a transistor substrate 206, which includes the micro-lens array substrate 202 carrying the thus formed phase difference member 203, and the pixel electrode 205 on a silicon wafer acting as both a driving transistor and a reflecting plate.

Measurement results showed that the contrast ratio of the display device in the present example was good; it was 50% relative to the contrast ratio when the polarized beam splitter was used in the spatial light modulator 201 but the micro-lens array was not installed therein. Red light was used in this measurement.

EXAMPLE 11

The 11th example of the display device was a modification to the first example.

In this example, instead of a Nematic polymer liquid crystal, the phase difference member 203 of the spatial light modulator 201 was formed from an aligned lyotropic liquid crystal film having a thickness of 0.27 μm.

The interlayer 2034 was formed on the surface of the phase difference member 203 by sputtering $SiO_2$ to a thickness of 200 nm. Next, the transparent electrode 2032 was formed on the interlayer 2034 by sputtering Indium Oxide to a thickness of 150 nm. Further, a polyimide film was formed on the transparent electrode and was processed by rubbing.

The spatial light modulator 201 similar to that in the first example was formed from a transistor substrate 206, which includes the micro-lens array substrate 202 carrying the thus formed phase difference member 203, and the pixel electrode 205 on a silicon wafer acting as both a driving transistor and a reflecting plate.

Measurement results showed that the contrast ratio of the display device in the present example was good; it was 50% relative to the contrast ratio when the polarized beam splitter was used in the spatial light modulator 201 but the micro-lens array was not installed therein. Red light was used in this measurement.

EXAMPLE 12

The 12th example of the display device was a modification to the 11th example.

In this example, the Indium Oxide film was disposed on the micro-lens array substrate 202, and the interlayer and the alignment layer were not provided. In thus formed spatial light modulator, even though the alignment layer was not provided, the liquid crystal layer was aligned along the alignment direction of the phase difference member, and because the phase difference member was thin, a voltage could be applied on the liquid crystal layer without any difficulty.

With the spatial light modulator in the present example, a contrast ratio same as that in the 11th example was obtained.

EXAMPLE 13

The 13th example of the display device was a modification to the first example.

In this example, the polymer nematic liquid crystal was formed on another rubbed polyimide film, and was superposed on the micro-lens substrate 202 coated with a UV-curable adhesive agent. The polymer nematic liquid crystal was cured by irradiating the ultraviolet rays, and then the polyimide film was removed; thereby a polymer nematic liquid crystal of fixed alignment was transferred to the micro-lens substrate 202. Thereafter, a spatial light modulator was fabricated in a way similar to that in the first example.

With the spatial light modulator in the present example, a contrast ratio same as that in the first example was obtained. This implies that the transfer method is applicable.

EXAMPLE 14

Figure 24:
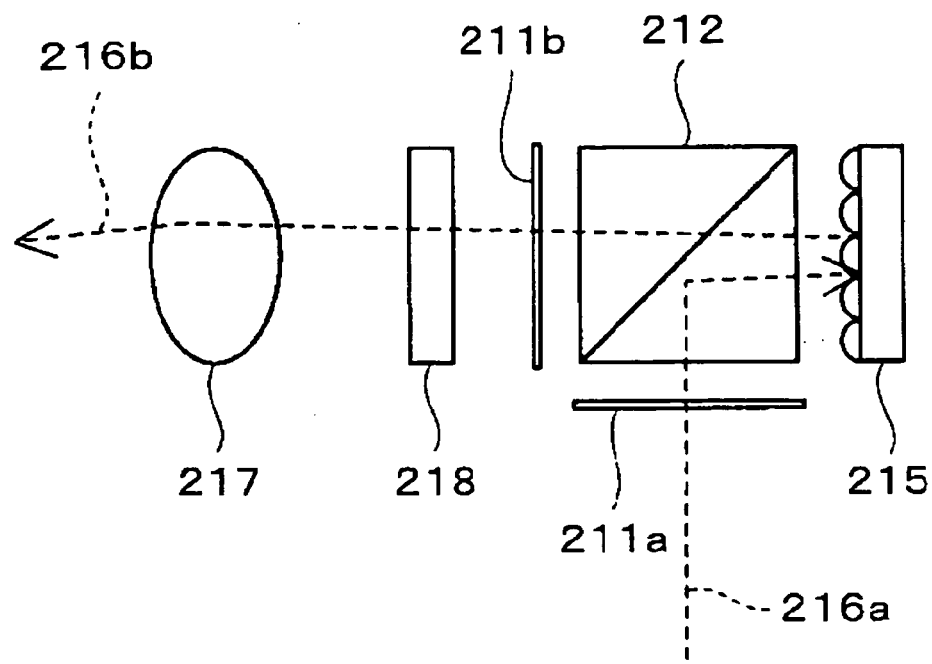
FIG. 24 is a schematic view of a 14th example of the display device according to the second embodiment.

FIG. 24 is a schematic view of a 14th example of the display device according to the present embodiment.

The display device in FIG. 24 includes a polarized-light splitting unit, a spatial light modulator 215 having reflection liquid crystal displaying elements each including a micro-lens array and a phase difference member, a phase shift element 218, a projecting lens 217, a not illustrated light source and a not illustrated illumination optical system.

For example, the light source is a discharging lamp. The illumination optical system is used to make the light emitted from the light source to irradiate on the spatial light modulator 215 uniformly. For example, the illumination optical system may be a fly's eye integrator.

The polarized-light splitting unit includes two polarization plates 211a, 211b, and a polarized beam splitter 212. The polarization plate 211a is arranged in front of the polarized beam splitter 212 along the light path with the transmission axis of the polarization plate 211a being perpendicular to the paper. The polarization plate 211b is arranged behind the polarized beam splitter 212 along the light path with the transmission axis of the polarization plate 211b being parallel to the paper.

The phase difference member in the spatial light modulator 215 may be a λ/4 wave plate. In this example, the phase difference member is the same as that in the first example of the embodiment. In addition, the arrangement of the pixel array, which is formed from pixel electrodes, is in the same manner as the arrangement of the micro-lens array.

In the spatial light modulator 215, light emitted from the reflection pixels of the liquid crystal displaying elements is refracted by each lens of the micro-lens array, and focused and reflected. By controlling the focus position of the projecting lens 217, the pixels of the liquid crystal displaying elements can be optically made small.

The pixel-shift element 218 shifts the optical axis of a projected light beam by a half-pixel. For example, as disclosed in Japanese Laid-Open Patent Application No. 2002-328402, the pixel-shift element 218 is formed from ferroelectric liquid crystal aligned in the vertical direction. In synchronization with the timing of pixel shift in the pixel-shift element 218, images are displayed by the liquid crystal displaying element of the spatial light modulator 215. As a result, with the pixel-shift element 218, it is possible to display pixels of a number equaling an integral multiple of the number of the pixels of the liquid crystal displaying element of the spatial light modulator 215. In addition, because of the micro-lens array, the size of each pixel becomes small; thus, overlapping of adjacent pixels is reduced. It should be noted that the polarization plates 211a and 211b are not always necessary.

In FIG. 24, the illumination light 216a is converted by the polarization plate 211a to a linear polarized beam perpendicular to the paper, and is reflected by the polarized beam splitter 212. After passing through the micro-lens array of the spatial light modulator 215, the illumination light 216a spreads.

The phase difference member is used to prevent leakage of light to the side of the projecting lens 217 when inclined light beams (light beams not parallel to the paper) are displayed as a dark image. In the present example, because a $\lambda/4$ wave plate is used as the phase difference member, and is provided between the micro-lens array and the liquid crystal displaying element, the spread of the illumination light 216a is the same as that of the projected light 216b, and the same phase difference is added to the inclined incident light. Therefore, as revealed by the aforesaid examples, it is possible to prevent reduction of the contrast ratio.

The display device in FIG. 24 includes only one spatial light modulator. Certainly, three spatial light modulators can be provided to display color images, as illustrated in FIG. 11.

Specifically, a not-illustrated dichroic filter is used to decompose white illumination light emitted from a not illustrated light source and a not illustrated illumination optical system to red, green and blue lights 16r, 16g, and 16b. The red, green and blue lights 16r, 16g, 16b respectively pass through polarized beam splitters 52r, 52g, 52b, micro-lens arrays 54, $\lambda/4$ wave plates 53r, 53g, 53b, and the liquid crystal displaying element 15 sequentially. The liquid crystal displaying element 15 modulates the incident light beams according to image data to be displayed, and the modulated light beams pass through the corresponding polarized beam splitters 52r, 52g, 52b, and are combined by a dichroic prism 51. The combined light beam 16 passes through the pixel shift element 19 and a projecting lens 57, and is projected to a not-illustrated screen. As a result, a color image is displayed on the screen.

In addition, in the optical systems shown in FIG. 11, the micro-lens arrays 54, the $\lambda/4$ wave plates 53r, 53g, 53b, and the liquid crystal displaying elements 15 may be integrated together to be the spatial light modulators 215, which act for the red, green and blue lights. For example, use can be made of the spatial light modulator described in the first example, or alternatively, the spatial light modulators described in other examples, which have built-in phase difference members. Particularly, a spatial light modulator having a built-in $\lambda/4$ wave plate can be used.

According to display device of the present example, as described above, the contrast ratio is improved greatly, and by the micro-lens array, the size of a pixel is reduced to be about 60% of its normal size. In practical experiments using the display device shown in FIG. 24, which uses the pixel shift element 218, overlapping of pixels was substantially not observed.

EXAMPLE 15

Figure 25:
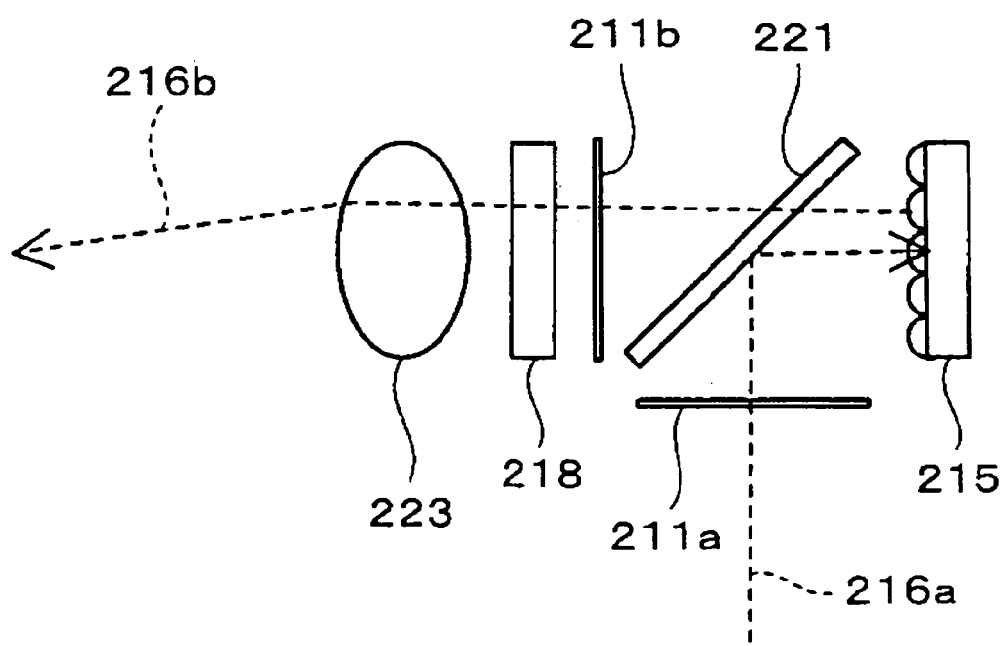
FIG. 25 is a schematic view of a 15th example of the display device according to the second embodiment.

FIG. 25 is a schematic view of a 15th example of the display device according to the present embodiment. This example is a modification to the 14th example.

Differing from the 14th example, in this example, instead of the polarized beam splitter, a wire grid polarizer 221 is used as the polarized-light splitting unit. In addition, instead of the $\lambda/4$ wave plate, a phase difference member having retardation less than the $\lambda/4$ wave plate is used in the spatial light modulator 215, and further, a lens having a long back focus length is used as a projecting lens 223. Except for the above points, the display device of this example is the same as that in the 14th example.

For example, the phase difference member in the spatial light modulator 215 is the same as that in the second example, and it is used for reducing the residual phase difference in the liquid crystal displaying element. For example, the phase difference member in the spatial light modulator 215 gives a retardation of 20 nm. The optimum value of the retardation can be appropriately changed with the characteristics of the liquid crystal displaying elements of the spatial light modulator 215.

Similar to the 14th example, the pixel-shift element 218 is provided to periodically shift the optical axis of a projected light beam by half of one pixel pitch of the liquid crystal displaying elements of the spatial light modulator 215. The displayed image is updated in synchronization with this shift. As a result, apparently, a number of pixels can be displayed equaling an integral multiple of the number of the pixels of the liquid crystal displaying element. In addition, because of the micro-lens array, the size of each pixel becomes small, thus overlapping of adjacent pixels is reduced. Further, as described in the second example, because the phase difference member is arranged between the micro-lens array and the liquid crystal displaying element, it is possible to suppress reduction of the contrast ratio, which can be attributed to presence of the micro-lens array.

In the above, it is described that the same spatial light modulator as that in the second example is used, but it is certain that use can be made of the spatial light modulators described in other examples, which have built-in phase difference members. Particularly, use can be made of any spatial light modulator having a built-in phase difference member giving a phase difference of a few tens nm for compensating for the residual phase difference in the liquid crystal displaying element.

According to display device of the present example, as described above, the contrast ratio is improved greatly, and by the micro-lens array, the size of a pixel is reduced to be about 60% of its normal size. In practical experiments using the display device shown in FIG. 25, which uses the pixel shift element 218, overlapping of pixels was substantially not observed.

Third Embodiment

In the first embodiment, it is described that in a spatial light modulator (liquid crystal light valve) having liquid crystal displaying elements combined with a micro-lens array, by disposing a wave plate between the liquid crystal layer and the micro-lens array for compensating for a residual phase difference in the displaying elements, the contrast ratio of the spatial light modulator can be improved.

In the second embodiment, descriptions are made of a phase difference member having a fixed liquid crystal alignment, in addition to phase difference members such as a structural birefringence film or an oblique evaporation film.

However, after a structure for generating a phase difference is formed between the liquid crystal layer and the micro-lens array, it is impossible to make adjustments in an arrangement of the related art, in which the phase difference member and the spatial light modulator are arranged separately.

Specifically, in the related art, an adjustment is made as below. A birefringence plate (wave plate) is rotated to seek a position of the birefringence plate at which the brightness of a dark image is the lowest, and the birefringence plate is fixed at this position. By structural birefringence film or oblique evaporation, however, the slow axis is determined when the phase difference member is fabricated. Therefore, the residual phase difference in the spatial light modulator is largely influenced by fabrication fluctuations. For this reason, in order to achieve image display of a high contrast ratio, it is desirable to be able to adjust the slow axis even after the phase difference member is disposed in the spatial light modulator.

The present embodiment discloses a display device having a compact spatial light modulator and being able to adjust the slow axis of the phase difference member, which is not placed outside the spatial light modulator as in the related art, in accordance with the intrinsic residual phase difference in the spatial light modulator, even in a configuration in which the phase difference member is provided between a light transmission substrate and a liquid crystal layer. The phase difference member, which enables adjustment of the slow axis, includes a small number of layers.

As a result, in the present embodiment, in the spatial light modulator having a phase difference member provided between a micro-lens array substrate and the liquid crystal layer, it is possible to correct for the intrinsic residual phase difference in the spatial light modulator, and to realize a display device or a projection display apparatus of a high contrast ratio and able to display an image having a number of pixels greater than the number of pixels of the spatial light modulator.

Below, examples of the spatial light modulator according to the present embodiment are presented.

EXAMPLE 1

Figure 26:
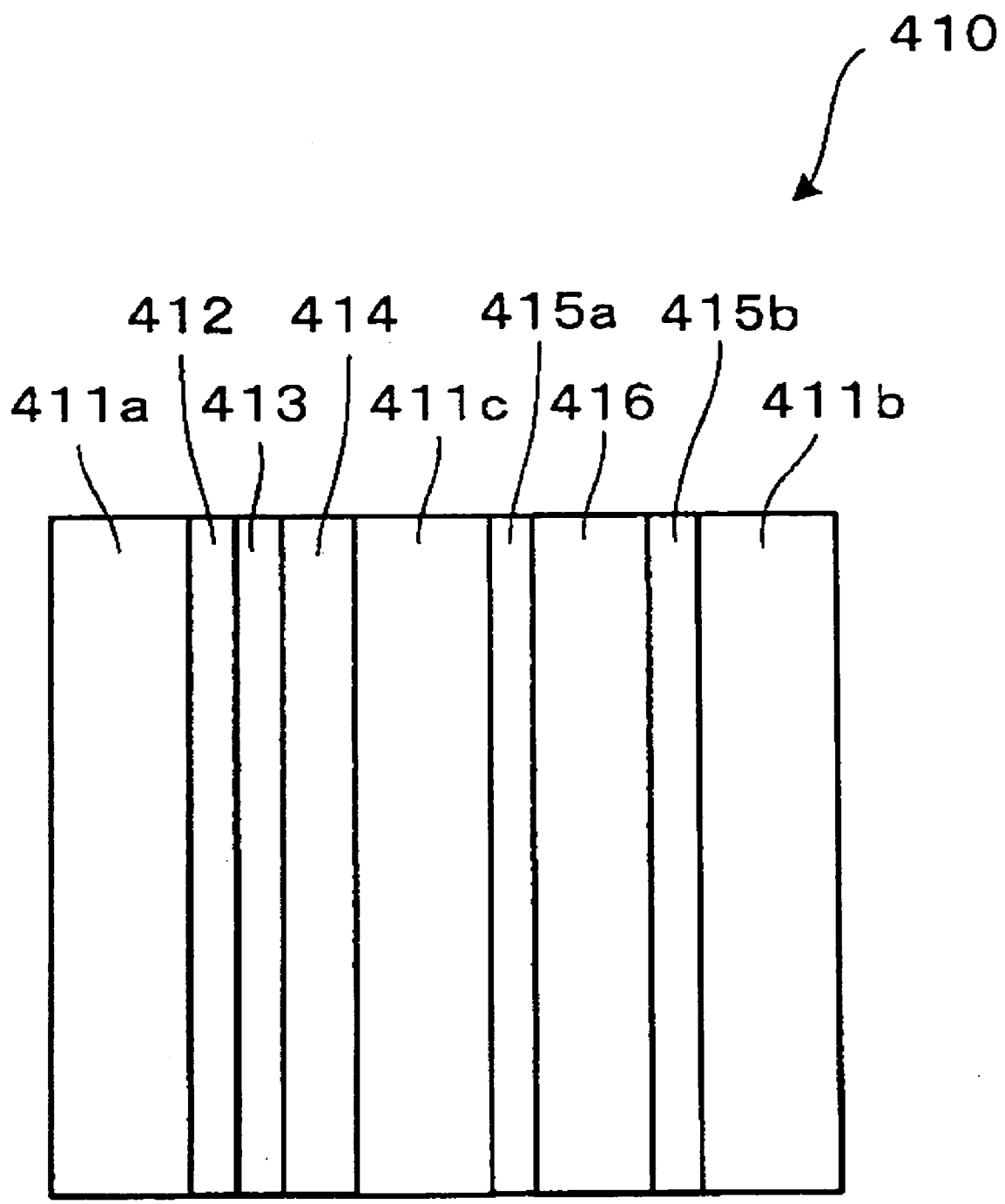
FIG. 26 is a schematic view of a principal portion of a first example of the spatial light modulator according to a third embodiment.

FIG. 26 is a schematic view of a principal portion of a first example of the spatial light modulator according to the present embodiment.

In this example, the spatial light modulator 410 includes a spatial light modulation portion for displaying an image and a phase difference adjustment portion. In FIG. 26, among three light transmission substrates 411$a$, 411$b$, and 411$c$, the spatial light modulation portion is formed between the light transmission substrates 411$b$ and 411$c$, and the phase difference adjustment portion is formed between the light transmission substrates 411$c$ and 411$a$.

Specifically, as illustrated in FIG. 26, the spatial light modulation portion between the light transmission substrates 411$b$ and 411$c$ includes a liquid crystal layer 416 disposed between the light transmission substrates 411$b$ and 411$c$, and a transparent electrode layer and alignment films 415$a$, 415$b$ disposed on the two sides of the liquid crystal layer 416, respectively. One of the light transmission substrates 411$b$ and 411$c$ acts as a switching array substrate, on which the transparent electrode layer 415$a$ is divided into pixels arranged in a manner of a matrix.

On the other hand, the phase difference adjustment portion between the light transmission substrates 411$c$ and 411$a$ includes an alignment film 412, a liquid crystal alignment control film 413, and a curable liquid crystal layer 414. The alignment direction of the liquid crystal alignment control film 413 is adjustable in the plane of the liquid crystal alignment control film 413 by applying an electric field in its thickness direction.

Although not illustrated in FIG. 26, all side surfaces are sealed so as to prevent the liquid crystal materials from flowing out.

In the spatial light modulation portion, depending on the orientation angles of the alignment films 415$a$, 415$b$, the liquid crystal of the liquid crystal layer 416 is twisted by a certain angle.

If a voltage is applied in the thickness direction of the liquid crystal layer 416 (the electrodes for this use are not illustrated in FIG. 26), the liquid crystal molecules are turned to face in a normal direction of one of the light transmission substrates.

In this example, polarization plates are disposed in front of and behind the spatial light modulator 410. For example, the two polarization plates are arranged so that an incident polarized beam with a polarization direction parallel to the paper is converted to a polarized beam with a polarization direction perpendicular to the paper due to the twisted angle. In addition, the polarization plate on the incident side is arranged with the transmission axis thereof to be perpendicular to the paper, and the polarization plate on the outgoing side is arranged with the transmission axis thereof to be parallel to the paper. In this arrangement, when a voltage is not applied on the liquid crystal layer 416, the spatial light modulator 410 is in a bright state. When a voltage is applied on the liquid crystal layer 416 gradually, the density of the light transmitting through the liquid crystal layer 416 decreases, and when the voltage is sufficiently high, the spatial light modulator 410 transits to a dark state.

It should be noted that a complete dark state cannot be achieved merely by the stacked structure between the light transmission substrate 411$c$ to the light transmission substrate 411$b$ with the liquid crystal layer 416 in between. This is because the liquid crystal molecules near the alignment film are twisted by an angle (referred to as a "pretilt angle"), and this pretilt angle is maintained. Due to this, a residual phase difference occurs. The magnitude of the residual phase difference is dependent on parameters of the liquid crystal layer 416, and can be determined approximately as indicated below.

Calculations are made to determine a phase difference to be generated by a wave plate for compensating for the residual phase difference, and a slow phase axis of the wave plate. The alignment film 412 in the phase difference adjustment portion is processed by rubbing processing so that an alignment direction due to the rubbing processing is in agreement with the slow phase axis. Then, as an initial state, the liquid crystal alignment control film 413 is aligned along the rubbing direction of the alignment film 412, and the curable liquid crystal layer 414 is aligned along the alignment direction of the liquid crystal alignment control film 413, that is, along the rubbing direction of the alignment film 412.

Here, by applying a voltage between the light transmission substrates 411b and 411a, the alignment direction of the liquid crystal alignment control film 413 is adjustable in the plane including the liquid crystal alignment control film 413. Along with a change of the alignment direction of the liquid crystal alignment control film 413, the alignment direction of the curable liquid crystal layer 414 changes, too, and after a state is attained by adjustment in which the phase difference for compensating the residual phase difference is obtained, the curable liquid crystal layer 414 is cured by heat or light.

The liquid crystal alignment control film 413 may be a liquid crystal material whose alignment changes successively in a plane including the film 413 by applying an electric field in the thickness direction thereof. For example, the liquid crystal alignment control film 413 may be a polymer stabilized Smectic C phase liquid crystal film, or a liquid crystal material of a Smectic A phase and showing an electroniclinic effect. The thickness of the liquid crystal alignment control film 413 generally depends on the anisotropy of the refraction index of the liquid crystal material used therein, but from the point of view of the size of the phase difference, preferably, the thickness of the liquid crystal alignment control film 413 is from a few tens nm to a few hundreds nm.

The polymer stabilized Smectic C phase liquid crystal film is also referred to as a polymer stabilized ferroelectric liquid crystal film, and can be formed in the following way.

First, a liquid crystal material including a curable composition and a feroelectric liquid crystal material, which include liquid crystalline (meta) acrylates, is coated by spin-coat on a substrate on which a transparent electrode layer and an alignment film are formed. While maintaining the coated thin liquid crystal film to be in the Smectic A phase, the liquid crystal material is exposed to heat or light or an electron beam, and thereby, the curable composition including liquid crystalline (meta) acrylates is polymerized. That is, the liquid crystal material including a curable composition and a feroelectric liquid crystal material, which includes liquid crystalline (meta) acrylates, is aligned along the axis of easy magnetization in the Smectic A phase. The liquid crystal material is exposed to heat or light or an electron beam in this Smectic A phase, and the liquid crystalline frame of the liquid crystalline (meta) acrylates is aligned to be in agreement with the axis of easy magnetization of the alignment film and is stabilized in this state. As a result, the double stability of the feroelectric liquid crystal material disappears due to the polymerization stabilization effect of the curable composition having the liquid crystalline frame of the liquid crystalline (meta) acrylates, and the liquid crystal alignment control film 413 is obtained, whose alignment direction is changed continuously in a plane including the liquid crystal alignment control film 413 by applying an electric field in the thickness direction thereof.

The ferroelectric liquid crystal material included in the liquid crystal alignment control film 413 may be any ferroelectric liquid crystal. Preferably, it is a ferroelectric liquid crystal showing the Smectic C phase at a temperature higher than a chiral Smectic C phase, and more preferably, it is a ferroelectric liquid crystal showing the Smactic C phase and a Nematic phase at a temperature higher than the Nematic C phase in order to obtain a good alignment state. It is preferable that the curable composition show liquid crystalline properties in order that the curable composition having the liquid crystalline (meta) acrylates does not degrade the liquid crystalline properties of the ferroelectric liquid crystal material. More preferably, the curable composition has a Nematic liquid crystal phase, further more preferably, the curable composition has a Smectic A liquid crystal phase.

The dose of the light or the electron beams used in the process of polymerizing the curable composition is dependent on the liquid crystal material to be used and the concentration of the polymerization initiator; preferably it is in the range 50 mJ/cm$^2$ to 1000 mJ/cm$^2$. If the dose of the ultraviolet rays or the electron beams is lower than 50 mJ/cm$^2$, the curable composition cannot be sufficiently cured, and this material will change greatly with time after being fabricated. If the dose of the ultraviolet rays or the electron beams is higher than 1000 mJ/cm$^2$, properties of the liquid material decline.

Here, the liquid crystalline (meta) acrylates monomer described above in the present example may be any liquid crystalline (meta) acrylates monomer, and there is not any limitation thereto. The alignment film described above in the present example may be a polyamide alignment film processed by rubbing commonly used in the related art. The alignment film in the present example may also be an alignment control film of a thin poly(vinyl cinnamate) film radiated by polarized ultraviolet rays without being rubbed.

An optical polymerization initiator can be added to the liquid crystal material including the liquid crystalline (meta) acrylates monomer and the ferroelectric liquid crystal material for the purpose of rapidly curing an optical curable composition in the Smetic A phase. Here, the optical polymerization initiator may belong to the well-known benzoin-ether families, the benzophenone families, the acetophenone families, or the benzylketal families. Preferably, the weight concentration of the optical polymerization initiator is less than 10% relative to the liquid crystalline (meta) acrylates monomer included in the liquid crystal material.

In the above, it is described that the liquid crystal material is cured at a temperature allowing presence of the Smetic A phase, but the liquid crystal material may also be cured at a temperature allowing presence of the Smetic C phase while applying an electric field, and the latter method also results in a liquid crystal alignment control film having the same performance.

Alternatively, the liquid crystal alignment control film may be formed from a liquid crystal material showing an electroniclinic effect. The electroniclinic effect is considered to be related to a Smectic phase in which the director of the liquid crystal molecules is parallel to the normal line of the layer among the Smetic liquid crystal phase of a chiral liquid crystal compound, or a liquid crystal mixture having chiral compounds. Generally, this Smetic phase is the Smetic A phase. When a voltage is applied to the Smetic A phase, the direction of the liquid crystal molecules is inclined relative to the normal line of the layer. This phenomenon is referred to as "electroniclinic effect". Utilizing such an effect, the alignment direction can be changed continuously in a plane including the liquid crystal alignment control film by applying an electric field in the thickness direction of the film.

The curable liquid crystal layer 414 in the present example may be any liquid crystalline (meta) acrylates monomer, and there is not any limitation thereto. The thickness of the curable liquid crystal layer 414 generally depends on the anisotropy of the refraction index of the liquid crystal material used therein, but from the point of view of the size of the phase difference, preferably, the thickness of the curable liquid crystal layer 414 is from a few tens nm to a few hundreds nm.

For example, the curable liquid crystal layer 414 may be a liquid crystalline monomer having a liquid crystalline (meta) acrylates without a methylene spacer between a liquid crystal frame and an acryloyoxy group.

The liquid crystalline (meta) acrylates may be formed from a material represented by the following general chemical formula (6).

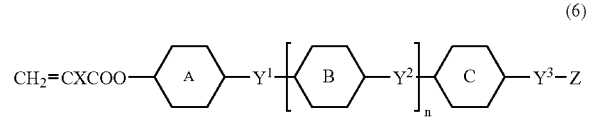

(6)

In the chemical formula (6), X represents a hydrogen atom or a methyl group, n represents 0 or 1, each of the hexagons A, B, and C represents a phenylene group, or a trans-cyclohexyl group, each of $Y^1$ and $Y^2$ represents a single bond, or one of —$CH_2CH_2$—, —$CH_2O$—, —$OCH_2$—, —COO—, —OCO—, —C≡C—, —CH═CH—, —CF═CF—, —$(CH_2)_4$—, —$CH_2CH_2CH_2O$—, —$OCH_2CH_2CH_2$—, —CH═CH—$CH_2CH_2$—, —$CH_2CH_2$—CH═CH—, Y3 represents a single bond, or one of —O—, —COO—, —OCO—, Z represents one of a hydrogen atom, halogen atom, a cyano group, an alkyl group in which the number of carbon atoms equals 1 to 20, or an alkenyl group in which the number of carbon atoms equals 2 to 20.

Preferably, the liquid crystalline (meta) acrylates is a material expressed by the chemical formula (6) in which, X represents a hydrogen atom, n=0, each of the hexagons A and C represents a 1,4-phenylene group, or a 1,4-trans-cyclohexyl group, $Y^1$ represents a single bond, or —C≡C—, $Y^3$ represents a single bond, Z represents one of a halogen atom, a cyano group, and an alkyl group in which the number of carbon atoms equals 1 to 20.

More preferably, the liquid crystalline (meta) acrylates may be formed from a material represented by the following general chemical formulae (7) or (8).

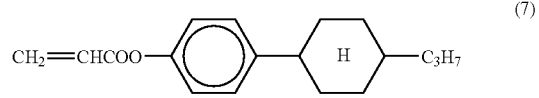

(7)

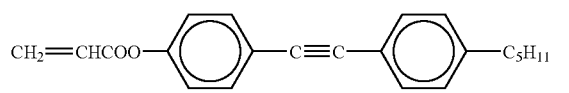

(8)

Alternatively, the liquid crystalline (meta) acrylates may be formed from a mixture of the materials expressed by the chemical formulae (7) and (8). Specifically, a mixture of the materials expressed by the chemical formulae (7) and (8) at 50% (weight percentage) exhibits the Nematic phase, and is easy to handle.

When applying an electric field in the thickness direction of the liquid crystal alignment control film 413 to control the alignment direction of the film 413, the electric field is also applied to the curable liquid crystal layer 414 in the thickness direction of the film 414. Due to this, the alignment direction of the curable liquid crystal layer 414 changes responding to the electric field. This change of the alignment direction is not desirable. In order to prevent the change of the alignment direction, it is preferable that the dielectric anisotropy Δ ε of the curable liquid crystal layer 414 be as small as possible, and more preferably, that the dielectric anisotropy Δ ε of the curable liquid crystal layer 414 be substantially zero.

An optical polymerization initiator can be added to the liquid crystal material including the liquid crystalline (meta) acrylates monomer for the purpose of rapidly curing the liquid crystal material after the adjustment of the phase difference.

Here, the optical polymerization initiator may belong to the well-known benzoin-ether families, or the benzophenone families, or the acetophenone families, or the benzylketal families. Preferably, the weight concentration of the optical polymerization initiator is less than 10% relative to the liquid crystalline (meta) acrylates monomer included in the liquid crystal material.

Figure 28:
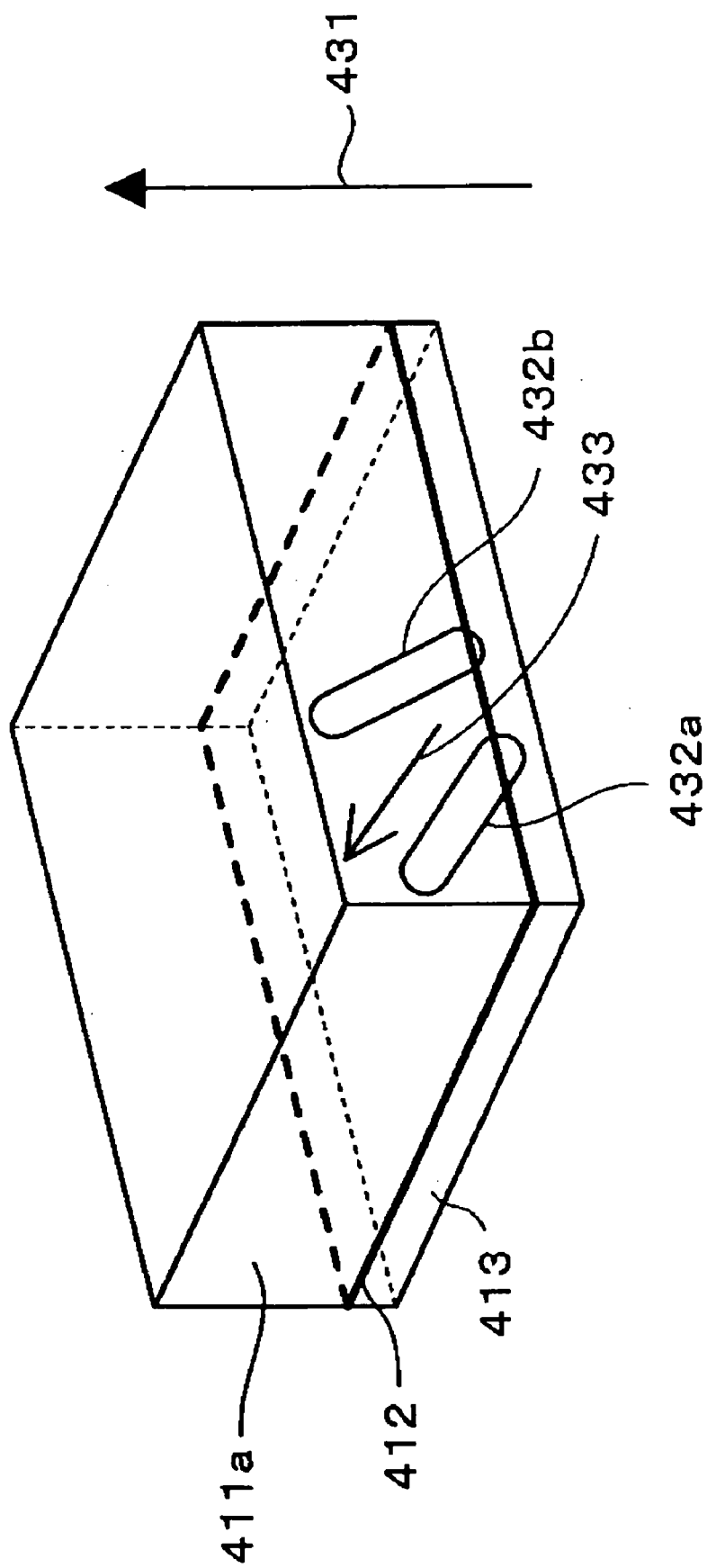
FIG. 28 is a perspective view of a spatial light modulator for showing an operation of alignment control of a polymer stabilized ferroelectric liquid crystal film by applying an electric field.

FIG. 28 is a perspective view of the spatial light modulator 410 for showing an operation of alignment control of a polymer stabilized ferroelectric liquid crystal film, acting as the liquid crystal alignment control film 413, by applying an electric field.

In FIG. 28, the spatial light modulator 410 is observed from the side of the light transmission substrate 411a, and only the light transmission substrate 411a, the alignment film 412, and the polymer stabilized ferroelectric liquid crystal film 413 are illustrated in FIG. 28.

Before applying the electric field, the polymer stabilized ferroelectric liquid crystal film 413 is aligned along the rubbing direction 433 of the alignment film 412. When the electric field is applied (in the field application direction 431), the alignment direction of the polymer stabilized ferroelectric liquid crystal film 413 is rotated in the plane of the liquid crystal layer relative to the rubbing direction 433, obtaining a rotationally-adjusted polymer stabilized ferroelectric liquid crystal film 432b. This rotationally-adjusted polymer stabilized ferroelectric liquid crystal film 432b functions as an alignment film of an optically-curable liquid crystal layer, functioning as the curable liquid crystal layer 414.

Then, the optically-curable liquid crystal layer 414 is irradiated with light of a long wavelength, which does not cure the optically-curable liquid crystal layer 414, to measure the intensity of the leaked light in the dark state of the spatial light modulator 410. If necessary, the light may be incident at an inclined angle instead of a right angle.

The intensity of the leaked long-wavelength light in the dark state at the wavelength of the light for practical use can be predicted separately by calculations. When applying a voltage to the polymer stabilized ferroelectric liquid crystal film 413, the value of the voltage is selected so that the intensity of the leaked light becomes a specified value. When the intensity of the leaked light reaches the specified value, the corresponding voltage is maintained, and at the same time, the optically-curable liquid crystal layer 414 is irradiated with light of an appropriate wavelength, which cures the optically-curable liquid crystal layer 414. After the optically-curable liquid crystal layer 414 is cured, even when the voltage on the polymer stabilized ferroelectric liquid crystal film 413 is removed, the alignment direction of the cured liquid crystal layer 414 does not change. The optically-cured liquid crystal layer 414 is aligned along the rubbing direction of the alignment film 412.

If the retardation of the optically-curable liquid crystal layer 414 is set larger than the retardation of the polymer stabilized ferroelectric liquid crystal film 413 in advance, the retardation of the optically-curable liquid crystal layer 414 is dominant, and the optically-curable liquid crystal layer 414 functions as a wave plate. Here, retardation is defined to be the thickness of the liquid crystal layer multiplied by the difference between an ordinary refraction index and an extraordinary refraction index.

In the above, it is described that an electric field is applied; certainly, a magnetic field can also be applied.

Preferably, the dielectric anisotropy $\Delta \epsilon$ of the optically-curable liquid crystal layer 414 is as small as possible. The reason is described below. When applying an electric field in the thickness direction of the polymer stabilized ferroelectric liquid crystal film 413, the electric field is also applied on the optically-curable liquid crystal layer 414. Due to this, the alignment direction of the optically-curable liquid crystal layer 414 changes responding to the electric field; in other words, the optically-curable liquid crystal layer 414 is tilted in the thickness direction, and the desired retardation cannot be obtained. In order to prevent the tilt, preferably, the dielectric anisotropy $\Delta \epsilon$ of the optically-curable liquid crystal layer 414 is less than 0.1, and more preferably, the dielectric anisotropy $\Delta \epsilon$ of the optically-curable liquid crystal layer 414 is substantially zero.

Instead of the optically-curable liquid crystal layer, a heat-curable liquid crystal layer may also used as the curable liquid crystal layer 414. In this case, after adjusting the alignment direction of the polymer stabilized ferroelectric liquid crystal film 413, the spatial light modulator 410 as a whole is heated to cure the heat-curable liquid crystal layer 414.

According to the spatial light modulator in the present example, the phase difference member, which is placed outside the spatial light modulator in the related art, can be integrated with the spatial light modulator, and the rotation adjustment of the phase difference member made in the related art can be easily carried out by controlling a voltage, thus enabling adjustment of the slow axis.

Although FIG. 26 illustrates a transmission type spatial light modulator, the present example is also applicable to a reflection type spatial light modulator.

EXAMPLE 2

Figure 27:
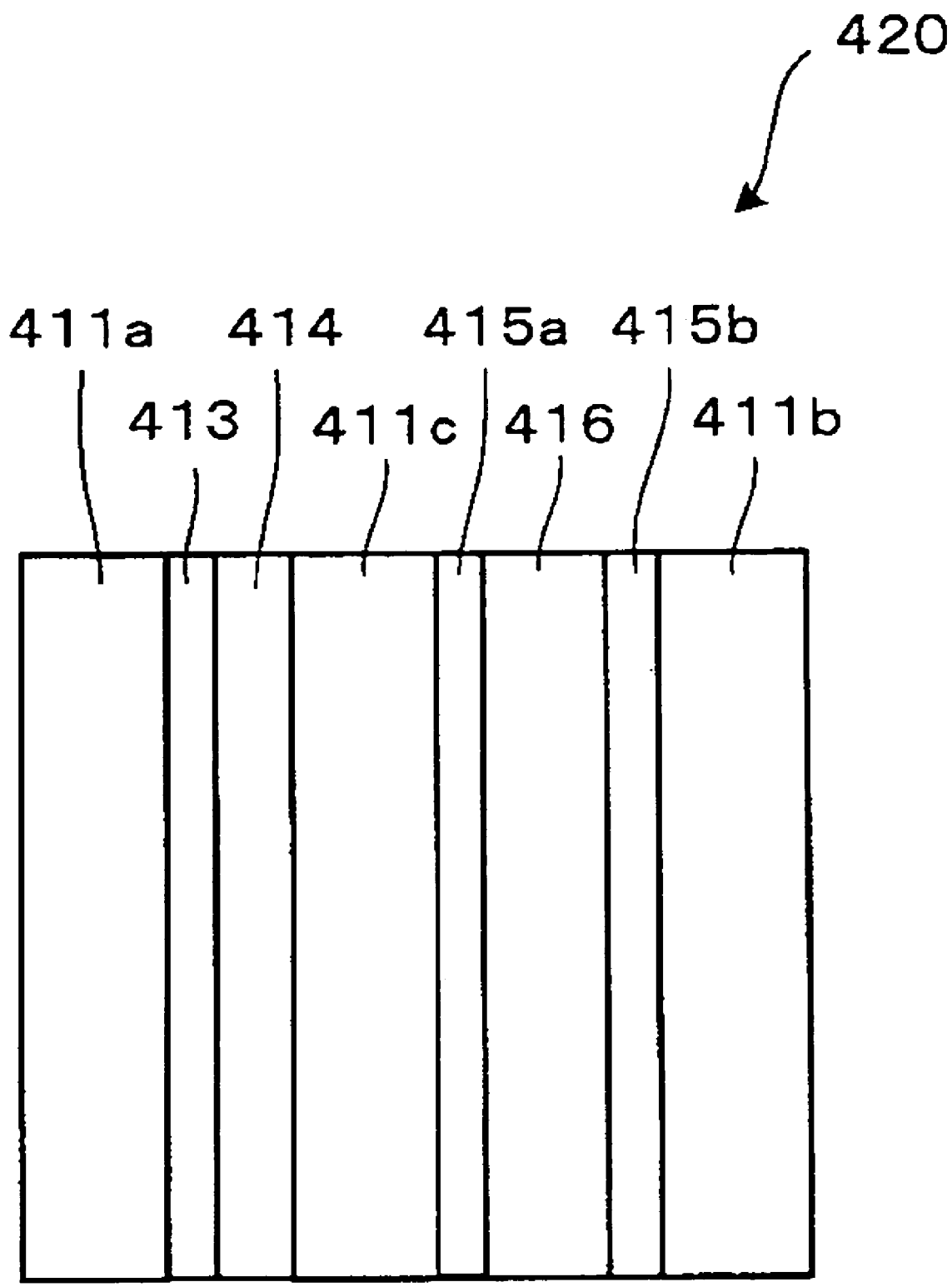
FIG. 27 is a schematic view of a principal portion of a second example of the spatial light modulator according to the third embodiment.

FIG. 27 is a schematic view of a principal portion of a second example of the spatial light modulator according to the present embodiment. The second example is a modification to the first example.

In this example, the alignment film 412 in the spatial light modulator 410 is removed, forming a spatial light modulator 420. That is, the spatial light modulator 420 includes a spatial light modulation portion and a phase difference adjustment portion, the spatial light modulation portion being formed between the light transmission substrates 411b and 411c, and the phase difference adjustment portion being formed between the light transmission substrates 411c and 411a.

The spatial light modulation portion between the light transmission substrates 411b and 411c includes a liquid crystal layer 416 disposed between the light transmission substrates 411b and 411c, and a transparent electrode layer and alignment films 415a, 415b disposed on the two sides of the liquid crystal layer 416, respectively.

The phase difference adjustment portion between the light transmission substrates 411c and 411a includes the polymer stabilized ferroelectric liquid crystal film 413 and the optically-curable liquid crystal layer 414.

Although an alignment film 412 is not provided on the light transmission substrate 411a, the light transmission substrate 411a itself is processed by rubbing processing, and the polymer stabilized ferroelectric liquid crystal film 413 in contact with the light transmission substrate 411a is aligned along the rubbing direction of the polymer stabilized ferroelectric liquid crystal film 413, and the optically-curable liquid crystal layer 414 is aligned along the alignment direction of the polymer stabilized ferroelectric liquid crystal film 413, that is, along the rubbing direction of the polymer stabilized ferroelectric liquid crystal film 413.

Then, the optically-curable liquid crystal layer 414 is irradiated with light of a long wavelength, which does not cure the optically-curable liquid crystal layer 414, to measure the intensity of the leaked light in the dark state of the spatial light modulator 420. If necessary, the light may be incident at an inclined angle instead of a right angle.

The intensity of the leaked long-wavelength light in the dark state at the wavelength of the light for practical use can be predicted separately by calculations. When applying a voltage on the polymer stabilized ferroelectric liquid crystal film 413, the value of the voltage is selected so that the intensity of the leaked light becomes a specified value. When the intensity of the leaked light reaches the specified value, the corresponding voltage is maintained, at the same time, the optically-curable liquid crystal layer 414 is irradiated with light of another wavelength, which cures the optically-curable liquid crystal layer 414. After the optically-curable liquid crystal layer 414 is cured, even when the voltage on the polymer stabilized ferroelectric liquid crystal film 413 is removed, the alignment direction of the cured liquid crystal layer 414 does not change. The optically-cured liquid crystal layer 414 is aligned along the rubbing direction of the light transmission substrate 411a.

If the retardation of the optically-curable liquid crystal layer 414 is set larger than the retardation of the polymer stabilized ferroelectric liquid crystal film 413 in advance, the retardation of the optically-curable liquid crystal layer 414 is dominant, and the optically-curable liquid crystal layer 414 functions as a wave plate. Here, retardation is defined to be the thickness of the liquid crystal layer multiplied by the difference between an ordinary refraction index and an extraordinary refraction index.

According to the spatial light modulator in the present example, the phase difference member, which is used to improve the contrast ratio, can be integrated with the spatial light modulator, and the rotation adjustment of the phase difference member made in the related art can be easily carried out by applying an electric field (or a magnetic field). In addition, it is possible to reduce the number of the component elements in the phase difference member.

EXAMPLE 3

Figure 29:
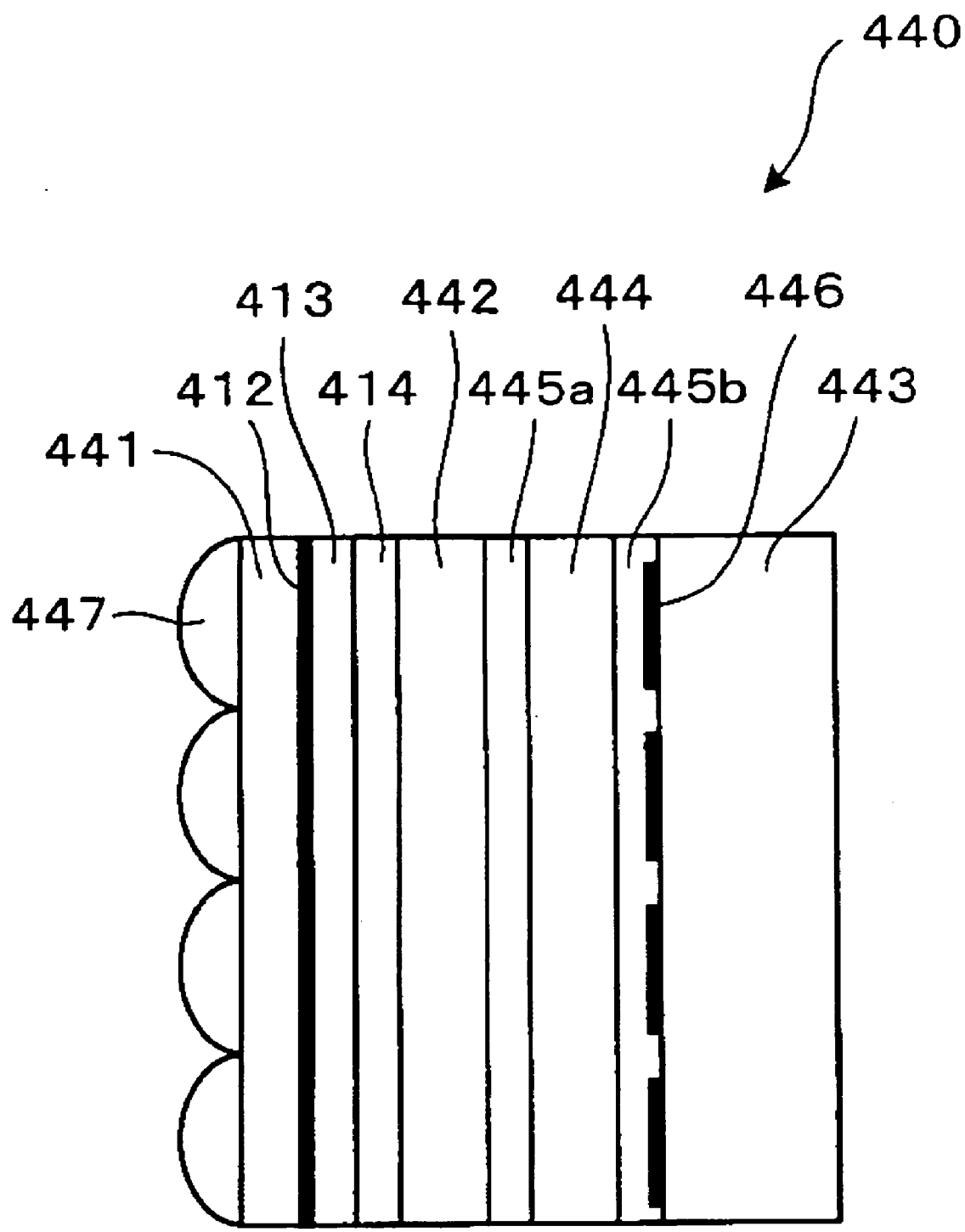
FIG. 29 is a schematic view of a principal portion of a third example of the spatial light modulator according to the third embodiment.

FIG. 29 is a schematic view of a principal portion of a third example of the spatial light modulator according to the present embodiment. The third example is a modification to the first example.

As illustrated in FIG. 29, a spatial light modulator 440 includes a lens array substrate 441, the polymer stabilized ferroelectric liquid crystal film 413 and the optically-curable liquid crystal layer 414, a light transmission substrate 442, a back substrate 443 including a switching element array for optical modulation, a liquid crystal layer 444 between the light transmission substrate 442 and the back substrate 443 for optical modulation.

The alignment film 412 is provided next to the lens array substrate 441 on the side of the polymer stabilized ferroelectric liquid crystal film 413. Alignment films 445a and 445b are respectively disposed on the light transmission substrate 442 and on pixel reflection electrodes 446 on the back substrate 443. The lens array 447 on the lens array substrate 441 is arranged to correspond to the matrix of the pixel reflection electrodes 446. The elements including the alignment film 412 through the optically-curable liquid crystal layer 414 are the same as those in the previous examples, and descriptions thereof are omitted below.

In a reflection spatial light modulator having a lens array in the related art, the wave plate is placed outside the lens array substrate. In this arrangement, the illumination light from the reflection liquid crystal displaying elements passes through the lens array twice, in the incident path and the returning path. Because of the refraction effect of the lens array, the reflected light (that is, the modulated light) has a large spreading angle. For this reason, the angle of the light incident on the wave plate differs from the angle of the returning light, and the phase difference in the liquid crystal layer cannot be correctly compensated for in the related art.

In contrast, in the present embodiment, because the wave plate is between the lens array and the liquid crystal displaying element, the angle of the incident light is the same as the angle of the returning light; hence, the phase difference between the incident light and the returning light can be correctly compensated for, and this results in a high contrast ratio.

Figure 30:
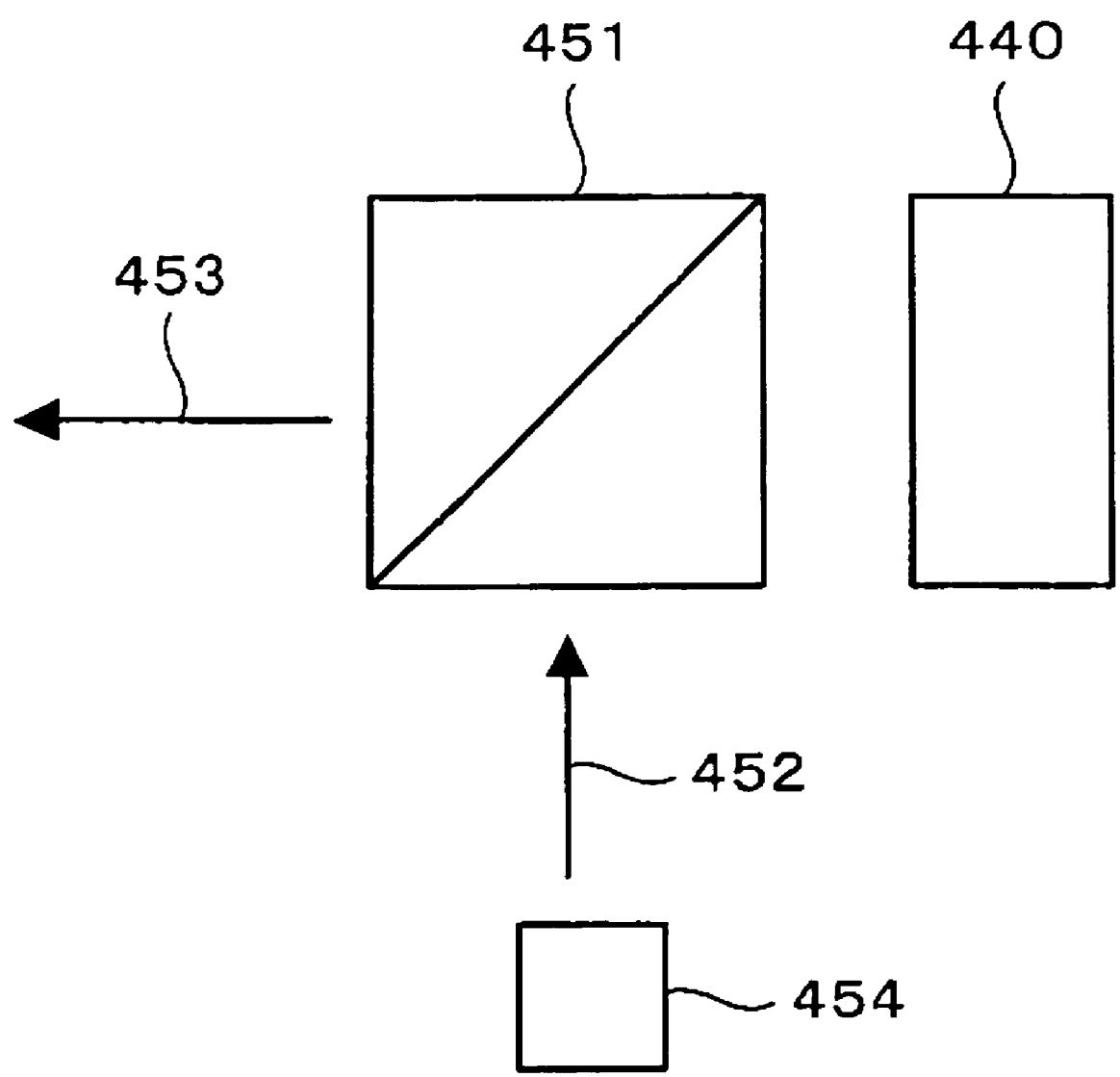
FIG. 30 is a schematic view of a display device including the spatial light modulator in the third example.

FIG. 30 is a schematic view of a display device including the spatial light modulator 440.

As illustrated in FIG. 30, when the spatial light modulator 440 and a polarized beam splitter 451 (the polarized-light splitting unit) are combined to form a display device, the rubbing direction of the alignment film 412 is set to be parallel or perpendicular to the paper, and the retardation of the optically-curable liquid crystal layer 414 is set to be about λ/4 (a quarter of the wavelength).

Because of this structure, in a dark state, the outgoing light 452 from the light source 454 is effectively reflected back to the light source 454, and in a bright state, the outgoing light 452 passes through the polarized beam splitter 451 and is projected on the screen to form an image.

The light source 454 may be a lamp or LED (light emission diode).

Further, as the foresaid second example, the alignment film 412 may also be removed, and the lens array substrate can be directly processed by rubbing processing.

EXAMPLE 4

Figure 31:
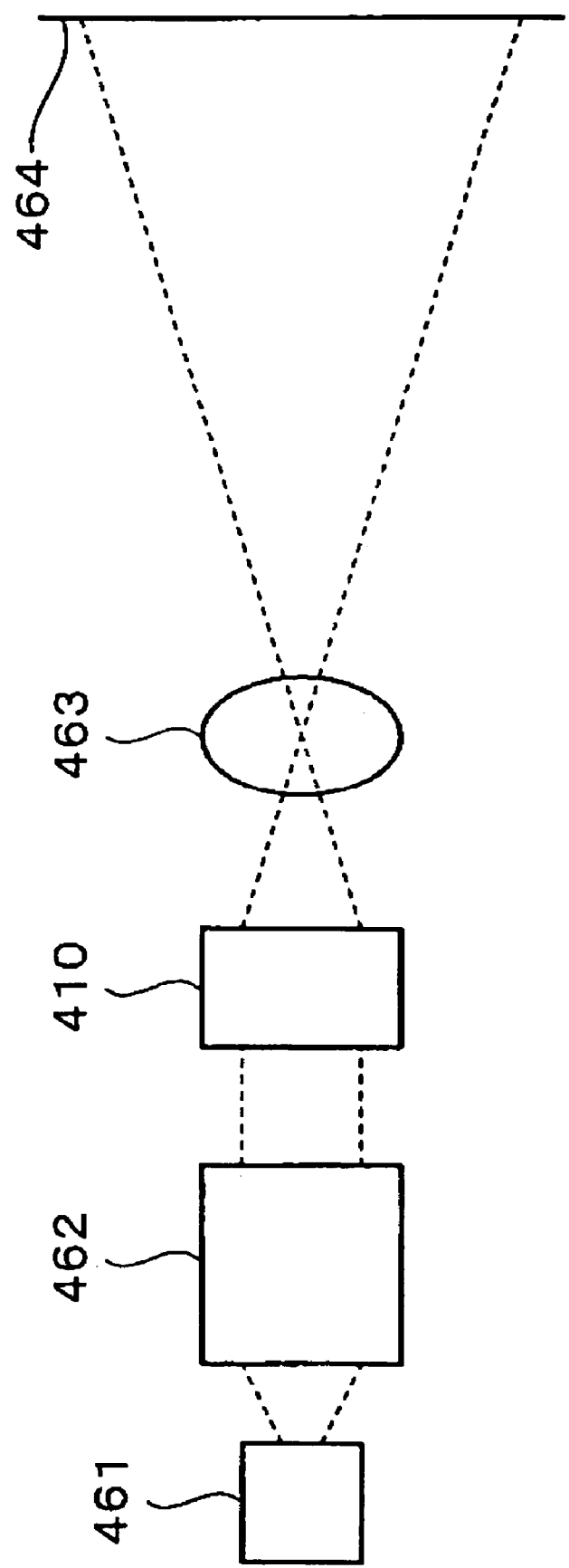
FIG. 31 is a schematic view of a fourth example of the third embodiment showing a projection display apparatus including the spatial light modulator in the first example.

FIG. 31 is a schematic view of a fourth example of the present embodiment showing a projection display apparatus including the spatial light modulator 410 in the first example.

As illustrated in FIG. 31, the projection display apparatus includes a light source 461 for emitting illumination light, an illumination optical system 462 for making the illumination light to be projected uniformly, the spatial light modulator 410 as described in the first example, and a projecting lens 463. The light source 461 may be a discharging lamp, such as a high-pressure mercury lamp. The illumination optical system 462 makes the illumination light from the light source 461 to be projected uniformly, and for example, it is formed from such as a fly's-eye integrator.

Although not illustrated, two polarization plates may be arranged in front of and behind the spatial light modulator 410. A light beam modulated by the spatial light modulator 410 passes through the not-illustrated polarization plates, and then is enlarged and projected by the projecting lens 463 on the screen 464.

As described above, rotation adjustment of a slow axis of a phase difference member (optically-curable liquid crystal layer) in the spatial light modulator 410 can be carried out by applying an electric field (or a magnetic field), and the phase difference member (optically-curable liquid crystal layer) is cured after the adjustment. For this reason, the contrast ratio is improved even with increased projecting light.

In this example, although it is described that a transmission type spatial light modulator 410 is employed, it can be replaced by a reflection type spatial light modulator and a polarized-light splitting unit. In addition, if a rotating color filter is provided at a position between the light source 461 and the spatial light modulator 410, it is possible to form images sequentially one color by one color. Further, as described in the next example, the light from the light source can be decomposed into different colors by dichroic mirrors or others, and the light beams of different colors can respectively form images of different colors through spatial light modulators for their own use, and the images of different colors can be combined to form a color image.

EXAMPLE 5

Figure 32:
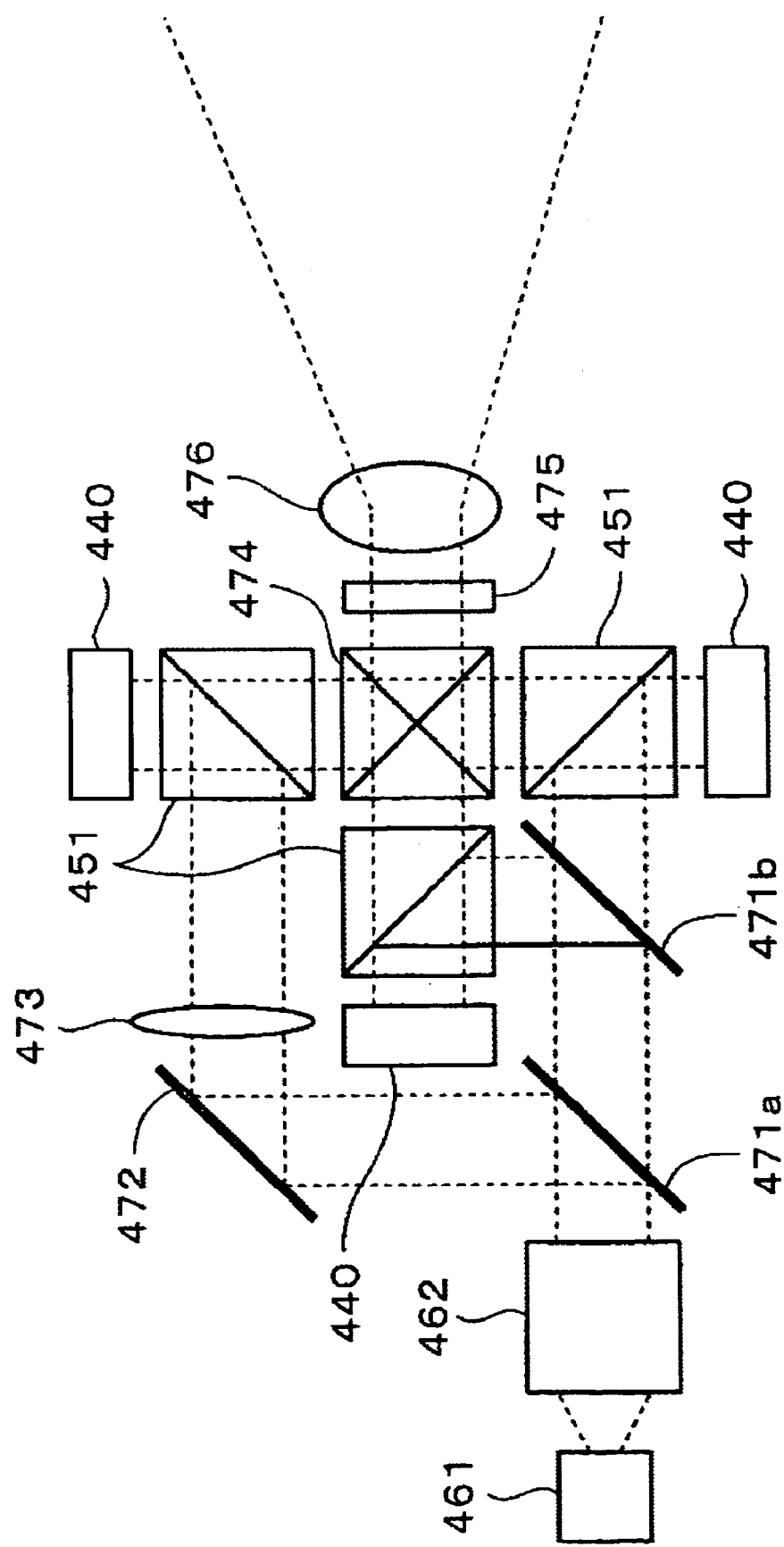
FIG. 32 is a schematic view of a fifth example of the third embodiment showing another projection display apparatus.

FIG. 32 is a schematic view of a fifth example of the present embodiment showing another projection display apparatus.

As illustrated in FIG. 32, the projection display apparatus includes the light source 461, the illumination optical system 462, dichroic mirrors 471*a* and 471*b* for color decomposition, three reflection type spatial light modulators 440, three polarized beam splitters 451, a dichroic prism 474 for color combination, a pixel shift element 475, and a projecting lens 476.

The light source 461 may be any lamp emitting white light, such as a high-pressure mercury lamp. The illumination optical system 462 makes the illumination light from the light source 461 to be projected uniformly, for example, it is formed from such as a fly's-eye integrator.

At the first dichroic mirror 471*a*, the blue component of the illumination light is reflected, and other components of the illumination light passes through the first dichroic mirror 471*a*. At the second dichroic mirror 471*b*, the green component of the residual illumination light is reflected, and the red component passes through the second dichroic mirror 471*b*.

Although not illustrated, because the light emitted from the light source 461 is not polarized, it is desirable to dispose polarization transformation elements before and behind or inside the illumination optical system 462. If reduction of light utilization efficiency is tolerable, polarization plates may be used for this purpose.

In FIG. 32, the reference number 472 indicates a mirror for changing the direction of the illumination light, and the reference number 473 indicates a relay lens for extending the length of the illumination optical system 462 for the blue light.

The light beams of different colors are reflected by the polarized beam splitters 451, respectively, and are irradiated to the respective spatial light modulators 440. The spatial light modulator 440 is a reflection type spatial light modulator having a lens array substrate, as described in the third example.

In the spatial light modulator 440, as described above, a phase difference member is disposed between the lens array substrate and the liquid crystal for optical modulation, and the rotation adjustment of a slow axis of the phase difference member in the spatial light modulator 440 can be carried out by applying an electric field (or a magnetic field).

The spatial light modulators 440 modulate the single light beams according to image data, the modulated single color light beams pass through the polarized beam splitters 451, and are combined by the dichroic prism 474. The color-combined light beam enters the pixel shift element 475.

The pixel-shift element 475 shifts the optical axis of the incident light beam by a predetermined distance. For example, in the pixel-shift element 475, an orientation of parallel transparent electrodes may be changed periodically by using a piezoelectric element, and in synchronization with this change, an image is displayed by the spatial light modulators 440.

For example, by shifting the optical axis of the incident light beam by half a pixel, and controlling the spatial light modulators 440 to be in synchronization with the pixel-shift element 475, a viewer of the projection display apparatus can view an image including pixels of a number twice the number of the pixels of the spatial light modulators 440. Besides the above configuration, the pixel-shift element 475 may also be a birefringence element.

Since the pixel-shift element 475 optically shifts pixels by half a pixel, for example, in the horizontal direction (or the vertical direction), adjacent pixels overlap with each other. To reduce overlapping of the adjacent pixels, it is necessary to reduce the sizes of the pixels of the spatial light modulators 440. For example, in order to shift pixels by half a pixel in both the horizontal direction and the vertical direction, it is necessary to reduce the size of one pixel of the spatial light modulators 440 to ½ (or reduce the area of one pixel to ¼).

Figure 33:
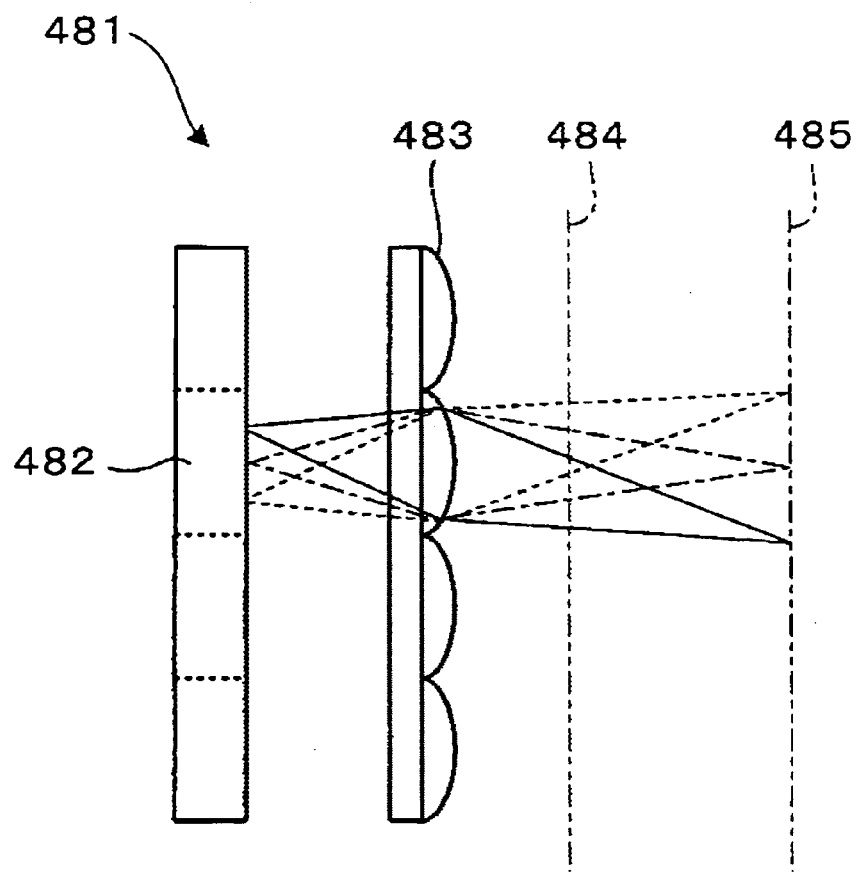
FIG. 33 is a schematic view showing an operation of a spatial light modulator for optically reducing the size of a pixel by using the lens array.

FIG. 33 is a schematic view showing an operation of a spatial light modulator for optically reducing the size of a pixel by using the lens array.

In FIG. 33, the reference number 481 represents a spatial light modulator, with light transmission substrate and some other components not illustrated. Near the spatial light modulator 481, a lens array 483 is disposed corresponding to the pixel pitches of the spatial light modulator 481. The illumination light is made uniform by an illumination optical system and is irradiated on the spatial light modulator 481. However, generally, a light source possesses an intrinsic distribution of luminous intensity, as described below.

Figure 34:
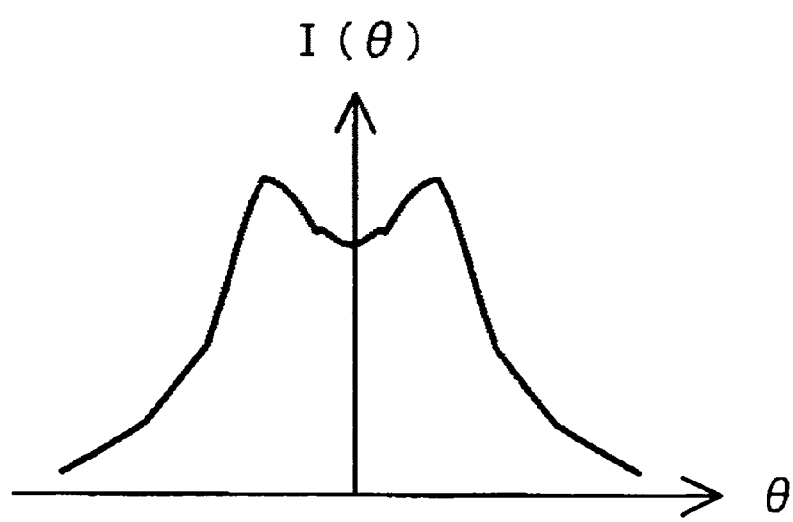
FIG. 34 is a graph exemplifying a luminous intensity distribution of a light source.

FIG. 34 is a graph exemplifying a distribution of luminous intensity in a light source.

As shown in FIG. 34, if an illumination optical system condenses a light beam from a lamp, a distribution of luminous intensity is generated on the spatial light modulator 481, as if the horizontal axis in FIG. 34 is extended. To the contrary, if an illumination optical system spreads the light beam from the lamp, a distribution of luminous intensity is generated on the spatial light modulator 481 as if the horizontal axis in FIG. 34 is shrunk.

Returning to FIG. 33, the illumination light passes through a pixel 482, which has an intrinsic luminous intensity distribution as shown in FIG. 34, and is then condensed by the lens array 483. Because the lens array 483 is close to the liquid crystal elements, the lens array 483 behaves like a field lens, and modifies the luminous intensity distribution of the pixel 482.

Figure 35:
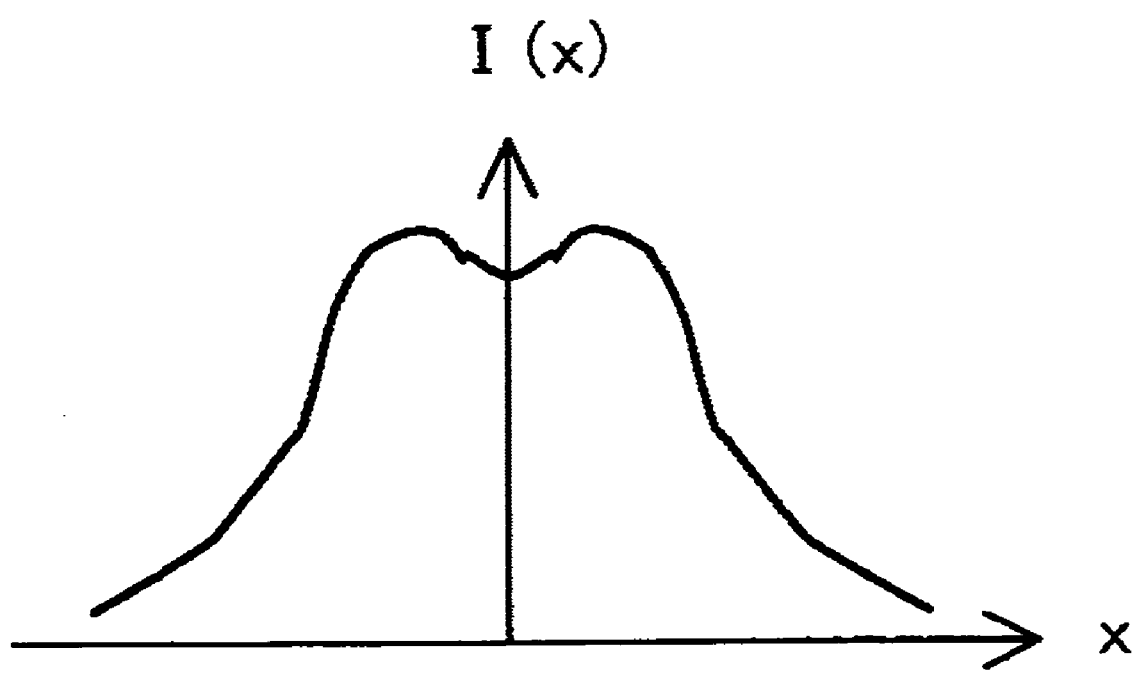
FIG. 35 is a graph showing a luminous intensity distribution of a pixel near the focal position.

FIG. 35 is a graph showing the distribution of luminous intensity of the pixel 482 at the position indicated by the dot-dashed line 485 in FIG. 34 (this is near the focal position). Further, the luminous intensity distribution at the position indicated by the dot-dashed line 484, which is closer to the lens-array 483 than the line 485, is similar to that in FIG. 34.

The luminous intensity distribution of a discharging lamp is similar to that shown in FIG. 34. If such a luminous intensity distribution is periodically arranged, at the pixel pitches, at the position indicated by the line 484, from this luminous intensity distribution it seems that the pixel 482 becomes small. For this reason, in the display device in FIG. 32, the back focal position of the projecting lens 476 is set at the position indicated by the line 484.

According to this example, despite usage of the lens array, a high contrast ratio is obtainable, and if combining the pixel reduction effect of the lens array and the pixel shift unit, it is possible to display images of high resolution.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

According to the present invention, because a phase difference generation unit is provided between the light transmission substrate and the liquid crystal layer, it is possible to compensate for a residual phase difference in the liquid crystal layer.

Because of the lens array, it is possible to display an image of high brightness and high quality.

It is possible to provide a spatial light modulation device having both high pixel downsizing performance and high contrast ratio. In addition, because the phase difference generation unit has a fixed liquid crystal alignment, it is easy to form a thin phase difference generation unit inside the spatial light modulation device, thereby obtaining a spatial light modulation device that is stable relative to a temperature change.

In addition, the phase difference generation unit has high temperature stability, high alignment performance and can be fabricated easily. In addition, by appropriately selecting materials, it is possible to further improve stability of the phase difference generation unit.

In addition, because the finally obtained film is a crystal film, it is possible to further improve stability of the phase difference generation unit, which is suitable for usage in a high temperature environment, such as in a projector.

In addition, because the phase difference generation unit can be made thin by making use of the high alignment performance of the phase difference generation unit, it is possible to apply a voltage through the phase difference generation unit. In addition, it is possible to obtain a spatial light modulation device with a built-in phase difference generation unit by using a simple configuration.

In addition, it is possible to integrate the phase difference generation unit with the spatial light modulation device, and it is possible to fix a slow axis of the phase difference generation unit after rotating the slow axis for adjustment, making the spatial light modulation device compact.

This patent application is based on Japanese Priority Patent Applications No. 2003-393843 filed on Nov. 25, 2003 and No. 2004-147814 filed on May 18, 2004, the entire contents of which are hereby incorporated by reference.

What is claimed is:

1. A spatial light modulation device, comprising:
a light transmission substrate;
a liquid crystal layer;
a pixel array; and a phase difference generation unit that is provided between the light transmission substrate and the liquid crystal layer to compensate for optical properties of a light beam passing through the liquid crystal layer,
wherein the phase difference generation unit includes a polymer liquid crystal film with a fixed alignment obtained by cooling an aligned polymer liquid crystal film to a glass state.

2. The spatial light modulation device as claimed in claim 1, wherein the pixel array includes a plurality of pixel electrodes arranged as a matrix;
a lens array is formed on the light transmission substrate, said lens array having a pitch corresponding to a pitch of the pixel electrode matrix; and
the phase difference generation unit is provided between the lens array and the liquid crystal layer.

3. The spatial light modulation device as claimed in claim 1, wherein a lens array is formed in the light transmission substrate or on a surface of the light transmission substrate;
the pixel array includes a plurality of pixel electrodes arranged as an array having a pitch corresponding to a pitch of the lens array;
the liquid crystal layer is provided between the light transmission substrate and a pixel array substrate with the pixel array formed thereon; and
the phase difference generation unit is provided between the lens array and the liquid crystal layer with a fixed alignment.

4. The spatial light modulation device as claimed in claim 3, wherein the aligned polymer liquid crystal film comprises a polymerized group.

5. The spatial light modulation device as claimed in claim 3, wherein the aligned polymer liquid crystal film comprises an aligned lyotropic liquid crystal.

6. The spatial light modulation device as claimed in claim 3, wherein a surface of the light transmission substrate and a surface of the pixel array substrate adjacent to the phase difference generation unit are processed by liquid crystal alignment treatment.

7. The spatial light modulation device as claimed in claim 3, wherein the phase difference generation unit is formed by transferring a film on another substrate to the light transmission substrate.

8. The spatial light modulation device as claimed in claim 3, wherein a transparent electrode is formed on the light transmission substrate for applying a voltage to the liquid crystal layer through the phase difference generation unit.

9. The spatial light modulation device as claimed in claim 8, wherein the phase difference generation unit is processed by alignment treatment for aligning the liquid crystal layer.

10. The spatial light modulation device as claimed in claim 3, wherein a light transmission interlayer is provided between the liquid crystal layer and the phase difference generation unit.

11. The spatial light modulation device as claimed in claim 10, wherein a side of the light transmission interlayer adjacent to the liquid crystal layer is processed by alignment treatment for aligning the liquid crystal layer.

12. The spatial light modulation device as claimed in claim 10, wherein the light transmission interlayer is a transparent electrode, and a side of the light transmission interlayer adjacent to the liquid crystal layer is processed by alignment treatment for aligning the liquid crystal layer.

13. The spatial light modulation device as claimed in claim 3, wherein each of the pixel electrodes is formed from a light-reflecting material.

14. The spatial light modulation device as claimed in claim 3, wherein the phase difference generation unit includes a λ/4 wave plate.

15. The spatial light modulation device as claimed in claim 3, wherein the phase difference generation unit generates phase difference for compensating for a residual phase difference in an ON state or OFF state of the liquid crystal layer.

16. A spatial light modulation device, comprising:
a light transmission substrate;
a liquid crystal layer;
a pixel array; and
a phase difference generation unit that is provided between the light transmission substrate and the liquid crystal layer to compensate for optical properties of a light beam passing through the liquid crystal layer,
wherein an alignment of the phase difference generation unit is adjustable by applying an external electric field, and the alignment of the phase difference generation unit is fixed after being adjusted.

17. The spatial light modulation device as claimed in claim 16, wherein the phase difference generation unit includes a liquid crystal alignment control film and a curable liquid crystal layer, an alignment of said liquid crystal alignment control film being adjustable in a plane including the liquid crystal alignment control film by applying an electric field in a thickness direction of the liquid crystal alignment control film.

18. The spatial light modulation device as claimed in claim 17, wherein
the phase difference generation unit further includes an alignment film;
the liquid crystal alignment control film includes a liquid crystal film of a Smectic A phase and showing an electroniclinic effect; and the curable liquid crystal layer includes a light-curable liquid crystal layer.

19. The spatial light modulation device as claimed in claim 17, wherein
the phase difference generation unit further includes an alignment film;
the liquid crystal alignment control film includes a ferroelectric liquid crystal film of a polymer stabilized Smectic C phase; and
the curable liquid crystal layer includes a light-curable liquid crystal layer.

20. The spatial light modulation device as claimed in claim 17, wherein the phase difference generation unit does not include an alignment film.

21. The spatial light modulation device as claimed in claim 17, wherein the curable liquid crystal layer includes a light-curable liquid crystal layer having a dielectric anisotropy being substantially zero.

22. The spatial light modulation device as claimed in claim 16, wherein a lens array is formed in the light transmission substrate or on a surface of the light transmission substrate, and is arranged to correspond to the pixel array.

23. The spatial light modulation device as claimed in claim 1, wherein a resulting light from the phase difference generation unit enters the liquid crystal layer.

24. A spatial light modulation device, comprising:
a light transmission substrate;
a liquid crystal layer;
a pixel array; and
a phase difference generation unit that is provided between the light transmission substrate and the liquid crystal layer to generate a phase difference on a light beam passing through the light transmission substrate so as to compensate for optical properties of the light beam with a resulting light from the phase difference generation unit entering the liquid crystal layer, wherein an alignment of the phase difference generation unit is adjustable by applying an external electric field, and the alignment of the phase difference generation unit is fixed after being adjusted.

25. A spatial light modulation device, comprising:
a light transmission substrate;
a liquid crystal layer;
a pixel array; and
a phase difference generation unit that is provided between the light transmission substrate and the liquid crystal layer to generate a phase difference on a light beam passing through the liquid crystal layer so as to compensate for optical properties of the light beam, wherein an alignment of the phase difference generation unit is adjustable by applying an external electric field, and the alignment of the phase difference generation unit is fixed after being adjusted.

* * * * *